(12) United States Patent
Seo et al.

(10) Patent No.: US 10,170,759 B2
(45) Date of Patent: Jan. 1, 2019

(54) METAL OXIDES FROM ACIDIC SOLUTIONS

(71) Applicants: Dong-Kyun Seo, Chandler, AZ (US);
Daniel Mieritz, Tempe, AZ (US);
Candace Chan, Phoenix, AZ (US);
Ran Zhao, Mesa, AZ (US)

(72) Inventors: Dong-Kyun Seo, Chandler, AZ (US);
Daniel Mieritz, Tempe, AZ (US);
Candace Chan, Phoenix, AZ (US);
Ran Zhao, Mesa, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 0 days.

(21) Appl. No.: 14/899,953

(22) PCT Filed: Jun. 12, 2014

(86) PCT No.: PCT/US2014/042053
§ 371 (c)(1),
(2) Date: Dec. 18, 2015

(87) PCT Pub. No.: WO2015/006010
PCT Pub. Date: Jan. 15, 2015

(65) Prior Publication Data
US 2016/0141616 A1    May 19, 2016

Related U.S. Application Data

(60) Provisional application No. 61/837,992, filed on Jun. 21, 2013.

(51) Int. Cl.
*H01M 4/485* (2010.01)
*C01B 25/37* (2006.01)
(Continued)

(52) U.S. Cl.
CPC .......... *H01M 4/485* (2013.01); *C01B 25/372* (2013.01); *C01B 25/45* (2013.01); *C01G 23/053* (2013.01);
(Continued)

(58) Field of Classification Search
None
See application file for complete search history.

(56) References Cited

U.S. PATENT DOCUMENTS 3,558,273 A    1/1971  Beck
4,374,232 A    2/1983  Davis
(Continued)

FOREIGN PATENT DOCUMENTS

CN    106573847 A1    4/2017
EP    0013497         7/1980
(Continued)

OTHER PUBLICATIONS

Duxson et al. "Geopolymer technology: the current state of the art" J Mater Sci (2007) 42:2917-2933.
(Continued)

*Primary Examiner* — Katie L Hammer
(74) *Attorney, Agent, or Firm* — Fish & Richardson P.C.

(57) ABSTRACT

Forming a metal oxide by treating an acidic solution containing a metal to yield a precursor in the form of a semi-liquid, semi-solid or solid, and treating the precursor to yield a product including the metal oxide. An organic or inorganic component may be combined with the precursor to yield a second semi-liquid, semi-solid or solid. The product may be treated to yield a new material. In some cases, the metal oxide has an empirical formula $H_xM_2A^1_y\text{-}A^2_z$, where M represents a transition metal or any combination of transition metals in Groups 3-12; $A^1$ is a first oxyanion; $A^2$ is a second oxyanion; $0 \le x \le 3$; $0 \le y \le 3$; $0 \le z \le 3$; and $y+z>0$.

17 Claims, 91 Drawing Sheets

(51) Int. Cl.
*C01B 25/45* (2006.01)
*C01G 23/053* (2006.01)
*H01M 10/052* (2010.01)
*H01M 10/054* (2010.01)
*H01M 4/131* (2010.01)
*H01M 4/136* (2010.01)
*H01M 10/05* (2010.01)

(52) U.S. Cl.
CPC ........... *H01M 4/131* (2013.01); *H01M 4/136* (2013.01); *H01M 10/05* (2013.01); *H01M 10/052* (2013.01); *H01M 10/054* (2013.01)

(56) References Cited

U.S. PATENT DOCUMENTS

| | | | |
|---|---|---|---|
| 4,800,051 A * | 1/1989 | Yan | C01F 7/36 264/660 |
| 4,923,830 A | 5/1990 | Everhart et al. | |
| 5,045,511 A | 9/1991 | Bosomworth et al. | |
| 5,167,942 A | 12/1992 | Balkus et al. | |
| 5,244,726 A | 9/1993 | Laney et al. | |
| 5,342,595 A | 8/1994 | Davidovits et al. | |
| 5,531,808 A | 7/1996 | Ojo et al. | |
| 5,680,713 A | 10/1997 | Forbert et al. | |
| 5,725,836 A | 3/1998 | Rouanet et al. | |
| 5,788,950 A * | 8/1998 | Imamura | B82Y 30/00 423/263 |
| 6,131,305 A | 10/2000 | Forbert et al. | |
| 6,187,248 B1 | 2/2001 | O'Neill et al. | |
| 6,254,845 B1 | 7/2001 | Ohashi et al. | |
| 6,350,428 B1 | 2/2002 | Verduijn et al. | |
| 6,617,276 B1 | 9/2003 | Ballinger et al. | |
| 6,642,285 B1 | 11/2003 | Bohner | |
| 6,699,808 B1 | 3/2004 | Schwertfeger et al. | |
| 6,893,564 B2 | 5/2005 | Mueller et al. | |
| 7,014,881 B2 * | 3/2006 | Liu | C25C 3/06 264/104 |
| 7,048,845 B2 | 5/2006 | Bauer | |
| 7,297,321 B2 | 11/2007 | Shpeizer et al. | |
| 7,456,123 B2 | 11/2008 | Wachter | |
| 7,771,686 B2 | 8/2010 | Sagoe-crentsil et al. | |
| 7,851,320 B2 | 12/2010 | Chaumonnot et al. | |
| 8,557,214 B2 | 10/2013 | Seo | |
| 8,574,358 B2 | 11/2013 | Biscan et al. | |
| 9,242,900 B2 | 1/2016 | Seo et al. | |
| 9,296,654 B2 | 3/2016 | Seo et al. | |
| 9,308,511 B2 | 4/2016 | Seo et al. | |
| 9,365,691 B2 | 6/2016 | Seo et al. | |
| 2001/0023296 A1 | 9/2001 | Kato et al. | |
| 2002/0018747 A1 | 2/2002 | Pinnavaia et al. | |
| 2003/0108785 A1 | 6/2003 | Wu et al. | |
| 2003/0168407 A1 | 9/2003 | Kusakabe et al. | |
| 2004/0047798 A1 | 3/2004 | Oh et al. | |
| 2004/0093876 A1 | 5/2004 | Inagaki et al. | |
| 2004/0258611 A1 | 12/2004 | Barrow et al. | |
| 2005/0152829 A1 | 7/2005 | Shpeizer et al. | |
| 2005/0272593 A1 | 12/2005 | Wachter | |
| 2006/0057355 A1 | 3/2006 | Suzuki et al. | |
| 2006/0269472 A1 | 11/2006 | Mackinnon et al. | |
| 2006/0292054 A1 | 12/2006 | Chaumonnot et al. | |
| 2007/0003749 A1 | 1/2007 | Asgari | |
| 2007/0009689 A1 | 1/2007 | Murer | |
| 2007/0048605 A1 | 3/2007 | Pez et al. | |
| 2007/0125271 A1 | 6/2007 | Barlet-Gouedard et al. | |
| 2007/0125272 A1 | 6/2007 | Johnson | |
| 2007/0128491 A1 | 6/2007 | Chisholm et al. | |
| 2007/0259979 A1 | 11/2007 | Lee | |
| 2008/0028994 A1 | 2/2008 | Barlet-Gouedard et al. | |
| 2008/0028995 A1 | 2/2008 | Barlet-Gouedard et al. | |
| 2008/0067149 A1 | 3/2008 | Piesslinger-Schweiger et al. | |
| 2008/0090716 A1 | 4/2008 | Cherepy | |
| 2008/0226893 A1 | 9/2008 | Yang et al. | |
| 2009/0026413 A1 | 1/2009 | Patoux et al. | |
| 2009/0041653 A1 | 2/2009 | Hwang et al. | |
| 2009/0256262 A1 | 10/2009 | Farnworth et al. | |
| 2009/0288557 A1 | 11/2009 | Carati et al. | |
| 2010/0104500 A1 | 4/2010 | Holland | |
| 2010/0222204 A1 | 9/2010 | Frizon et al. | |
| 2010/0254890 A1 * | 10/2010 | Yang | B01J 20/103 423/592.1 |
| 2011/0073311 A1 | 3/2011 | Porcherie et al. | |
| 2011/0092363 A1 | 4/2011 | Seo et al. | |
| 2012/0007020 A1 | 1/2012 | Tarascon et al. | |
| 2012/0227584 A1 | 9/2012 | Wang et al. | |
| 2012/0235073 A1 | 9/2012 | Seo et al. | |
| 2012/0280171 A1 * | 11/2012 | Belharouak | H01M 4/485 252/182.1 |
| 2013/0019780 A1 | 1/2013 | Karimi et al. | |
| 2013/0052126 A1 | 2/2013 | Wang | |
| 2013/0055924 A1 | 3/2013 | Seo et al. | |
| 2013/0071737 A1 | 3/2013 | Belharouak et al. | |
| 2013/0137010 A1 | 5/2013 | Aitken et al. | |
| 2013/0153830 A1 | 6/2013 | Seo et al. | |
| 2014/0342156 A1 | 11/2014 | Seo et al. | |
| 2016/0168032 A1 | 6/2016 | Seo et al. | |
| 2017/0137322 A1 | 5/2017 | Seo | |
| 2017/0173555 A1 | 6/2017 | Seo et al. | |

FOREIGN PATENT DOCUMENTS

| | | |
|---|---|---|
| EP | 454239 | 10/1991 |
| EP | 0497966 | 8/1992 |
| EP | 497466 | 8/1995 |
| EP | 1230008 | 8/2002 |
| EP | 2758355 | 7/2014 |
| EP | 3154917 A1 | 4/2017 |
| JP | 2003206112 | 7/2003 |
| KR | 1020010082910 | 8/2001 |
| KR | 1020010107049 | 12/2001 |
| WO | WO99032218 | 7/1999 |
| WO | WO0128675 | 4/2001 |
| WO | WO2004018090 | 4/2004 |
| WO | WO2005019130 | 3/2005 |
| WO | WO2005054340 | 6/2005 |
| WO | WO2007064053 | 6/2007 |
| WO | WO2007129991 | 11/2007 |
| WO | WO2008124343 | 10/2008 |
| WO | WO2009050196 | 4/2009 |
| WO | WO2009140030 | 11/2009 |
| WO | WO2011016910 | 4/2011 |
| WO | WO2011068830 | 6/2011 |
| WO | WO2012018890 | 2/2012 |
| WO | WO2013044016 | 3/2013 |
| WO | WO2013163010 A1 | 10/2013 |
| WO | WO2015006010 | 1/2015 |
| WO | WO2015191817 | 12/2015 |
| WO | WO2015191962 | 12/2015 |

OTHER PUBLICATIONS

Komnitsas et al. "Geopolymerisation: A review and prospects for the minerals industry" Minerals Engineering 20 (2007), pp. 1261-1277.

Provis et al. "Do Geopolymers Actually Contain Nanocrystalline Zeolites? A Reexamination of Existing Results" Chem. Mater. 17, 2005, pp. 3075-3085.

Thomas et al. "Amorphous Zeolites" Angew. Chem. Inr. Ed. Engl. 19 (1980) No. 9, pp. 745-746.

Bell et al. "Nano- and Microporosity in Geopolymer Gels" Microsc Microanal 12 (Supp 2), 2006, pp. 552-553.

W. M. Kriven, "Inorganic Polysialates or 'Geopolymers'" American Ceramic Society Bulletin, May 2010, vol. 89, No. 4, pp. 31-34.

Kriven et al., "Microstructure and nanoporosity of as-set geopolymers" Ceramic Engineering and Science Proceedings 2007, vol. 27, Issue 2, pp. 491-503.

Joseph Davidovits, "Geopolymer Chemistry and Applications" Jun. 2008, Chapter 1, 16 pages.

Joseph Davidovits, Geopolymer Chemistry and Applications, 3rd Edition, Jul. 2011, pp. 1-33.

(56) References Cited

OTHER PUBLICATIONS

A.S. Wagh, "Chemically Bonded Phosphate Ceramics—A Novel Class of Geopolymers," Ceramic Transactions 2005, vol. 165, 12 pages.

Nedelec, J.M., "Sol-Gel Processing of Nanostructured Inorganic Scintillating Materials", Journal of Nanomaterials, vol. 2007, Article ID 36392, 8 pages, 2007.

Sivashanmugam, A. et al., "Glycine-Assisted Sol-Gel Combustion Synthesis and Characterization of Aluminum-Doped LiNiVO4 for Use in Lithium-Ion Batteries", Journal of the Electrochemical Society, vol. 153, No. 3, A497-A503, 2006.

Ju Dong-Ying et al., "Low-temperature sintering method for NiCuZn ferrite and effects of Mn addition on electromagnetic properties", Transactions of Nonferrous Metals Society of China, vol. 16, Supplement 1, pp. s67-s70, Jun. 2006.

Rolison, D. R. et al., "Electrically conductive oxide aerogels: new materials in electrochemistry", Journal of Materials Chemistry, vol. 11, pp. 963-980, 2001.

Zhang et al., "Mesostructured Forms of $\gamma$-Al2O3", J. Am. Chem. Soc. 124, pp. 1592-1593 (2002).

Baumann, Theodore F. et al., "Synthesis of High-Surface-Area Alumina Aerogels without the Use of Alkoxide Precursors", Chem. Mater., vol. 17, No. 2, pp. 395-401, 2005.

Kübel, Christian et al., "Recent Advances in Electron Tomography: TEM and HAADF-STEM Tomography for Materials Science and Semiconductor Applications", Microscopy and Microanalysis, vol. 11, pp. 378-400, 2005.

Kwak, Ja Hun et al., "Penta-coordinated Al3+ ions as preferential nucleation sites for BaO on $\gamma$-Al2O3: An ultra-highmagnetic field 27Al MAS NMR study", Journal of Catalysis, vol. 251, pp. 189-194, 2007.

Boettcher, Shannon W. et al., "Harnessing the Sol-Gel Process for the Assembly of Non-Silicate Mesostructured Oxide Materials", Accounts of Chemical Research, vol. 40, No. 9, pp. 784-792, 2007.

Zürner, Andreas et al., "Visualizing single-molecule diffusion in mesoporous materials", Nature, vol. 450, pp. 705-709, Nov. 29, 2007.

Iancu, Nora et al.,"Low-temperature synthetic method for size-controlled CdSe nanocrystals: utilization of boron selenide", Chem. Commun. 20, pp. 2298-2299, 2004.

Richard S, Ryan et al., "Consolidation of Metal Oxide Nanocrystals. Reactive Pellets with Controllable Pore Structure That Represent a New Family of Porous, Inorganic Materials", Journal of American Chemical Society, vol. 122, No. 20, pp. 4921-4925, 2000.

Mulik, Sudhir et al., "Time-Efficient Acid-Catalyzed Synthesis of Resorcinol-Formaldehyde Aerogels", Chem. Mater., vol. 19, No. 25, pp. 6138-6144, 2007.

Villemin, Didier et al., "A one step process for grafting organic pendants on alumina via the reaction of alumina and phosphonate under microwave irradiation", Chem. Commun. 2001, pp. 2060-2061, 2001.

Laine et al. "Making Nanosized Oxide Powders From Precursors by Flame Spray Pyrolysis". Key Engr Matl. 159-160 pp. 17-24. 1999.

Schuyten et al. "A Novel Combustion Synthesis Preparation of CuO/ZnO/ZrO2/Pd for Oxidative Hydrogen Production from Methanol" Catal Lett (2008) 121:189-198.

T. Mahata, G. Das, R.K. Mishra, B.P. Sharma, Combustion synthesis of gadolinia doped ceria powder, Journal of Alloys and Compounds, vol. 391, Issues 1-2, Apr. 5, 2005, pp. 129-135.

Lee et al. "Recent Progress in the Synthesis of Porous Carbon Materials" Advanced Materials (Weinheim, Germany) (2006), 18(16), pp. 2073-2094.

Pek et al., "A thixotropic nancomposite gel for three-dimensional cell culture" Nature Nanotechnology (2008), 3(11), pp. 671-675.

Morris et al., "Silica Sol as a Nanoglue: Flexible Synthesis of Composite Aerogels" Science (Washington, D.C.) 1999, 284, (5414), pp. 622-624.

Aguado-Serrano et al., "Silica/C composites prepared by the sol-gel method. Influence of the synthesis parameters on textural characteristics", Microporous and Mesoporous Materials. 74, pp. 111-119 (2004).

Aguado-Serrano et al., "Surface and catalytic properties of acid metal-carbons prepared by the sol-gel method", Applied Surface Science. 252, pp. 6075-6079 (2006).

Boffa et al., "Preparation of templated mesoporous silica membranes on macroporous a-alumina supports via direct coating of thixotropic polymeric sols", Microporous and Mesoporous Materials. 100, pp. 173-182 (2007).

Bruno et al., "Characterization of monolithic porous carbon prepared from resorcinol/formaldehyde gels with cationic surfactant", Colloids and Surfaces A: Physicochemical and Engineering Aspects. 358, pp. 13-30 (2010).

Capadona et al., "A versatile approach for the processing of polymer nanocomposites with selfassembled nanofibre templates", Nature Nanotechnology. 2, pp. 765-769 (2007).

Han et al., "The effect of silica template structure on the pore structure of mesoporous carbons", School of Chemical Engineering, Seoul National University, Carbon. 41, pp. 1049-1056 (2003).

Leventis et al., "One-Pot Synthesis of Interpenetrating Inorganic/Organic Networks of CuO/Resorcinol—Formaldehyde Aerogels: Nanostructured Energetic Materials", J. Am. Chem. Soc. 131, pp. 4576-4577 (2009).

Moreno-Castilla et al., "Synthesis and surface characteristics of silica- and alumina-carbon composite xerogels", Phys. Chem. Chem. Phys. 2, pp. 4818-4822 (2000).

Capadona et al., "X-Aerogel Processing Time Reduced by One-Pot Synthesis" http://www.grc.nasa.gov/WWW/RT/2006/RX/RX20P-capadona1.html, retrieved on Jul. 26, 2013 (last updated Dec. 14, 2007), 4 pages.

PCT Officer Lee W. Young, International Search Report and Written Opinion of International Application No. PCT/US2014/042053, dated Feb. 24, 2015, 16 pages.

J. Aleman et al., "Definitions of Terms Relating to the Structure and Processing of Sols, Gels, Networks, and Inorganic-Organic Hybrid Materials," Pure and Applied Chemistry, vol. 79, No. 1, 2007, pp. 1801-1829.

Robert L. Burwell, Jr. "Manual of Symbols and Terminology for Physicochemical Quantities and Units—Appendix II. Definitions, Terminology and Symbols in Colloid and Surface Chemistry. Part II: Heterogeneous Catalysis," Pure and Applied Chemistry, vol. 46, 1976, pp. 71-90.

C. H. Christensen et al., "Mesoporous zeolite single crystal catalysts: Diffusion and catalysis in hierarchical zeolites" Catalysis Today 128, 2007, pp. 117-122.

N.-L. Michels et al., "Hierarchically Structured Zeolite Bodies: Assembling Micro-, Meso-, and Macroporosity Levels in Complex Materials with Enhanced Properties" Adv. Funct. Mater. 22, 2012, pp. 2509-2518.

D. P. Serrano et al., "Synthesis strategies in the search for hierarchical zeolites" Chemical Society Reviews 42, 2013, pp. 4004-4035.

L. Gueudré et al, "Diffusion in zeolites: is surface resistance a critical parameter?" Adsorption 16, 2010, pp. 17-27.

O. Cheung et al., "Adsorption kinetics for $CO_2$ on highly selective zeolites NaKA and nano-NaKA" Applied Energy 112, 2013, pp. 1326-1336.

A. L. Mayers et al., "Thermodynamics of Mixed-Gas Adsorption" A.I.Ch.E. Journal, vol. 11, No. 1, Jan. 1965, pp. 121-127.

O. Cheung et al., "Silicoaluminophosphates as $CO_2$ sorbents" Microporous Mesoporous Materials 156, 2012, pp. 90-96.

Gresham, Dr. Robert M., contributing editor, "Viscosity: A fluid's resistance to flow," Tribology & Lubrication Technology, Nov. 2008, pp. 55-57.

Le-Ping L et al, "Preparation phosphoric acid-based porous geopolymers," Applied Clay Science, vol. 50, No. 4, Dec. 1, 2010, pp. 600-603.

Hasan, F. A. et al., "Zeolite monoliths with hierarchical designed pore network structure: Synthesis and performance," Chemical Engineering Journal, Mar. 7, 2013 (Online), vol. 223, pp. 48-58.

(56) References Cited

OTHER PUBLICATIONS

Zhang, J. et al., "Synthesis of a self-supporting faujasite zeolite membrane using geopolymer gel for separation of alcohol/water mixture," Materials Letters, Nov. 9, 2013 (Online), vol. 116, pp. 167-170.

Akhtar, F. et al., "Colloidal processing and CO2 capture performance of sacrificially templated zeolite monoliths", Applied Energy, Jan. 13, 2012 (Online), vol. 97, pp. 289-296.

PCT Officer Yukari Nakamura, International Preliminary Report on Patentability of International Application No. PCT/US2014/042053, dated Dec. 30, 2015, 8 pages.

PHR Borges et al., "Andreasen Particle Packing Method on the Development of Geopolymer Concrete for Civil Engineering", J. Mater. Civ. Eng. 26 (2014) 692-697.

K De Weerdte, "Geopolymers—State of the art", COIN Project report No. 37, 2011, 39 pages.

D Medpelli, "New Nanostructured Aluminosilicates from Geopolymer Chemistry", PhD Thesis, Arizona State University, Tempe, Arizona, May 2015, 192 pages.

C Montes et al., "Statistical software to improve the accuracy of geopolymer concrete mix design and proportioning", 2013 World of Coal Ash (WOCA) Conference—Apr. 22-25, 2013 in Lexington, KY, 9 pages.

A Poulesquen et al. "Rheological behavior of alkali-activated metakaolin during geopolymerization", Journal of Non-Crystalline Solids 357 (2011) 3565-3571.

M Romagnoli et al., "Rheology of geopolymer by DOE approach", Construction and Building Materials 36 (2012) 251-258.

K Shotri, Dynamic Mechanical Properties of Geopolymer-Polymer Composites, MSc thesis, Center for Materials Science and Engineering, Rochester Institute of Technology, New York, 2006, 86 pages.

\* cited by examiner

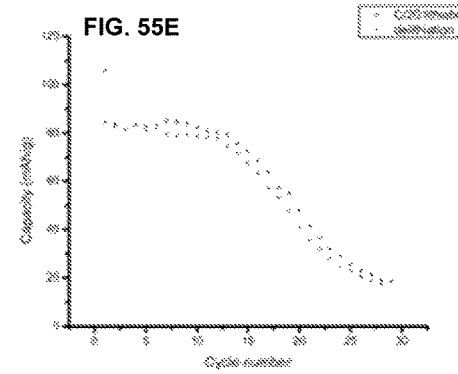
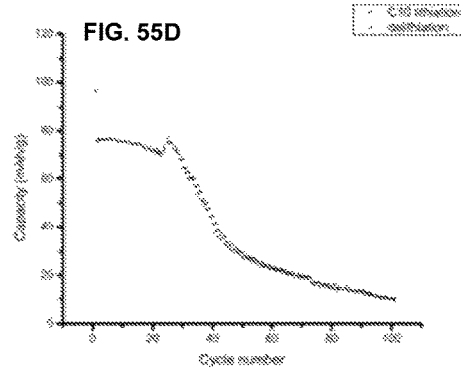
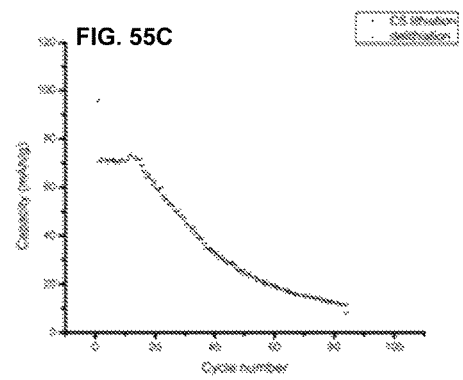
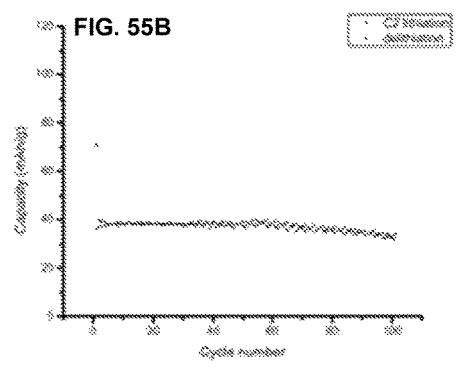
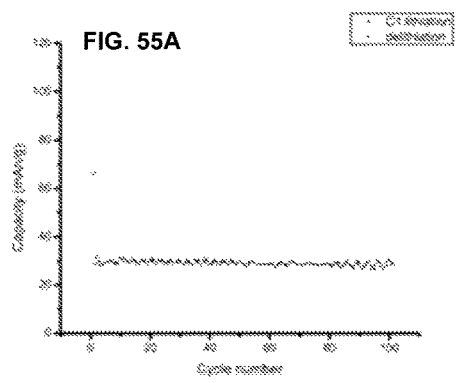

METAL OXIDES FROM ACIDIC SOLUTIONS

CROSS-REFERENCE TO RELATED APPLICATIONS

This application is a U.S. National Phase Application of International Patent Application No. PCT/US2014/042053 filed Jun. 12, 2014, which claims priority to U.S. Application Ser. No. 61/837,992 entitled "METAL OXIDES FROM ACIDIC SOLUTIONS" and filed Jun. 21, 2013, the entirety of both of which are incorporated by reference herein.

STATEMENT OF GOVERNMENT INTEREST

This invention was made with government support under DE-SC0001016 awarded by the Department of Energy. The government has certain rights in the invention.

TECHNICAL FIELD

This application relates to metal oxide materials and methods of producing the same, particularly metal oxide materials including a transition metal.

BACKGROUND

Metal oxides have long generated technological and industrial interest because of their very diverse properties (optical, electrical, magnetic, etc.), combined with their overall characteristics of hardness, thermal stability and chemical resistance. Materials with high ion mobility have a promising future as solid electrolytes and cathodes for batteries. In addition, metal oxides, most specifically transition metal oxides, belong to a class of widely used catalysts. They exhibit acidic or basic properties, which make them appropriate as catalysts or catalyst supports.

Various techniques are used in the production of oxide materials. Precipitation and co-precipitation of ions from solutions have been used for many years in most industrial production of fine powders for ceramics or catalyst supports. Precipitation is the result of a process of inorganic polycondensation involving the hydrolysis of metal ions in solution and the condensation of hydroxylated complexes. Hydrolysis, condensation and complexation reactions of cations in aqueous solution are the phenomena involved in the formation of the solid by precipitation.

Sol-gel processes are a precipitation-based synthetic method of metal oxides in which a network is formed throughout the body of a solution of a metal (e.g., in the form of or derived from a salt or complex) by a progressive change of the solution into a gel (colloidal solution of hydrous metal oxide nanoparticles), then in most cases to a dry network. In comparison to other precipitation-based synthetic methods in which solid particles are precipitated and separated from the solution, sol-gel processes can be advantageous because the chemical composition of the products can be controlled more conveniently due to the nominal composition relatively homogeneous throughout the gel structure.

The acidity of the precursor solution influences gel formation, as it determines the nature of the predominant species of the metal complexes and the mechanism of hydrolysis and polycondensation. Conventionally, sol-gel processes are initiated/controlled by purposely changing pH of the precursor solution.

Inorganic salts and complexes of transition metals, especially the early transition metals (e.g., the metals of Groups 3 to 6) and of Group 13 metals (e.g., B and Al) are distinguished from others by greater chemical reactivity resulting from the lower electronegativity of the metals and their ability to exhibit several coordination states, so that coordination expansion occurs spontaneously upon reaction with water or other nucleophilic reagents. These characteristics lead to rapid or uncontrollable hydrolysis and/or polycondensation of the metal ions in an aqueous solution, hindering formation of a gel. In order to inhibit the premature uncontrolled precipitation, organic chelators such as citrates, acetonates or oxalates have been used to form polymeric gel precursors. Inorganic competing ions such as oxyanions or metal ions are known to slow the polycondensation rate to achieve the uniformity of gel formation throughout the solution.

SUMMARY

This specification describes technologies relating to producing metal oxides, more specifically metal oxides containing at least one transition metal element, as well as the metal oxides produced by these technologies.

As described herein, metal oxides are produced by forming a semi-liquid, semi-solid or solid from an acidic solution containing at least one metal (e.g., in the form of or derived from a metal salt or complex) and at least one strong acid, without increasing the pH significantly.

In one aspect, preparing a material includes providing an acidic solution containing at least one metal and at least one acid of oxyanion so that the material includes in its chemical structure the metal and at least one oxyanion, polyoxoanion, or polyoxyanion ligand.

In another aspect, preparing a material includes providing an acidic solution containing at least one metal and at least two different acids of oxyanions so that the material includes in its chemical structure the metal and at least two different oxyanion, polyoxoanion, or polyoxyanion ligands.

In another aspect, preparing a material includes providing a strong acid, at least one transition metal and a metal-stabilizing agent in an aqueous solution. The metal-stabilizing agent typically does not contain metal. In some cases, the metal-stabilizing agent decomposes at temperatures no higher than the boiling point of water while achieving uniformity of the semi-liquid, semi-solid or solid formation throughout the acidic solution. In some cases, the decomposition of the metal-stabilizing agent generates oxygen gas bubbles in the acidic solution which allows formation of pores in the semi-liquid, semi-solid or solid.

Another aspect is that optionally, additional chemicals can be added in the acidic solution to control or modify the structural properties, chemical properties, or both of the products of the process. The addition of a chemical may cause the acidic solution to become a slurry. The acidic solution is then treated so that the acidic solution becomes a semi-liquid, semi-solid or solid without increasing the pH significantly. In some cases, the acidic solution is treated to decompose the metal-stabilizing agent so that the acidic solution becomes a semi-liquid, semi-solid or solid without increasing the pH significantly. The concentration of the metal, the strong acid, or both is chosen to be significantly high so that the treatment of the acidic solution leads to formation of a semi-liquid, semi-solid or solid. It is subsequently treated to produce a product. The resulting metal oxides may have the empirical formula $H_xM_2A^1{}_yA^2{}_z$, where: M represents a transition metal or any combination of (e.g., two or more different) transition metals in Groups 3-12; $A^1$ is a first oxyanion; $A^2$ is a second oxyanion; $0 \le x \le 3$; $0 \le y \le 3$;

$0 \leq z \leq 3$; and $y+z>0$. In some cases, $A^1$ and $A^2$ are the same oxyanion. Alternatively, $A^1$ and $A^2$ are independently selected from the group consisting of borate, nitrate, phosphate, sulfate, chromate, arsenate, molybdate, tungstate, aluminate, and silicate. In certain cases, $A^1$ and $A^2$ are independently selected from the group consisting of sulfate and phosphate. In one example, $A^1$ is sulfate, $A^2$ is phosphate, and $y+z=3$. In another example, $A^1$ is sulfate, $A^2$ is phosphate, and $0<x\leq 3$. M is a combination of two or more transition metals including, for example, scandium, titanium, vanadium, manganese, iron, cobalt, nickel, copper, zinc, and zirconium. M may include, for example, titanium and one or more metals such as scandium, vanadium, manganese, iron, cobalt, nickel, copper, and zinc.

In another aspect, the new metal oxides have a Sodium Super Ion Conductor type framework (NaSICON-type framework). In another aspect, the new metal oxides include metal oxides that comprise both $PO_4$ and $SO_4$ oxyanions, have a NaSICON-type framework structure and can be produced in the absence of alkali and/or alkaline earth metal cations. In some cases, the new metal oxides have a chemical composition of $H_xM_2(PO_4)_{3-z}(SO_4)_{z'}$ ($0 \leq x \leq 3$; M=transition metals or their combinations; $0 \leq z \leq 3$; $0 \leq z' \leq 3$) and have a NaSICON-type framework structure. In some cases, the new metal oxides have a chemical composition of $H_xM_2(PO_4)_{3-z}(SO_4)_{z'}$ ($0 \leq x \leq 3$; M=Ti, Zr; $0 \leq z \leq 3$; $0 \leq z' \leq 3$) and have a NaSICON-type framework structure. In some case, the new metal oxides have a chemical composition of $H_xTi_{2-y}M_y(PO_4)_{3-z}(SO_4)_{z'}$ ($0 \leq x \leq 3$; M=Sc, Ti, V, Cr, Mn, Fe, Co, Ni, Ni, Cu, Zn; $0<y\leq 2$; $0 \leq z \leq 3$; $0 \leq z' \leq 3$) and have a NaSICON-type framework structure.

The metal oxides can be used as a battery material. The metal oxides can be used as a proton conductor. The metal oxides can be used as a Brønsted solid acid or a Lewis solid acid. The metal oxides can be used as a catalyst or catalyst support. The metal oxides can be used as an ion-exchanger. The metal oxides can be used as a gas absorber or water absorber.

Implementations may include one or more of the following features. In some implementations, the acidic solution can include one or more compounds selected from the group consisting of: compounds including a metal, transition metal, semimetal, metalloid or semiconductor; inorganic salts; inorganic salt adducts; organometallic compounds; and alkoxides of metals, transition metals, semi-metals, metalloids, and/or semi-conductors.

In some implementations, the acidic solution can include sulfuric acid, phosphoric acid, nitric acid, hydrochloric acid, or perchloric acid. In some implementations, the concentration of the strong acid is controlled so that the pH of the acidic solution is not higher than 2. In some implementations, the concentration of the acid is controlled so that the pH of the acidic solution is not higher than 1. In some implementations, the oxyanion of the acids may be incorporated in the product, the new material, or both. In some implementations, the oxyanion of the acids may thermally decompose.

In some implementations, the acidic solution can include a metal-stabilizing agent that decomposes at temperatures below the boiling point of water, generating oxygen gas. In some cases, the metal-stabilizing agent includes hydrogen peroxide, inorganic peroxide/peroxy acid, or organic peroxide.

In some implementations, additional chemicals (additives) are included in the acidic solution and subsequently the acidic solution is treated to produce a semi-liquid, semi-solid or solid. The applicable additional chemicals should not change or increase the pH of the solution greatly. In some cases, the pH remains no higher than 2. In some cases, the pH remains no higher than 1.

In some implementations, additional chemicals can include one or more compounds selected from the group consisting of: compounds including a metal, transition metal, semimetal, and/or metalloid; inorganic compounds, inorganic salts; inorganic salt adducts; organometallic compounds; and alkoxides of metals, semi-metals, metalloids, and/or semi-conductors; inorganic acids; acids of oxyanions; phosphoric acid, sulfuric acid, hydrochloric acid, nitric acid, hydrofluoric acid, perchloric acid, boric acid, silicic acid, molybdic acid ($H_2MoO_4$ or an aqueous solution of $MoO_3$), tungstic acid ($H_2WO_4$ or an aqueous solution of $WO_3$), or a combination thereof; salts of oxyanions; salts of sulfate, chloride, ammonium, nitrate, fluoride, perchlorate, borate, aluminate, silicate, molybdate, or tungstate ions or a combination thereof.

In some implementations, the additional chemicals can be a carbon-forming agent which provides carbon upon pyrolysis. The carbon-forming agent can include one or more compounds selected from the group consisting of carbon-containing compounds, sugars, glucose, resorcinol, formaldehyde, phenol, polymerizable carbon-containing compounds, monomers, oligomers, macromers, polymers, hydroxyl-substituted benzenes, furfuryl alcohol, carbohydrates, cellulose, or a combination thereof.

In some implementations, the addition of the additional chemicals may turn the solution into a viscous slurry. The slurry acidic solution is then treated so that the whole body of the slurry solution becomes a semi-liquid, semi-solid or solid. In some implementations, the concentration of the metal, the strong acid, or both is significantly high so that the slurry is viscous and does not yield a precipitate. In some cases, the concentration of the metal, the strong acid, or both is significantly high so that the treatment of the acidic solution allows formation of a semi-liquid, semi-solid or solid.

Treating the acidic solution can include heating the acidic solution to a temperature no higher than boiling point of water. In some implementations, treating the acidic solution can include air-drying, spray-drying, hot-oil immersion drying, freeze-drying, supercritical drying, or a combination thereof. In some cases, treating the acidic solution promotes decomposition of the metal-stabilizing agent and conversion of the acidic solution to a semi-liquid, semi-solid or solid.

In some implementations, the semi-liquid, semi-solid or solid is porous. The pores of the semi-liquid, semi-solid or solid are typically created by the oxygen gas bubbles produced by decomposition of the metal-stabilizing agent.

In some cases, an inorganic or organic component is combined with the semi-liquid, semi-solid or solid to yield another semi-liquid, semi-solid or solid. In some implementations, combining an organic or inorganic component with the semi-liquid, semi-solid or solid includes mixing the organic or aqueous solution with the semi-liquid, semi-solid or solid and removing the solvent sufficiently by drying or solvent evaporation. In some cases, combining an organic or inorganic component with the semi-liquid, semi-solid or solid includes mechanical mixing of the organic or inorganic component with the semi-liquid, semi-solid or solid.

The semi-liquid, semi-solid or solid may be treated to yield a product. In some implementations, treating the semi-liquid, semi-solid or solid includes removing at least one component of the semi-liquid, semi-solid or solid by washing with a liquid. In some cases, treating the semi-liquid, semi-solid or solid includes heating the semi-liquid, semi-solid or solid. In some cases, treating the semi-liquid, semi-solid or solid includes calcining the semi-liquid, semi-solid or solid in air or in a controlled gas flow. In some cases, treating the semi-liquid, semi-solid or solid promotes decomposition of at least one component of the semi-liquid, semi-solid or solid.

The product may be treated to yield a new material. In some implementations, treating the product includes removing at least one component of the product by washing the product with a liquid. In some cases, treating the product includes heating the product. In some cases, treating the product includes calcining the product in air or in a controlled gas environment. In some cases, treating the product promotes decomposition of at least one component of the product.

In some implementations, treating the product results in a chemical change of the product. In some cases, treating the product induces reduction or oxidation of at least one component of the product. In some cases, treating the product includes intercalation. In some cases, treating the product includes ion exchange.

In some implementations, treating the product yields a composite material as the new material. In some cases, the composite material is granules, beads or pellets that contain the product with a binder or a supporting material. In some cases, the composite material is a film or a coating material that contains the product and a binder. The binder or the supporting material can be an inorganic metal oxide. The binder can be a polymer. The binder can be an electron conducting polymer or an ion conducting polymer. The binder can be a proton conducting polymer. The binder can be a polymer that contains an acidic moiety. In some cases, the composite material is a mixture of the product with a conducting material.

In some implementations, the product, the new material, or both are porous. In some cases, the product, the new material, or both are nanoporous. In some cases, the product, the new material, or both are mesoporous. In some cases, the product, the new material, or both are hierarchically porous. In some implementations, the product, the new material, or both are monolithic. In some implementations, the product, the new material, or both are powders, particulates or beads. In some implementations, the product, the new material, or both are in the form of films or coatings.

In some implementations, the product, the new material, or both are metal oxides or mixed metal oxides. In some implementations, the product, the new material, or both are metal oxides or mixed metal oxides with carbon or carbonaceous material. In some cases, the product, the new material, or both are aggregates of metal oxide nanoparticles or microparticles. In some cases, the product, the new material, or both are aggregates of metal oxide nanoparticles mixed with carbon or carbonaceous material. In some cases, the product, the new material, or both are aggregates of metal oxide nanoparticles coated with carbon or carbonaceous material.

In some cases, the metal oxide is binary or pseudo-binary. In some cases, the metal oxide is multinary. In some cases, the metal oxide is a transition metal oxide or mixed transition metal oxides. In some cases, the metal oxide is a transition metal oxide or mixed transition metal oxides containing oxyanions, polyoxyanions, polyoxoanions, or a combination thereof. In some cases, the metal oxide is a transition metal oxide or mixed transition metal oxides containing oxyanions, polyoxyanions, polyoxoanions, or a combination thereof, containing an element in Group 13, 14, 15 or 16 or a combination thereof. In some cases, the metal oxide is a transition metal oxide containing the oxyanions, polyoxyanions, polyoxoanions, or a combination thereof of boron, aluminum, silicon, germanium, phosphorous, arsenic, antimony, sulfur, selenium, tellurium, chlorine, bromine, iodine or a combination thereof. In some cases, the metal oxide is a transition metal oxide or mixed transition metal oxides containing tetrahedral oxyanions containing a transition metal element in Group 6 or 7, or a combination thereof. In some cases, the metal oxide is a transition metal oxide or mixed transition metal oxides containing tetrahedral oxyanions, polyoxyanions or polyoxoanions containing Mo or W, or a combination thereof. In some cases, the metal oxide is a transition metal oxide or mixed transition metal oxides containing in their chemical structure hydrogen ions having a partially positive charge based on Pauling's electronegativity scale. In some cases, the metal oxide is a transition metal oxide or mixed transition metal oxides containing structural hydroxyl ions. In some cases, the metal oxide contains at least one alkali, alkaline earth metal or rare earth metal element. In some cases, the metal oxide is a transition metal oxide or mixed transition metal oxides containing at least one alkali, alkaline earth metal or rare earth metal element. In some cases, the metal oxide contains at least two different oxyanion, polyoxyanion or polyoxoanion ligands in its chemical structure.

In some implementations, the product, the new material, or both contain a metal oxide of Group 4 elements. In some cases, the product, the new material, or both contain a metal oxide of Ti. In some cases, the product, the new material, or both contain a metal oxide of Zr.

In some implementations, the product, the new material, or both are Brønsted solid acids or Lewis solid acids. In some implementations, the product, the new material, or both contain exchangeable protons in its chemical structure. In some implementations, the product, the new material, or both contain structural hydroxyl ions.

In some implementations, the product, the new material, or both can undergo intercalation or ion exchange.

In some implementations, the product, the new material, or both are proton conductors, acid catalysts, or battery materials.

In some aspects, a rechargeable battery material formed by methods or includes the product or new material described herein. In certain aspects, a rechargeable battery includes the metal oxide formed by methods or includes the product or new material described herein. The rechargeable battery may be, for example, a lithium- or sodium-based battery.

The details of one or more implementations of the specification are set forth in the accompanying drawings and the description below. Other features, aspects, and advantages of the specification will become apparent from the description, the drawings, and the claims.

DESCRIPTION OF THE DRAWINGS

FIGS. 55A-55E show the capacities vs. cycle number of the ball-milled product formed in Example 45, cycled at various rates.

DETAILED DESCRIPTION

Methods for producing metal oxides from acidic solutions containing at least one metal (e.g., in the form of or derived from a metal salt or complex) are described. As used herein, a "metal oxide" is a compound having an extended network of metal ions coordinated with oxide ions, hydroxide ions, oxyanions, polyoxyanions, polyoxoanions, or a combination thereof. A metal oxide can be crystalline or amorphous. As used herein, "metal" generally refers to a metal, semi-metal, or metalloid. Some of the metals are transition metals. As used herein, a "semi-liquid" is a substance or material having a viscosity and rigidity intermediate between that of a liquid and a solid. Examples of semi-liquids include jam and cake icing. As used herein, a "semi-solid" is a substance or material having a viscosity and rigidity intermediate between that of a solid and a liquid. A semi-solid can be a highly viscous liquid. Examples of semi-solids include a stiff dough or firm gelatin.

Figure 1:
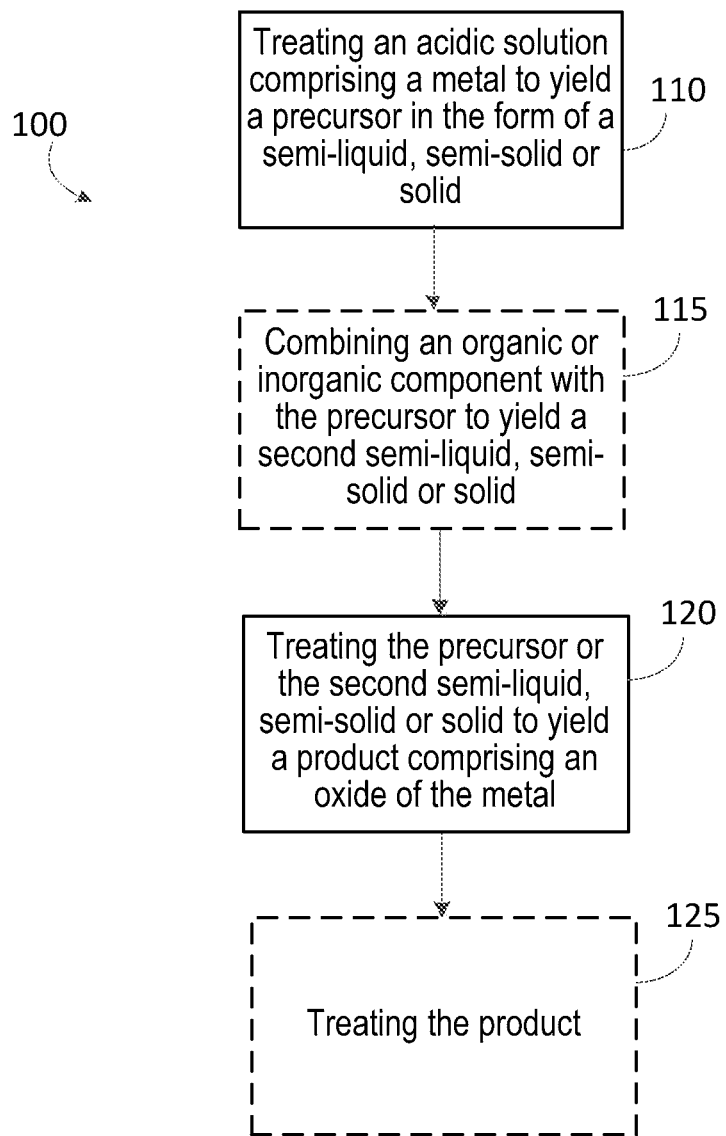
FIG. 1 is a flow chart that depicts a process for forming metal oxides.

FIG. 1 is a flow chart showing a process 100 for preparing metal oxides. In 110, an acidic solution containing at least one metal is treated to yield a semi-liquid, semi-solid, or solid. The metal may be in the form of or derived from a metal salt or complex. In some cases, the acidic solution contains two or more different metals, two or more salts or complexes of the same metal, or both. In some cases, the pH of the acidic solution is 2 or less. In certain cases, the pH of the acidic solution is 1 or less. In some cases, treating the acidic solution results in a pH change of 2 or less.

The acidic solution in 110 may include a strong acid such as, for example, sulfuric acid, phosphoric acid, nitric acid, hydrochloric acid, perchloric acid, or a combination thereof. In some cases, the acid is provided as a constituent of other components in the acidic solution. For example, sulfuric acid can be provided by dissolving titanyl sulfate salt which typically includes less than 17 wt % $H_2SO_4$ in addition to a stoichiometric titanyl sulfate compound ($TiOSO_4$).

In some implementations, the acidic solution in 110 contains at least one acid of an oxyanion. In some implementations, the acidic solution in operation 110 contains at least two different acids of oxyanions. In some implementations, the oxyanions of the acid or acids are incorporated in the product formed in 120, the new material formed in 125, or both. In some implementations, the oxyanion(s) of the acid(s) thermally decompose.

The metal in 110 may be in the form of or derived from one or more inorganic compounds, inorganic salts, organometallic compounds, or alkoxides of metals, semi-metals, or metalloids, such as Li, Na, K, Rb, Cs, Be, Mg, Ca, Sr, Ba, Al, Ga, In, Ge, Sn, Pb, As, Sb, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Sc, Y, Lu, La, Ce, Pr, Nd, Sm, Eu, Gd, Tb, Dy, Ho, Er, Tm, Yb, Th, U, Tl, Pb, Bi, or a combination thereof. Exemplary inorganic salts include titanyl sulfate ($TiOSO_4$) and ferric nitrate ($Fe(NO_3)_3$). Exemplary alkoxides of metals include titanium butoxide ($Ti(OC_4H_9)_4$).

In some implementations, the acidic solution in 110 includes a metal-stabilizing agent. The metal-stabilizing agent suppresses or partially suppresses precipitation of the metal from the acidic solution. The metal-stabilizing agent typically does not contain metal. In some cases, the metal-stabilizing agent decomposes at temperatures below the boiling point of water, generating oxygen gas. In some cases, the metal-stabilizing agent includes hydrogen peroxide, inorganic peroxide/peroxy acid, or organic peroxide. Exemplary inorganic peroxides include $Na_2O_2$ and ammonium persulfate (($NH_4$)$_2S_2O_8$). Exemplary inorganic peroxy acids include peroxydisulfuric acid ($H_2S_2O_8$). Organic peroxides are organic compounds containing the peroxide functional group (ROOR'). If R' is hydrogen, the compound is called an organic hydroperoxide. Peresters are another type of organic peroxides and have a general structure RC(O)OOR. Exemplary organic peroxides include meta-chloroperoxybenzoic acid (mCPBA) and benzoyl peroxide.

In some cases, one or more additives are combined with the acidic solution of 110 to modify the acidic solution before treating the acidic solution to yield the precursor. The additive may be an organic compound (e.g., a carbon-forming agent) or an inorganic compound (e.g., an inorganic salt or an organometallic compound). In some cases, modifying the acidic solution may result in a pH change of 2 or less.

Addition of the additives may turn the solution into a viscous slurry. Suitable additives include metals, transition metals, semimetals, and metalloids; inorganic salts; inorganic salt adducts; organometallic compounds; and alkoxides of metals, semi-metals, metalloids, and semi-conductors; inorganic acids; acids of oxyanions; salts of oxyanions, and any combination thereof. In some implementations, suitable additives include carbon-forming agents that yield carbon upon pyrolysis, such as carbon-containing compounds, sugars, glucose, resorcinol, formaldehyde, phenol, polymerizable carbon-containing compounds, monomers, oligomers, macromers, polymers, hydroxyl-substituted benzenes, furfuryl alcohol, carbohydrates, cellulose, and combination thereof. An example of an inorganic salt includes lithium nitrate. Examples of inorganic acids include phosphoric acid, sulfuric acid, hydrochloric acid, nitric acid, hydrofluoric acid, perchloric acid, boric acid, silicic acid, molybdic acid ($H_2MoO_4$ or an aqueous solution of $MoO_3$), and tungstic acid ($H_2WO_4$ or an aqueous solution of $WO_3$). Examples of salts of oxyanions include salts of sulfate, chloride, nitrate, fluoride, perchlorate, borate, aluminate, silicate, molybdate, and tungstate.

In some cases, treating the acidic solution includes heating the acidic solution to a temperature no higher than the boiling point of water at the instant conditions. In some cases, treating the acidic solution includes air-drying, spray-drying, hot-oil immersion drying, freeze-drying, supercritical drying, or a combination thereof. Treating the acidic solution causes the acidic solution to become a semi-liquid, semi-solid or solid without increasing the pH significantly. In some cases, treating the acidic solution promotes decomposition of the metal-stabilizing agent and conversion of the acidic solution to a semi-liquid, semi-solid or solid.

In some implementations, the semi-liquid, semi-solid or solid is porous. Some of the pores of the semi-liquid, semi-solid or solid are created by the oxygen gas bubbles produced by decomposition of the metal-stabilizing agent.

Optionally, in 115, an organic or inorganic component is combined with the semi-liquid, semi-solid or solid from 110 to yield a second semi-liquid, semi-solid or solid. The second semi-liquid, semi-solid or solid, may differ physically, chemically, or both from the semi-liquid, semi-solid or solid from 110.

In some implementations, combining an inorganic or organic component with the semi-liquid, semi-solid or solid from 110 includes mixing an organic or aqueous solution with the semi-liquid, semi-solid or solid from 110 precursor and removing the solvent by drying or solvent evaporation. Examples of suitable aqueous solutions include aqueous solutions of $Fe(NO_3)_3.9H_2O$ and $H_3PO_4$. In some cases, combining an organic or inorganic component with the semi-liquid, semi-solid or solid of 110 includes mechanical mixing of the organic or inorganic component with the semi-liquid, semi-solid or solid. Examples of the component include glucose, hydrogen peroxide urea adduct, furfuryl alcohol, $Fe(NO_3)_3.9H_2O$, carbon black and $LiNO_3$.

In 120, the semi-liquid, semi-solid or solid from 110 (the precursor) or 115 (the second semi-liquid, semi-solid or solid) is treated to form an oxide of the metal. Treating the semi-liquid, semi-solid or solid from 110 or 115 may include, for example, removing at least one component of the semi-liquid, semi-solid or solid by washing with a liquid; heating the semi-liquid, semi-solid or solid; calcining the semi-liquid, semi-solid or solid in air or in a controlled gas environment, or a combination thereof. In some cases, treating the semi-liquid, semi-solid or solid promotes decomposition of at least one component of the semi-liquid, semi-solid or solid.

The product of 120 is optionally treated in 125 to yield a new material. Treating the product may include, for example, removing at least one component from the product by washing the product with a liquid, heating the product, calcining the product in air or in a controlled gas flow, or a combination thereof. In some cases, treating the product promotes decomposition of at least one component of the product (e.g., a carbon-forming agent).

In some implementations, treating the product results in a chemical change, thereby yielding a new material. A chemical change may include, for example, reduction or oxidation of at least one component of the product, intercalation, ion exchange, or the like.

In some cases treating the product results in coating the surface or pore surface of the product, covalently cross-linking the product with organic or inorganic molecules or ions or both. In some cases, treating the product yields a composite material. In some cases, the composite material is granules, beads or pellets that contain the product with a binder or a supporting material. In some cases, the composite material is a film or a coating material that contains the product and a binder. A binder or a supporting material can be an inorganic metal oxide such as γ-alumina. A binder can be a polymer such as polystyrene and polytetrafluoroethylene (PTFE). A binder can be an electron conducting polymer or an ion conducting polymer. A binder can be a proton conducting polymer such as Nafion®. A binder can be a polymer that contains an acidic moiety such as sulfonic acid. In some cases, the composite material can be a mixture of the product with a conducting material such as carbon black.

In some implementations of process 100, the product of 120, the new material of 125, or both are porous (e.g., nanoporous, mesoporous, hierarchically porous, monolithic, or a combination thereof). In some implementations, the product, the new material, or both are in the form of powder, particulates, granules, beads or pellets. In some implementations, the product, the new material, or both are in the form of films or coatings.

In some implementations of process 100, the product, the new material, or both are metal oxides or mixed metal oxides. In some implementations, the product, the new material, or both are metal oxides or mixed metal oxides with carbon or carbonaceous material. In some cases, the product, the new material, or both are aggregates of metal oxide nanoparticles or microparticles. In some cases, the product, the new material, or both are aggregates of metal oxide nanoparticles mixed with carbon or carbonaceous material. In some cases, the product, the new material, or both is an aggregate of metal oxide nanoparticles coated with carbon or carbonaceous material.

In some cases, the metal oxide is binary or pseudo-binary. In some cases, the metal oxide is multinary. In some cases, the metal oxide is a transition metal oxide or mixed transition metal oxide. In some cases, the metal oxide is a transition metal oxide or mixed transition metal oxide containing oxyanions, polyoxyanions, polyoxoanions, or a combination thereof. In some cases, the metal oxide is a transition metal oxide or mixed transition metal oxide containing oxyanions or polyoxyanion containing an element in Group 13, 14, 15 or 16 or a combination thereof. In some cases, the metal oxide is a transition metal oxide containing the oxyanions, polyoxyanions, polyoxoanions, or a combination thereof with boron, aluminum, silicon, germanium, phosphorous, arsenic, antimony, sulfur, selenium, tellurium, chlorine, bromine, iodine or a combination thereof. In some cases, the metal oxide is a transition metal oxide or mixed transition metal oxide containing tetrahedral oxyanions with a transition metal element in Group 6 or 7, or a combination thereof. In some cases, the metal oxide is a transition metal oxide or mixed transition metal oxide containing tetrahedral oxyanions, polyoxyanions, polyoxoanions, or a combination thereof with Mo or W, or a combination thereof. In some cases, the metal oxide is a transition metal oxide or mixed transition metal oxide containing hydrogen ions having a partially positive charge based on Pauling's electronegativity scale. In some cases, the metal oxide is a transition metal oxide or mixed transition metal oxide containing structural hydroxyl ions. In some cases, the metal oxide contains at least one alkali, alkaline earth metal or rare earth metal element. In some cases, the metal oxide is a transition metal oxide or mixed transition metal oxide containing at least one alkali, alkaline earth metal or rare earth metal element. In some cases, the metal oxide contains at least two different oxyanion, polyoxyanion, or polyoxoanion ligands in its chemical structure.

In some implementations, the product, the new material, or both contain a metal oxide of Group 4 elements. In some cases, the product, the new material, or both contain a metal oxide of Ti. In some cases, the product, the new material, or both contain a metal oxide of Zr.

In some implementations of process 100, the product, the new material, or both are Brønsted solid acids or Lewis solid acids.

In some implementations of process 100, the product, the new material, or both contain exchangeable protons in their chemical structure. In some implementations of process 100, the product, the new material, or both contain structural hydroxyl ions.

In some implementations of process 100, the product, the new material, or both can undergo intercalation or ion exchange.

The metal oxides, composites, and materials described herein can be used in a variety of applications including, but not limited to, adsorbents, absorbents, nanoreactors, nanocontainers, nanocomposites, nanoelectrodes, catalysts, catalyst supports, oxidizing agents, reducing agents, filters, chromatography media, ion exchange materials, separation materials, magnetic separation materials, membranes, gas/liquid/fuel storage materials, electrodes, sensors, electrical materials, electronic materials, magnetic materials, microwave absorbers, microwave-assisted heating materials, bioimplants, structure reinforcing materials, construction materials, solar energy collectors, supercapacitors, pseudocapacitors, solar cell components, dielectrics, thermal insulation materials, sound insulation materials, fire retardants, paint thickeners, matting agents, packaging materials, refractories, additives, ink jet coatings, porous binders, porous fillers, ionic conductors, bioreactors, culture media, culture supports, bone replacement materials, active battery components, battery separators, thermal composites (e.g., porous materials impregnated with a thermal energy storage material, a phase change compound, a thermochemical energy storage material, or a magnetocaloric material), toxin removal materials, chemical removal materials, waste removal materials, hazard removal materials, chemical decontaminants, bioactive decontaminants, odor elimination materials, oil spill cleanup materials, arsenic removal materials, heavy metal removal materials, nuclear waste removal materials, energetic materials, evaporative chillers/heaters, aroma delivery materials, flavor delivery materials, drug delivery materials, sanitizer delivery materials, herbicide delivery materials, fungicide delivery materials, pesticide delivery materials, insecticide delivery materials, plant nutrient delivery materials, fertilizer materials, plant growing media, green roof materials, hydroponics support media, potting materials, animal nutrient delivery materials, human nutrient delivery materials, water purification materials, water desalination materials, capacitive deionization electrodes, soil stabilization materials, wetting agents, water absorption materials, water adsorption materials, water collection materials, water retention materials, humidity control materials, pet litter absorption materials, vapor sorption materials, gas sorption materials, oil sorption materials, oil extraction materials, algae oil nanofarming materials, selective solid-phase extraction materials, desiccants, proppant materials, hemostats, and the like.

In some cases, metal oxides described herein have the empirical formula $H_xM_2A^1_yA^2_z$, where: M represents one or more transition metals in Groups 3-12, $A^1$ is a first oxyanion, $A^2$ is a second oxyanion, $0 \le x \le 3$, $0 \le y \le 3$, $0 \le z \le 3$, and $y+z>0$. In some cases, $A^1$ and $A^2$ are the same oxyanion. Alternatively, $A^1$ and $A^2$ are independently selected from the group consisting of borate, nitrate, phosphate, sulfate, chromate, arsenate, molybdate, tungstate, aluminate, and silicate. In certain cases, $A^1$ and $A^2$ are independently selected from the group consisting of sulfate and phosphate. In one example, $A^1$ is sulfate, $A^2$ is phosphate, and $y+z=3$. In another example, $A^1$ is sulfate, $A^2$ is phosphate, and $0<x \le 3$. M represents two or more transition metals including, for example, scandium, titanium, vanadium, manganese, iron, cobalt, nickel, copper, zinc, and zirconium. In one example, M represents titanium and one or more metals such as scandium, vanadium, manganese, iron, cobalt, nickel, copper, and zinc.

In some cases, the metal oxides described herein have a framework structure analogous to the sodium zirconium phosphate silicate material named after its Na$^+$ superionic conducting (NaSICON) behavior. NaSICON-type framework structures are three-dimensional networks formed by corner-sharing of octahedral and tetrahedral units in NaSICON-type compounds. A general review of NaSICON-type metal oxides is given by N. Anantharamulu et al. in "A wide-ranging review on Nasicon type materials", *Journal of Materials Science*, 2011, 46, 2821-2837. In certain cases, the metal oxides described herein include metal oxides that include both $PO_4^{3-}$ and $SO_4^{2-}$ oxyanions, have a NaSICON-type framework structure and can be produced in the absence of alkali cations, alkaline earth metal cations, or both. In some cases, the metal oxides described herein have a chemical composition of $H_xM_2(PO_4)_{3-z}(SO_4)_{z'}$ ($0 \le x \le 3$; M represents one or more transition metals; $0 \le z \le 3$; $0 \le z' \le 3$) and have a NaSICON-type framework structure. In some cases, the metal oxides described herein have a chemical composition of $H_xM_2(PO_4)_{3-z}(SO_4)_{z'}$ ($0 \le x \le 3$; M=Ti, Zr; $0 \le z \le 3$; $0 \le z' \le 3$) and have a NaSICON-type framework structure. In some case, the metal oxides described herein have a chemical composition of $H_xTi_{2-y}M_y(PO_4)_{3-z}(SO_4)_{z'}$ ($0 \le x \le 3$; M=Sc, Ti, V, Cr, Mn, Fe, Co, Ni, Ni, Cu, Zn; $0<y \le 2$; $0 \le z \le 3$; $0 \le z' \le 3$) and have a NaSICON-type framework structure.

The metal oxides described herein can be used as a battery material. The metal oxides can be used as a proton conductor. The metal oxides can be used as a Brønsted solid acid or a Lewis solid acid. The metal oxides can be used as a catalyst or catalyst support. The metal oxides can be used as an ion-exchanger. The metal oxides can be used as a gas absorber or water absorber.

The following examples are provided for illustration. It should be appreciated by those of skill in the art that the techniques disclosed in the following examples are considered to be exemplary. However, those of skill in the art should, in light of the present disclosure, appreciate that many changes can be made in the specific embodiments that are disclosed without departing from the spirit and scope of this disclosure.

Examples

Figure 2:
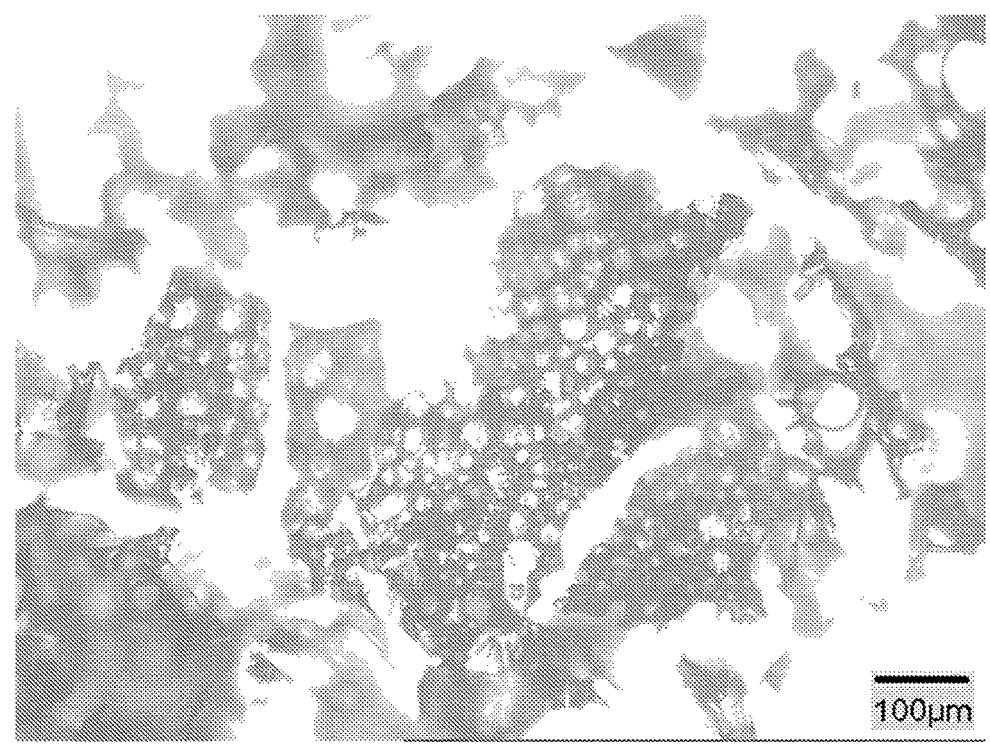
FIG. 2 shows an optical microscope image of the semi-solid formed in Example 1.
Figure 3:
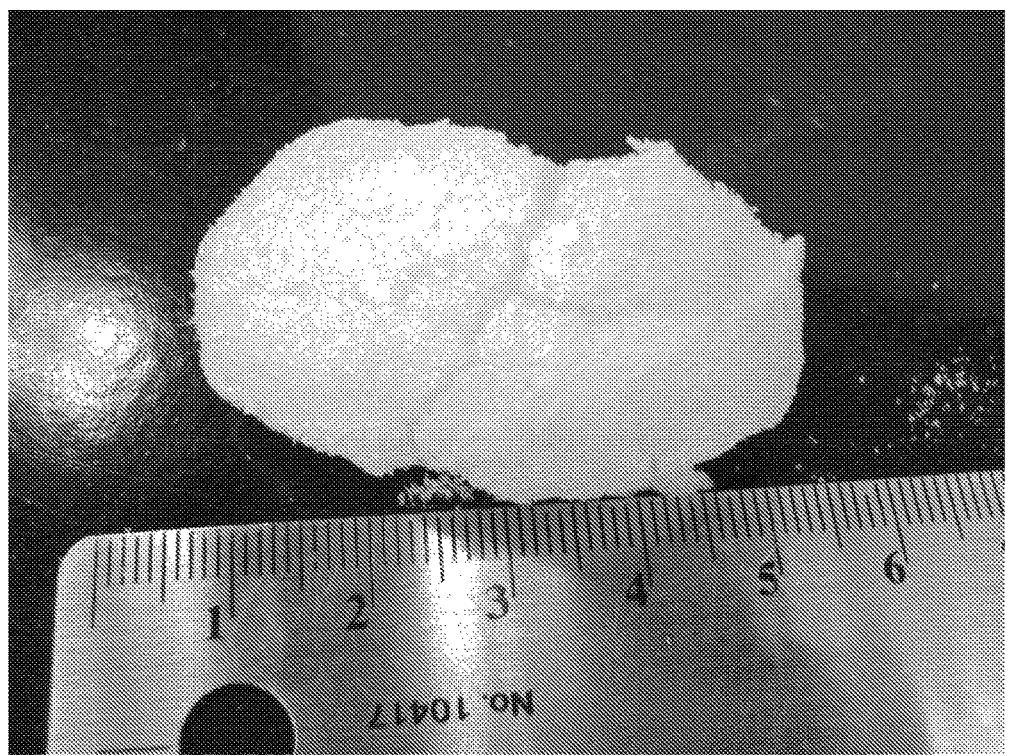
FIG. 3 shows a photograph of the product formed in Example 1.
Figure 4:
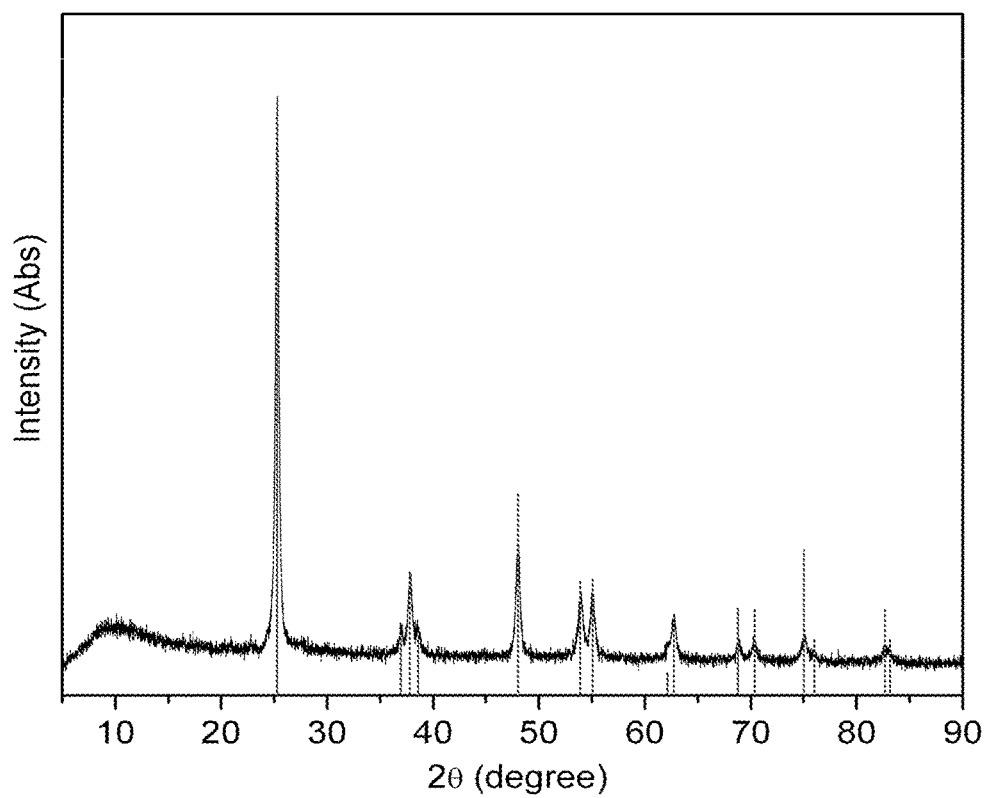
FIG. 4 shows a powder X-ray diffraction pattern of the product formed in Example 1, with simulated Bragg peaks of anatase.

Example 1 illustrates an implementation of process 100, in which anatase TiO$_2$ was produced by using a sulfuric acidic solution containing TiOSO$_4$. Hydrogen peroxide was utilized as a metal-stabilizing agent that decomposed at room temperature over time while the acidic solution dried. 5.8 g of a hydrate of TiOSO$_4$ with ≤17 wt % H$_2$SO$_4$ was dissolved in 18.4 g of deionized water into which 2.2 g of 27 wt % H$_2$O$_2$ solution was added subsequently. The solution was stirred until it became homogeneous. The solution was left in air for two days, which resulted in a red semi-solid. FIG. 2 shows an optical microscope image of the semi-solid precursor formed, showing the macropores exhibited by the semi-solid material after drying. Calcination of the semi-solid at 700° C. in air for 10 hrs resulted in a foam-like white monolithic TiO$_2$ product of a pure anatase phase according to its powder X-ray diffraction (XRD) pattern. FIG. 3 shows a photograph of the product. FIG. 4 shows a powder XRD pattern of the product, with simulated Bragg peaks of anatase. The average particle size of the product was estimated to be 48 nm based on the Scherrer equation.

Example 2 illustrates another implementation of process 100, in which a mixed phase of TiO$_2$ and ternary Fe—Ti—O compounds was produced by using 5.8 g of a hydrate of TiOSO$_4$ with 17 wt % H$_2$SO$_4$ and 1.0 mL of 2.0 M Fe(NO$_3$)$_3$ as titanium and iron sources, respectively.

Example 3 is similar to Example 1, but the calcination temperature was 800° C. instead of 700° C., which led to a mixed phase of anatase and rutile TiO$_2$ with an anatase/rutile ratio of 0.42.

Example 4 is similar to Example 3, but the amount of H$_2$O$_2$ was higher, which provided a mixed phase of anatase and rutile TiO$_2$ with a larger amount of anatase (anatase/rutile ratio=5.1).

Figure 5:
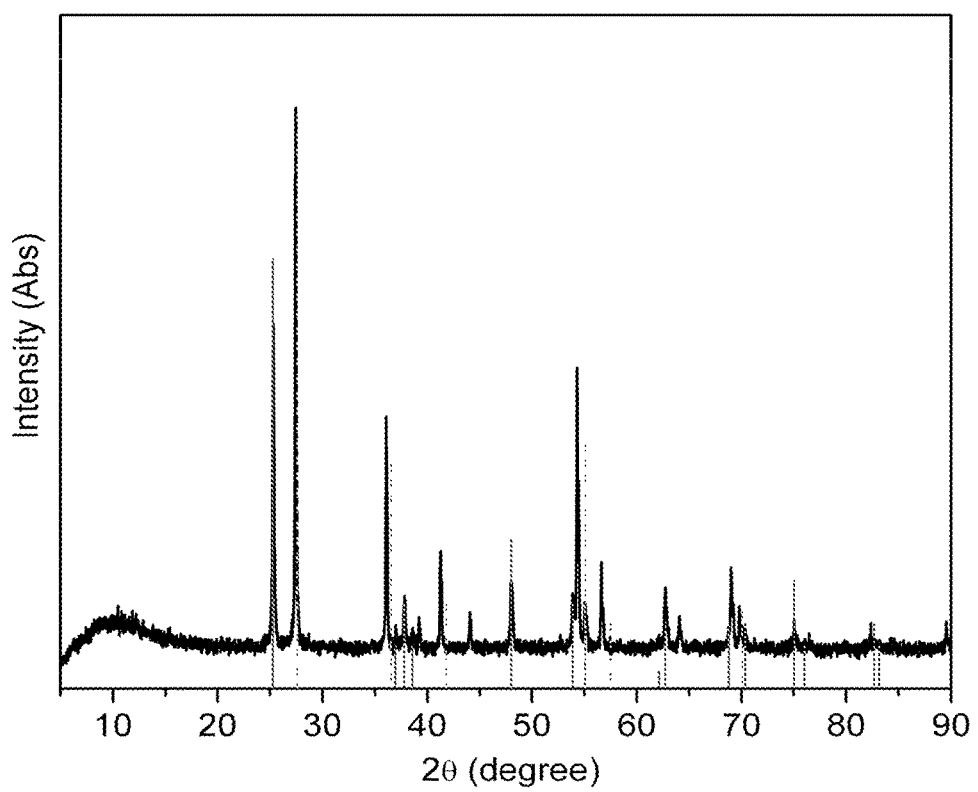
FIG. 5 shows a powder X-ray diffraction pattern of the product formed in Example 5 with simulated Bragg peaks of anatase (solid lines) and rutile (dashed lines).

Example 5 is similar to Example 1, but 1.4 g of poly(ethylene glycol) (Mw=20,000) was added as an additive (110 in FIG. 1). FIG. 5 shows a powder XRD pattern of the product, with simulated Bragg peaks of anatase (solid lines) and rutile (dashed lines). The product showed a mixed phase of anatase and rutile according to its powder XRD pattern (anatase/rutile ratio=0.7). The average particle size of the anatase product was estimated to be 50-55 nm based on the Scherrer equation.

Figure 6:
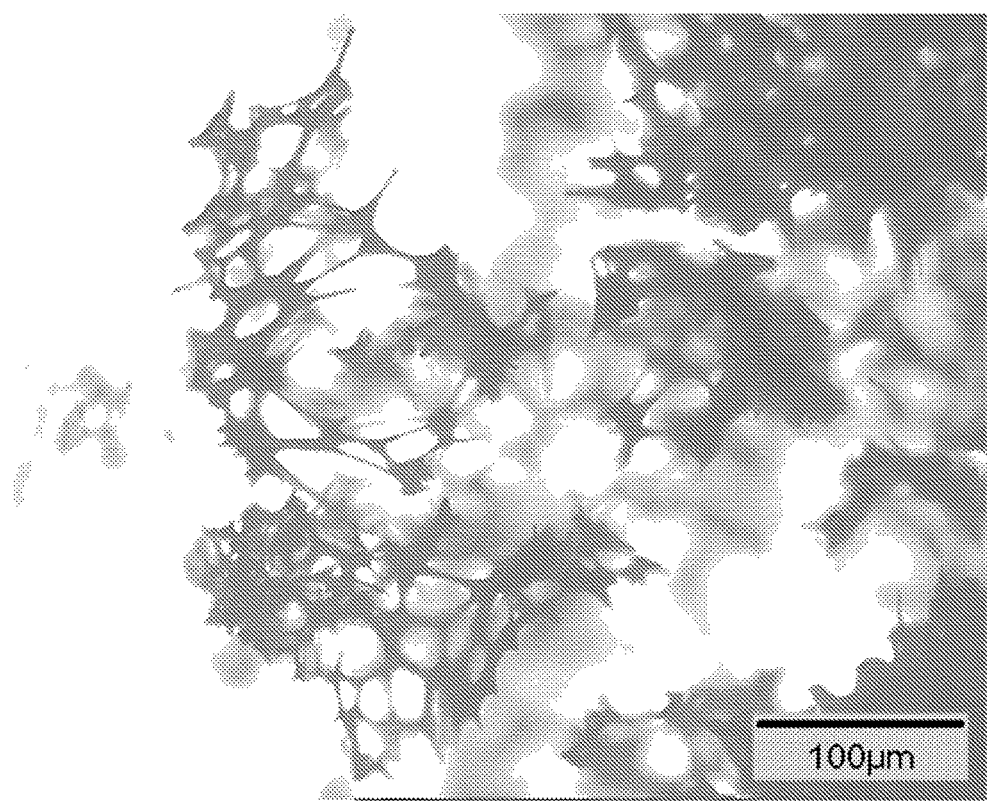
FIG. 6 shows an optical microscope image of $TiO_2$ produced in Example 6.
Figure 7:
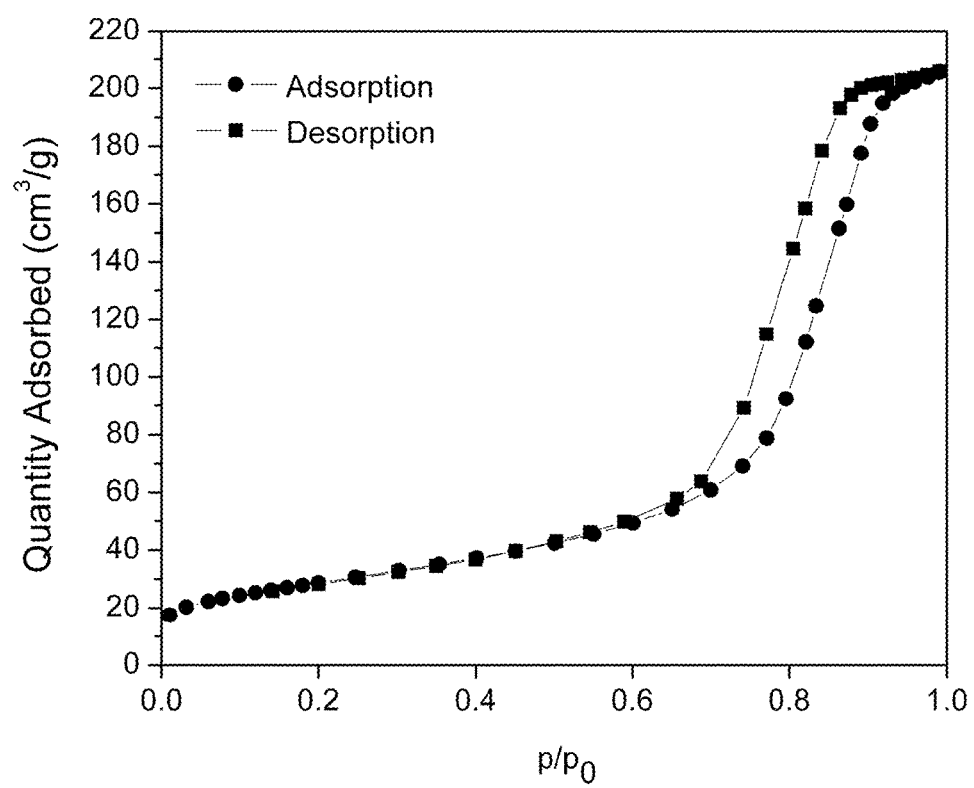
FIG. 7 shows $N_2$ adsorption and desorption isotherms for the product formed in Example 6.
Figure 8:
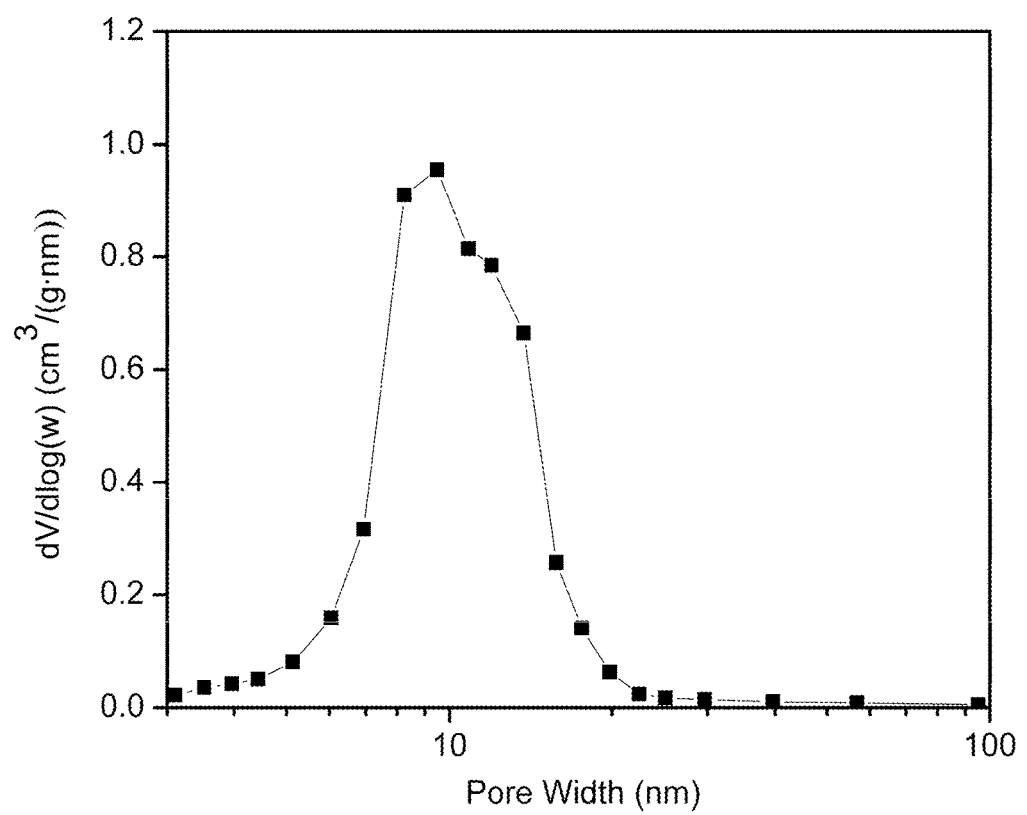
FIG. 8 shows a Barret-Joyner-Halenda (BJH) pore size distribution for the product formed in Example 6.

Example 6 is similar to Example 5, but Jeffamine® d2000 was used instead of poly(ethylene glycol). As shown in its optical microscope image in FIG. 6, the semi-solid has a pore morphology different from that of the product formed in Example 1, indicating the role of the poly(ethylene glycol) in controlling the morphology. FIG. 7 shows N$_2$ adsorption and desorption isotherms for the product. FIG. 8 shows a Barret-Joyner-Halenda (BM) pore size distribution for the product. The N$_2$ sorption isotherms and Barret-Joyner-Halenda (BJH) pore size distribution indicate that the final product has an appreciable mesoporosity. The product had a $N_2$ Brunauer-Emmett-Teller (BET) surface area of 104 $m^2/g$, a BJH adsorption cumulative pore volume of 0.32 $cm^3/g$ and a BJH adsorption pore width of 12.2 nm.

Example 7 is similar to Example 5, but the solution was added with both poly(ethylene glycol) and amorphous aluminosilicate (Metamax®). Into the solution, a slurry containing 2.5 g of Metamax and 9 g of deionized water was added while stirring. This solution was left at 90° C. for one day, which resulted in a light brown hard solid which contained bubbles. This solid was calcined at 650° C. in air for 10 hrs, which produced an off-white product. The product was identified as anatase $TiO_2$ from its powder XRD pattern.

Example 8 is similar to Example 5, but nitric acid was used as the strong acid and titanium butoxide as a source of titanium to produce anatase $TiO_2$. The average particle size of the product was estimated to be 40 nm based on the Scherrer equation.

Figure 9:
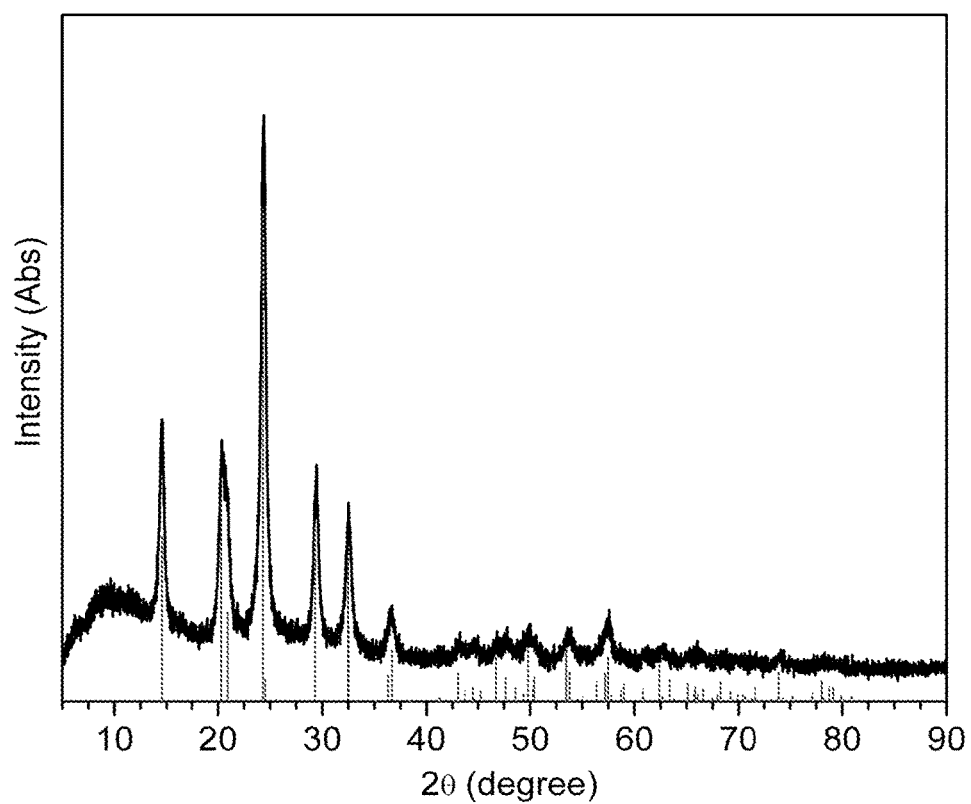
FIG. 9 shows a powder X-ray diffraction pattern of the product formed in Example 9 with simulated Bragg peaks of a NaSICON-type compound.
Figure 10:
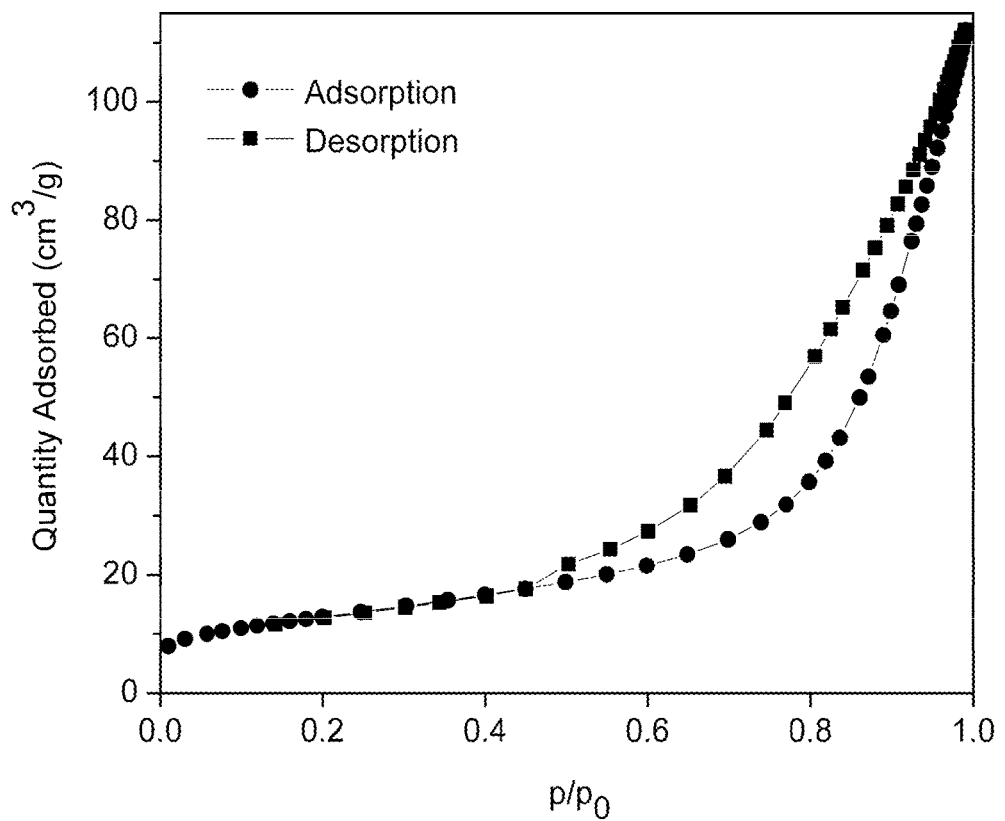
FIG. 10 shows $N_2$ adsorption and desorption isotherms for the product formed in Example 9.
Figure 11:
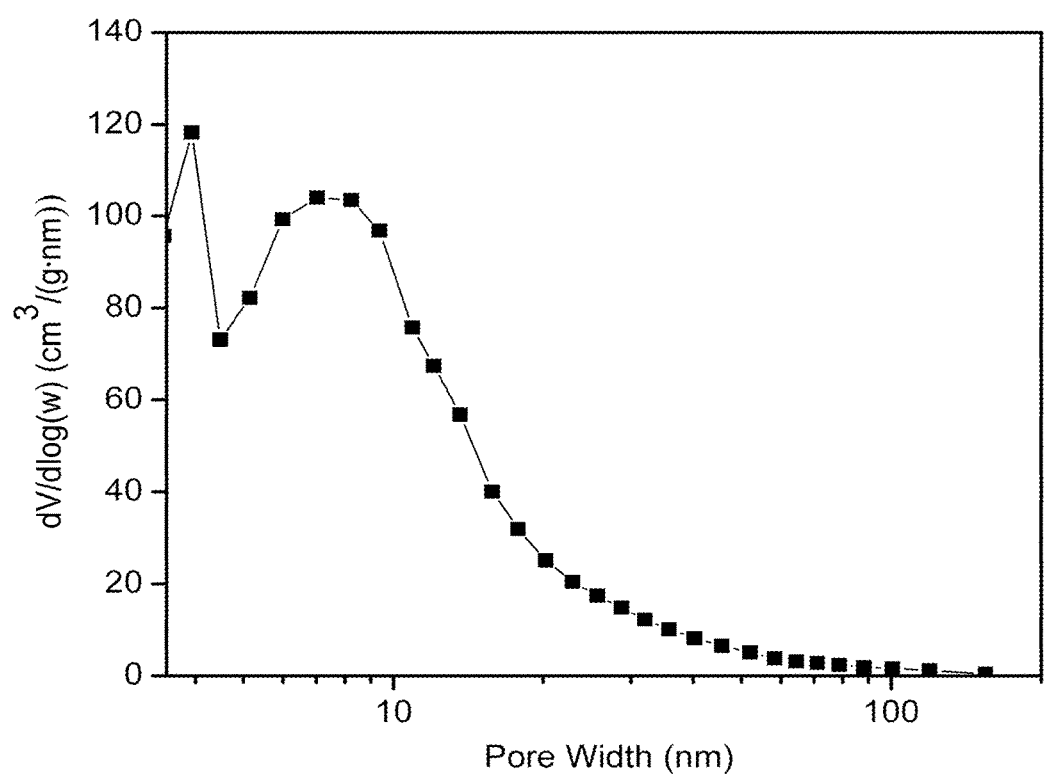
FIG. 11 shows a Barret-Joyner-Halenda (BJH) pore size distribution for the product formed in Example 9.
Figure 12:
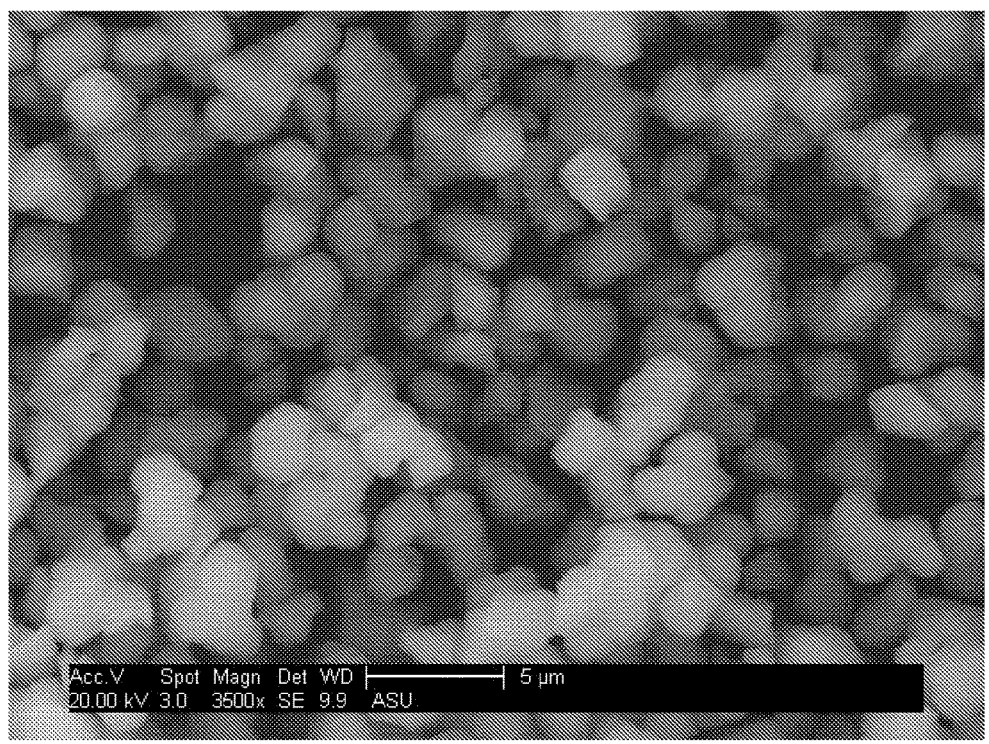
FIG. 12 shows a scanning electron microscope (SEM) image of the product formed in Example 9.
Figure 13:
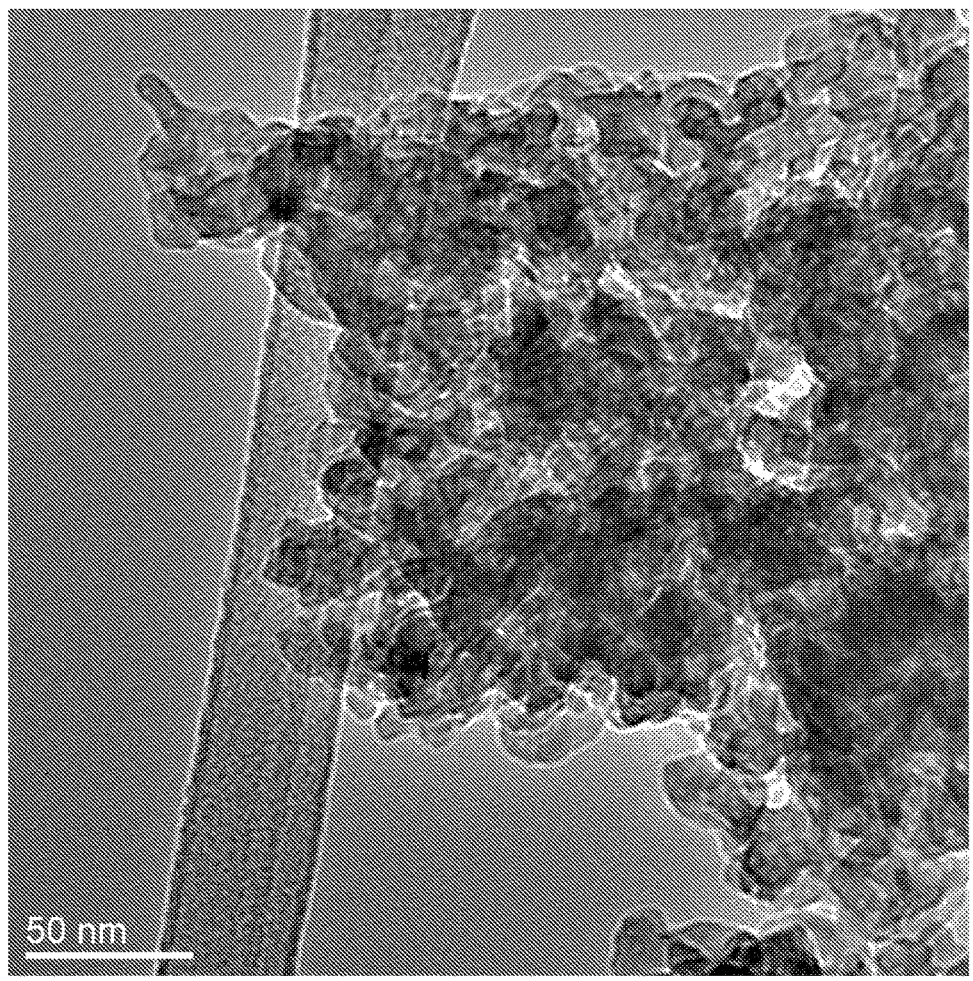
FIG. 13 shows a transmission electron microscope (TEM) image of the product formed in Example 9.
Figure 14:
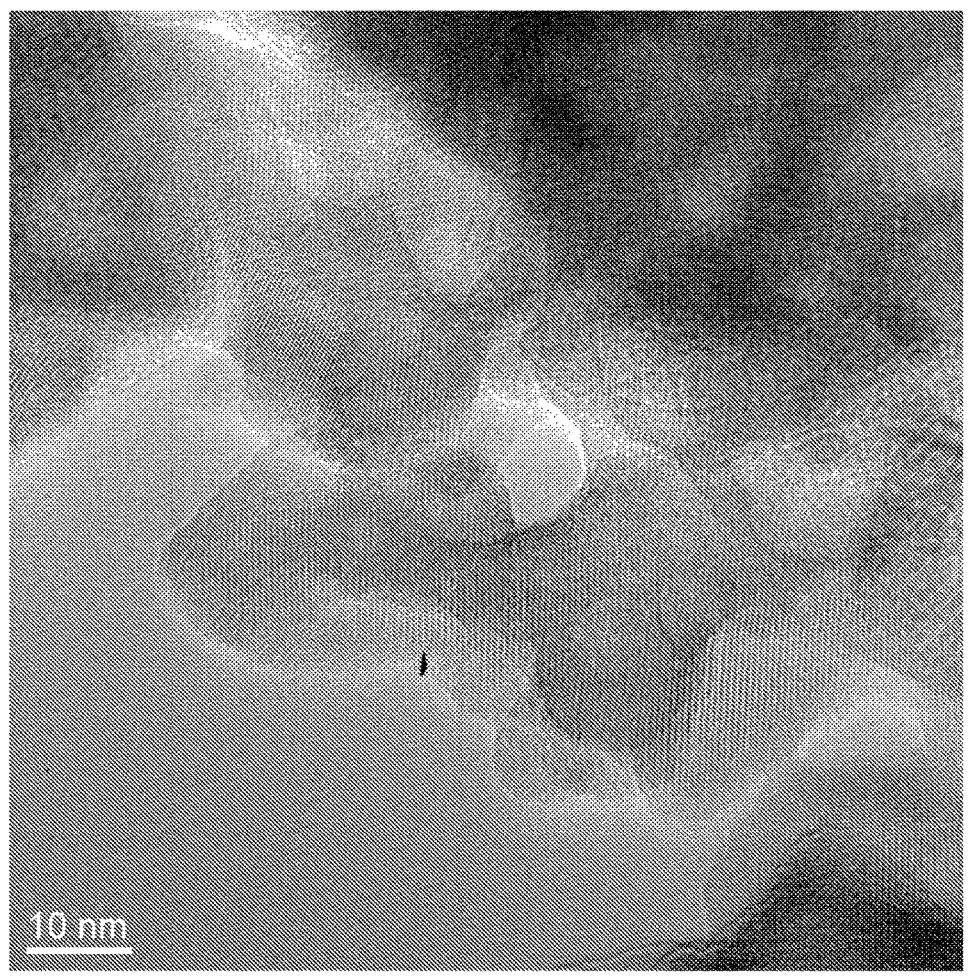
FIG. 14 shows a high-resolution transmission electron microscope (TEM) image of the product formed in Example 9.

Example 9 illustrates another implementation of process 100, in which $H_3PO_4$ was used as an additive. 5.8 g of a hydrate of $TiOSO_4$ with 17 wt % $H_2SO_4$ was dissolved in 11.3 g of deionized water into which 3.3 g of 27 wt % $H_2O_2$ solution was added. The subsequent addition of 3.4 g of 85 wt % $H_3PO_4$ solution to a sulfuric acidic solution of $TiOSO_4$ and $H_2O_2$ led to a viscous slurry. Upon heating, the slurry turned into a semi-solid with a sponge-like morphology. Calcination of the semi-solid at 650° C. in air for 10 hrs provided a final product that showed a NaSICON-type structure according to its powder XRD pattern, shown in FIG. 9. The product contains both phosphate and sulfate oxyanions with S/P~0.25, according to inductively coupled plasma-atomic emission spectroscopy (ICP-AES) and energy dispersive X-ray spectroscopy (EDS) analysis. The $N_2$ sorption isotherms, shown in FIG. 10, and BJH pore size distribution, shown in FIG. 11, indicate that the product has an appreciable mesoporosity. The product had a BET surface area of 47 $m^2/g$, a BJH adsorption cumulative pore volume of 0.18 $cm^3/g$ and a BJH adsorption pore width of 13.7 nm. FIG. 12 shows a scanning electron microscope (SEM) image of the product, and FIG. 13 shows a transmission electron microscope (TEM) image of the product. SEM studies revealed that the product consists of about 2 μm-sized particles. According to TEM studies, the individual microparticles are aggregates of nanoparticles of ~20 nm. The highly crystalline nature of the product is clearly seen in the high-resolution TEM image shown in FIG. 14.

Example 10 is similar to Example 9, but a larger amount of was $H_3PO_4$ used, which led to a final product that contained the NaSICON-type compound as well as $TiP_2O_7$ as an impurity.

Example 11 is similar to Example 9, but furfuryl alcohol was added as a carbon-forming agent and the calcination was carried out in an Ar flow instead of in air. The product was identified as having the NaSICON framework structure from its powder XRD pattern. The average particle size of the product was estimated to be 25 nm based on the Scherrer equation.

Figure 15:
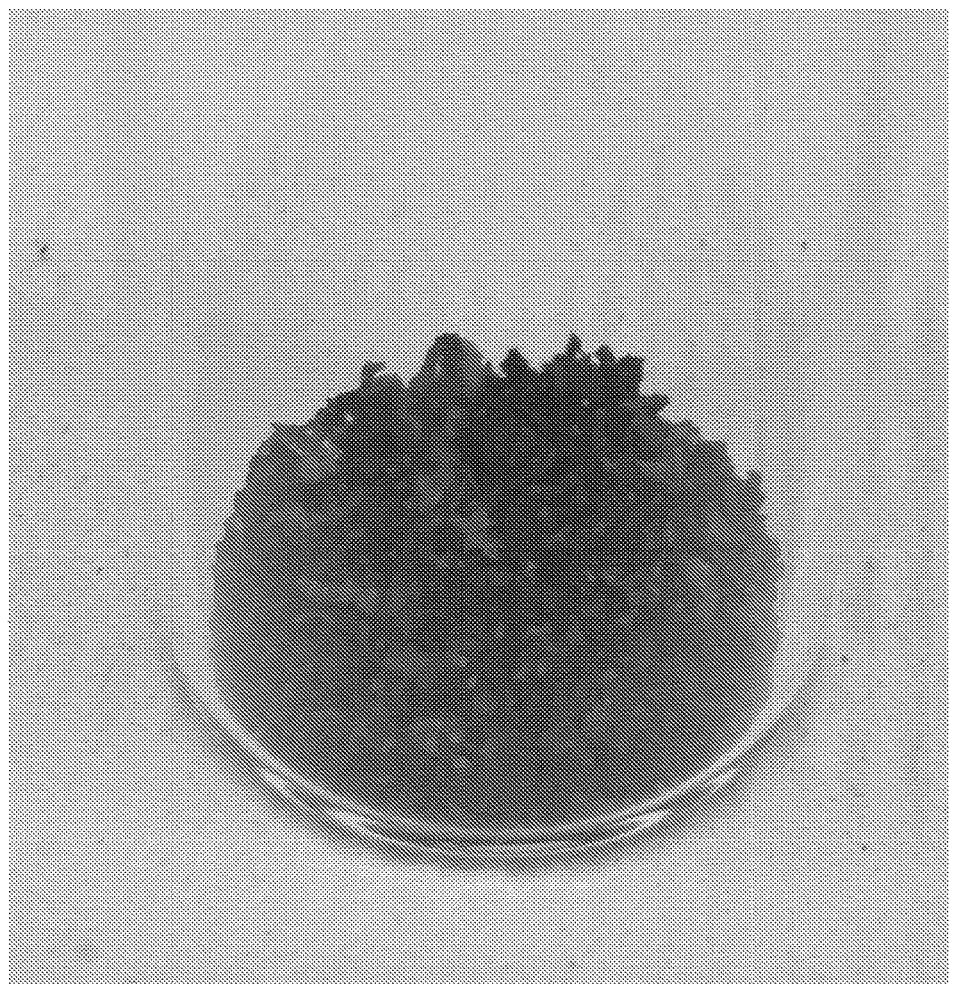
FIG. 15 shows a photograph of the product formed in Example 12.
Figure 16:
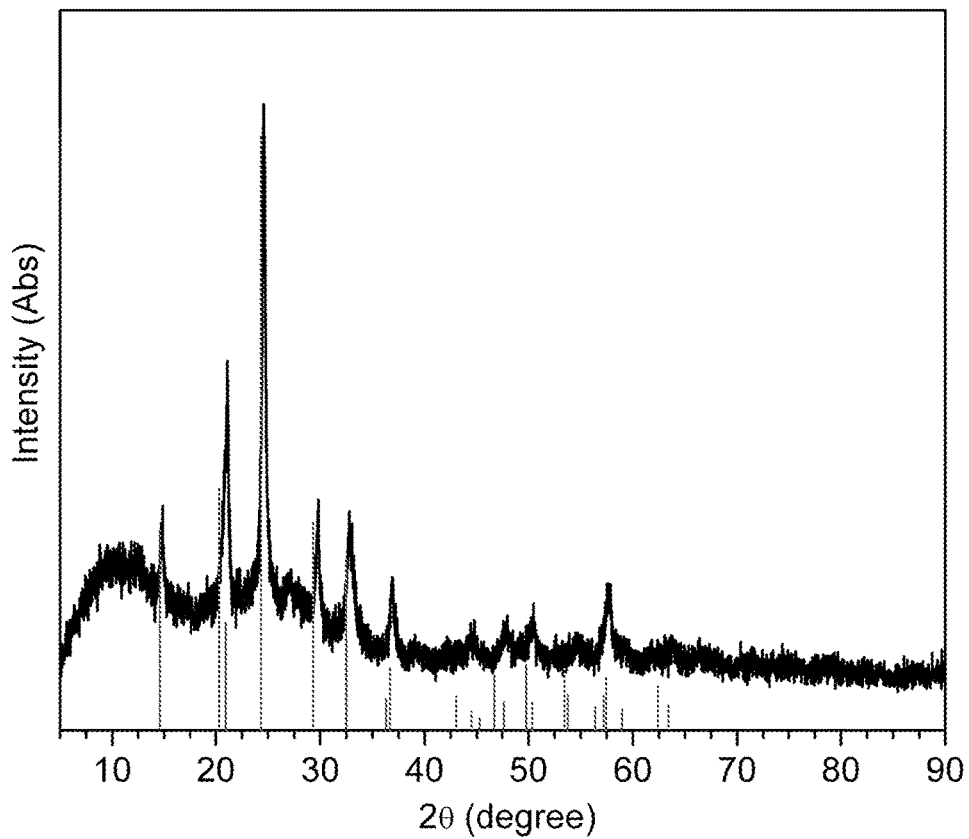
FIG. 16 shows a powder X-ray diffraction pattern of the product formed in Example 12, with simulated Bragg peaks of a NaSICON-type compound.
Figure 17:
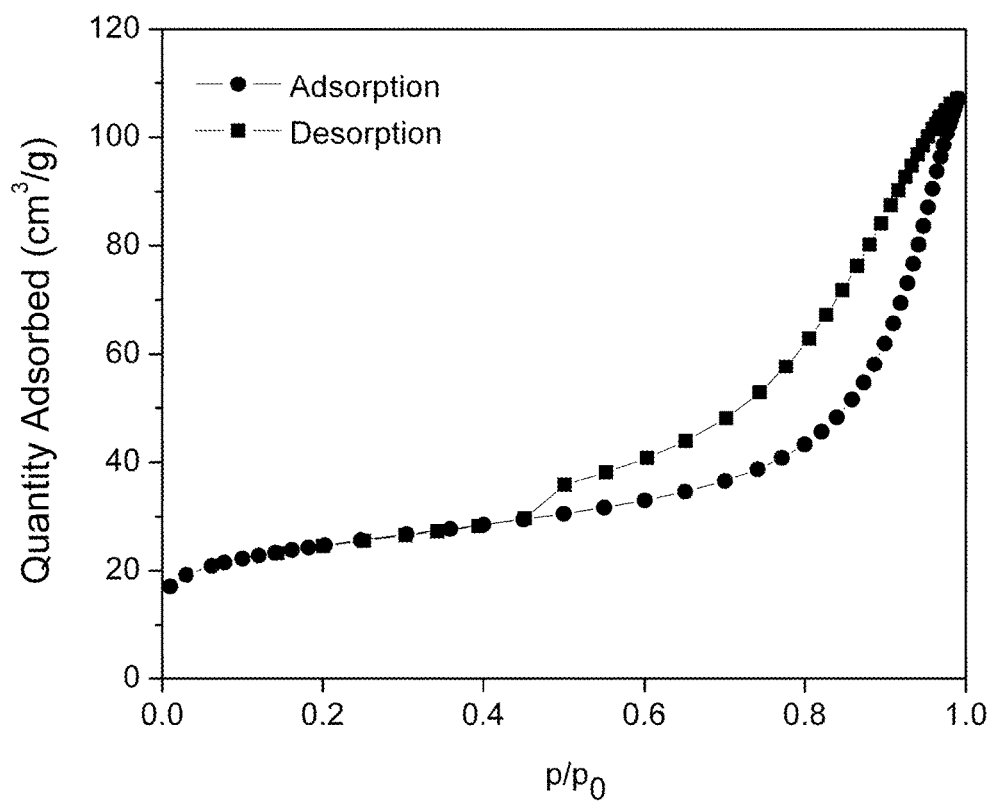
FIG. 17 shows $N_2$ adsorption and desorption isotherms for the product formed in Example 12.
Figure 18:
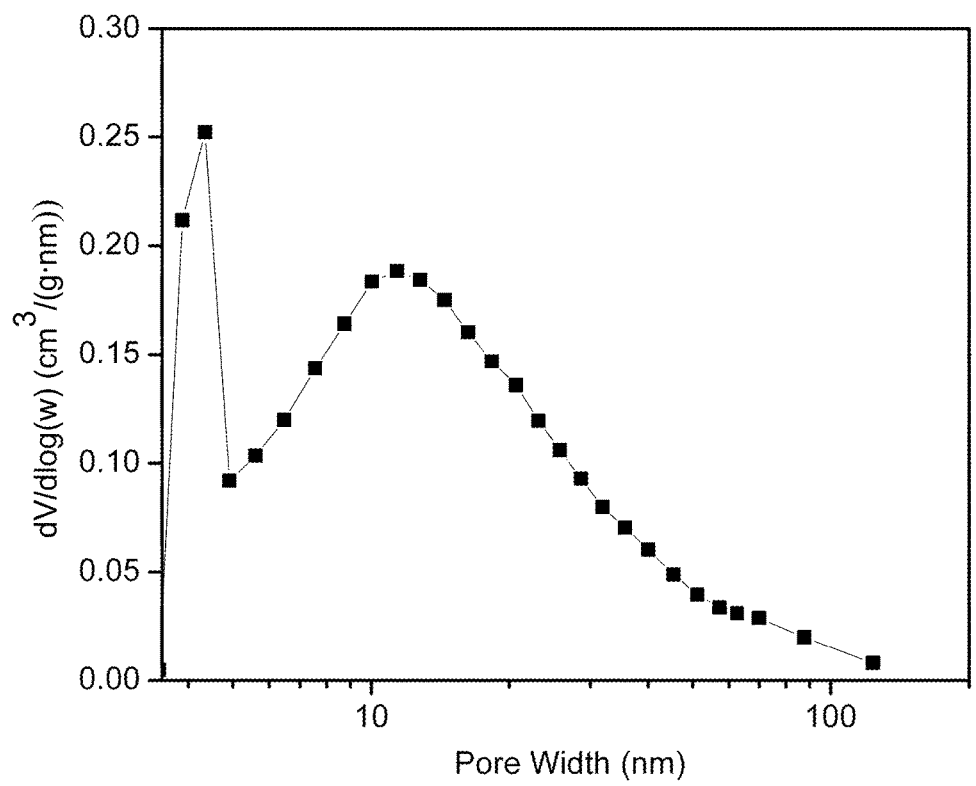
FIG. 18 shows a Barret-Joyner-Halenda (BJH) pore size distribution for the product formed in Example 12.

Example 12 is similar to Example 11, but d-glucose was added as a carbon-forming agent instead of furfuryl alcohol. FIG. 15 shows a photograph of the black product. The black color indicates the presence of carbon in the product. The carbon content was 4 wt % from CHN analysis. FIG. 16 shows a powder XRD pattern of the product, with simulated Bragg peaks of a NaSICON-type compound. The product exhibits a NaSICON-type structure according to its powder XRD pattern. FIG. 17 shows $N_2$ adsorption and desorption isotherms for the product. FIG. 18 shows a BJH pore size distribution for the product. The $N_2$ sorption isotherms and BJH pore size distribution indicate that the product has an appreciable mesoporosity. The product had a BET surface area of 86 $m^2/g$, a BJH adsorption cumulative pore volume of 0.16 $cm^3/g$ and a BJH adsorption pore width of 9 nm.

Example 13 is similar to Example 9, but sulfuric acid was used as the strong acid and titanium butoxide was used as the source of titanium. Furthermore, poly(ethylene glycol) was added as an additive. The average particle size of the product was estimated to be 15-20 nm based on the Scherrer equation.

Figure 19:
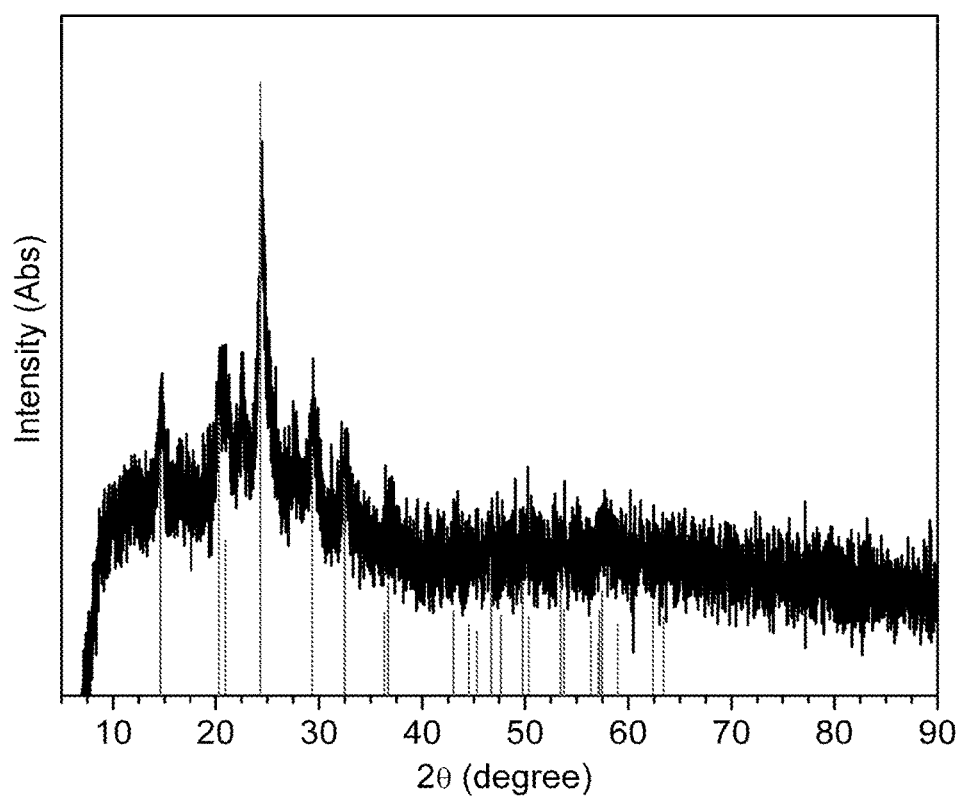
FIG. 19 shows a powder X-ray diffraction pattern of the product formed in Example 14, with simulated Bragg peaks of a NaSICON-type compound.
Figure 20:
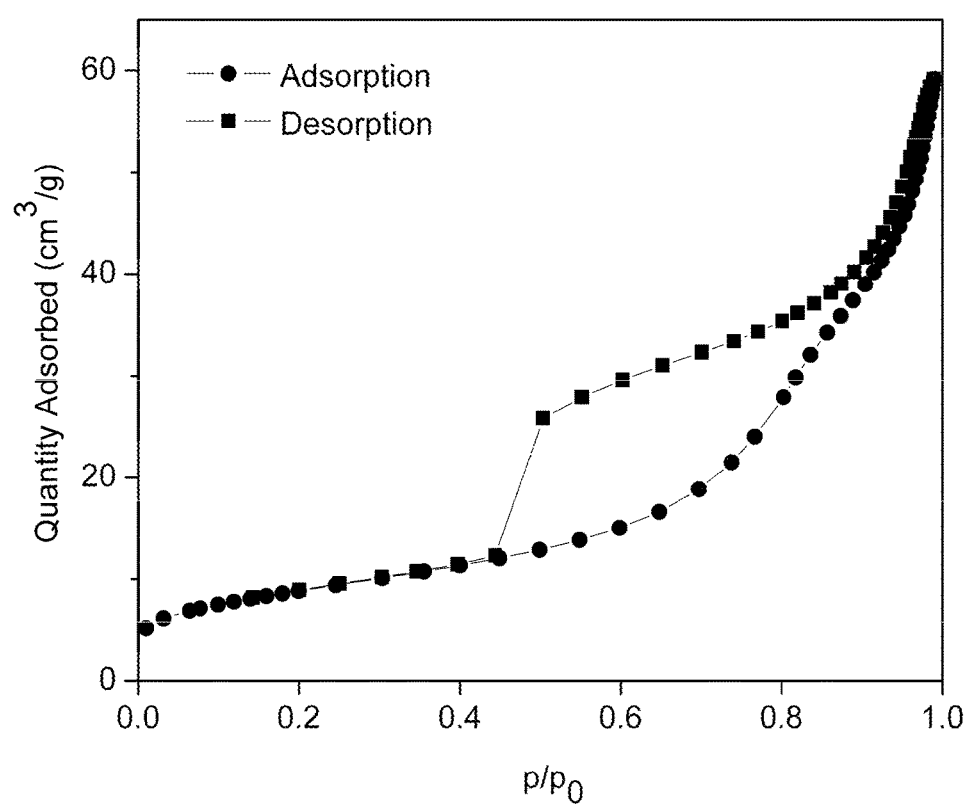
FIG. 20 shows $N_2$ adsorption and desorption isotherms for the product formed in Example 14.
Figure 21:
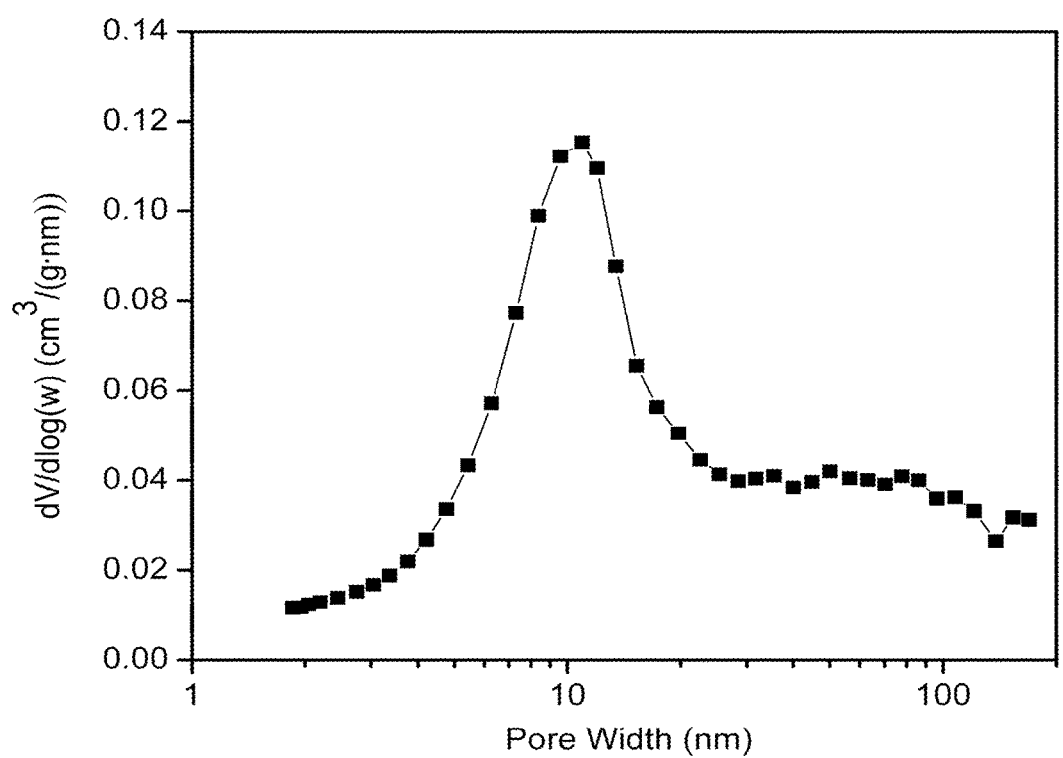
FIG. 21 shows a Barret-Joyner-Halenda (BJH) pore size distribution for the product formed in Example 14.

Example 14 illustrates another implementation of process 100, in which a NaSICON-type compound that has both Ti and Fe in the structure was discovered by using $TiOSO_4$ and $Fe(NO_3)_3$. 5.8 g of a hydrate of $TiOSO_4$ with 17 wt % $H_2SO_4$ and 3.0 g $Fe(NO_3)_3 \cdot 9H_2O$ were used as titanium and iron sources, respectively. The powder XRD pattern of the product is shown in FIG. 19. The average particle size was 20-30 nm calculated by the Scherrer equation. The $N_2$ sorption isotherms shown in FIG. 20 and BJH pore size distribution shown in FIG. 21 indicate that the product has an appreciable mesoporosity. The product had a BET surface area of 32 $m^2/g$, a BJH adsorption cumulative pore volume of 0.09 $cm^3/g$ and a BJH adsorption pore width of 11 nm.

Example 15 is similar to Example 9, but sulfuric acid was used as the strong acid and titanium butoxide was used a source of titanium. The final product was identified as having the NaSICON-type framework structure from its powder XRD pattern, with average particle sizes of ~30 nm calculated by the Scherrer equation.

Figure 22:
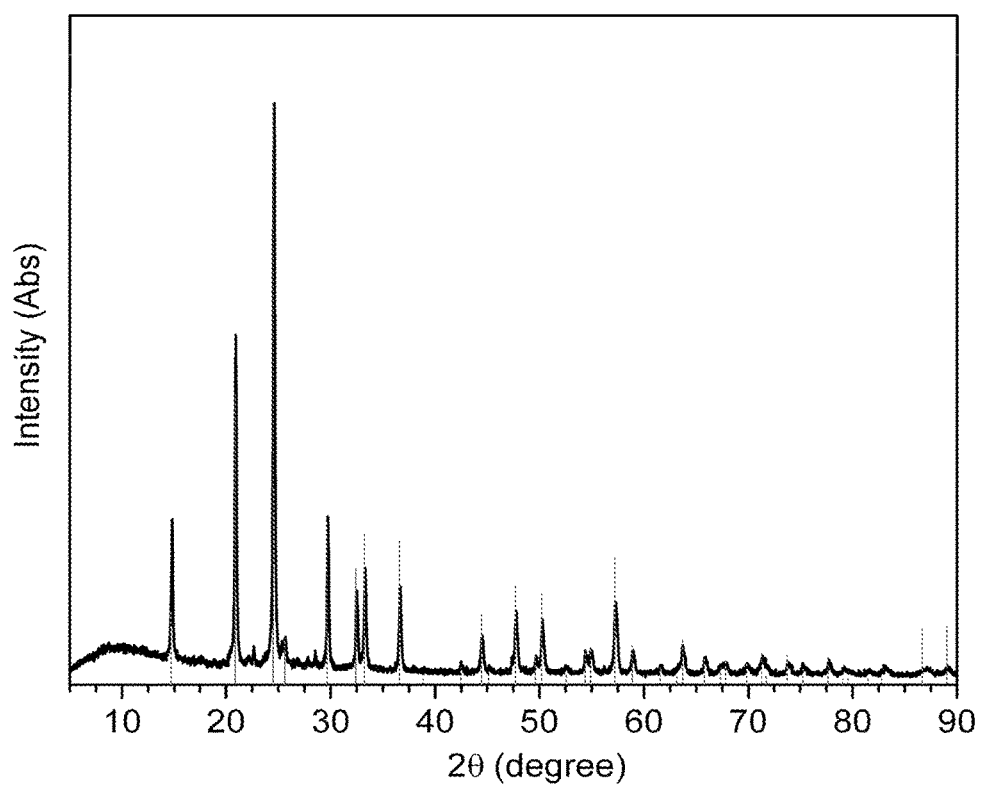
FIG. 22 shows a powder X-ray diffraction pattern of the product formed in Example 16, with simulated Bragg peaks of $LiTi_2(PO_4)_3$.
Figure 23:
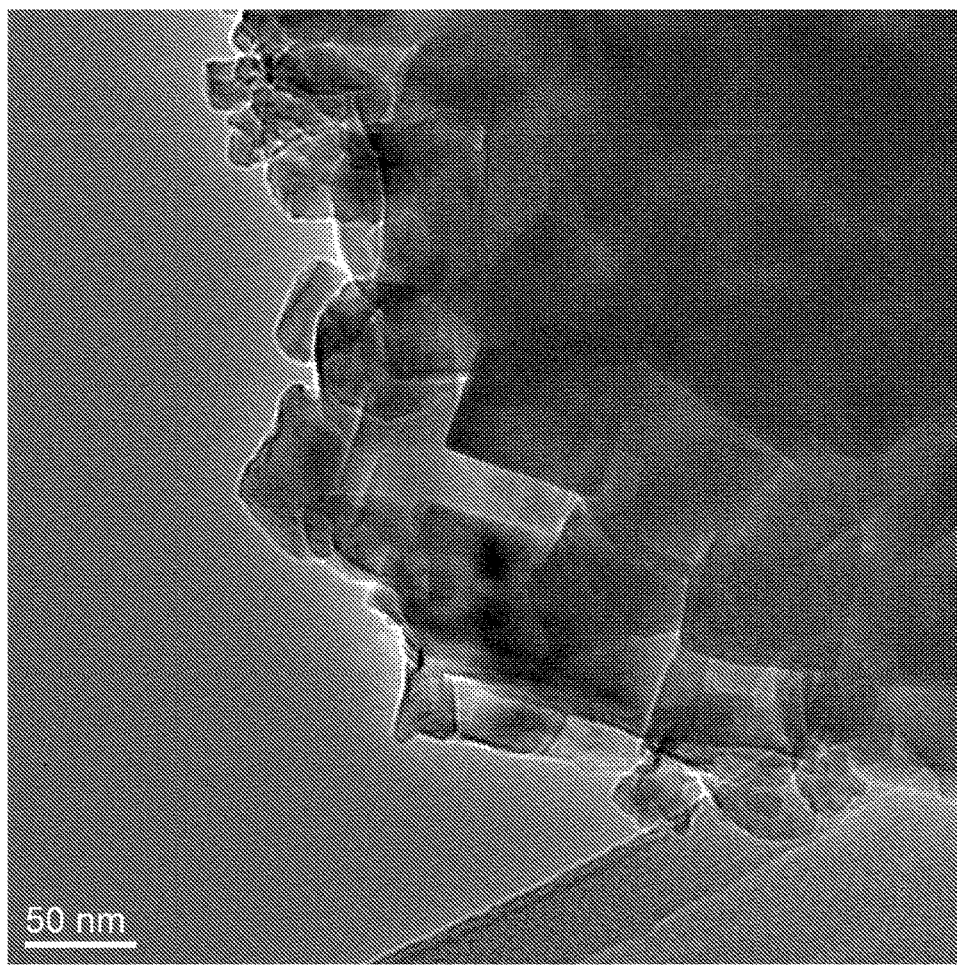
FIG. 23 shows a transmission electron micrograph (TEM) of the product formed in Example 16 at 60 k× magnification.

Example 16 illustrates another implementation of process 100, in which a NaSICON-type compound, $LiTi_2(PO_4)_3$, was produced by using $Li(NO_3)$ as an additive, with a nominal Li:Ti ratio of 1:2. FIG. 22 shows a powder XRD pattern of the product, with simulated Bragg peaks of $LiiTi_2(PO_4)_3$. FIG. 23 shows a TEM of the product at 60 k× magnification. The powder XRD pattern of the product indicates a high crystallinity of the product, with average particle sizes of >100 nm calculated by the Scherrer equation, and the TEM image reveals well-faceted particles with sizes ranging from ~20 to ~100 nm. ICP-AES and EDS indicate that the NaSICON-type product does not contain any residual sulfate.

Figure 24:
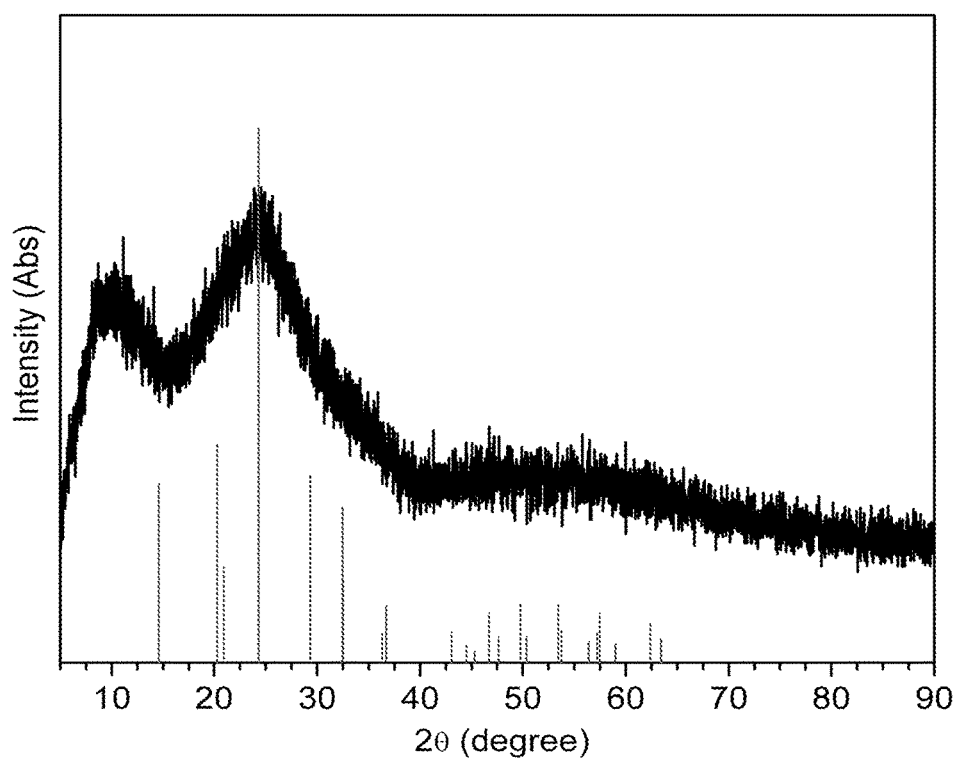
FIG. 24 shows a powder X-ray diffraction pattern of the product formed in Example 17, with simulated Bragg peaks of a NaSICON-type compound.

Example 17 illustrates another implementation of process 100, in which treating the semi-solid precursor, obtained from a sulfuric acid, $TiOSO_4$, $H_2O_2$, and $H_3PO_4$, with water led to a relatively amorphous material even after subsequent calcination. FIG. 24 shows a powder XRD pattern of the product, with simulated Bragg peaks of a NaSICON-type compound. ICP-AES and EDS indicate that the product does not contain any residual sulfate.

Figure 25:
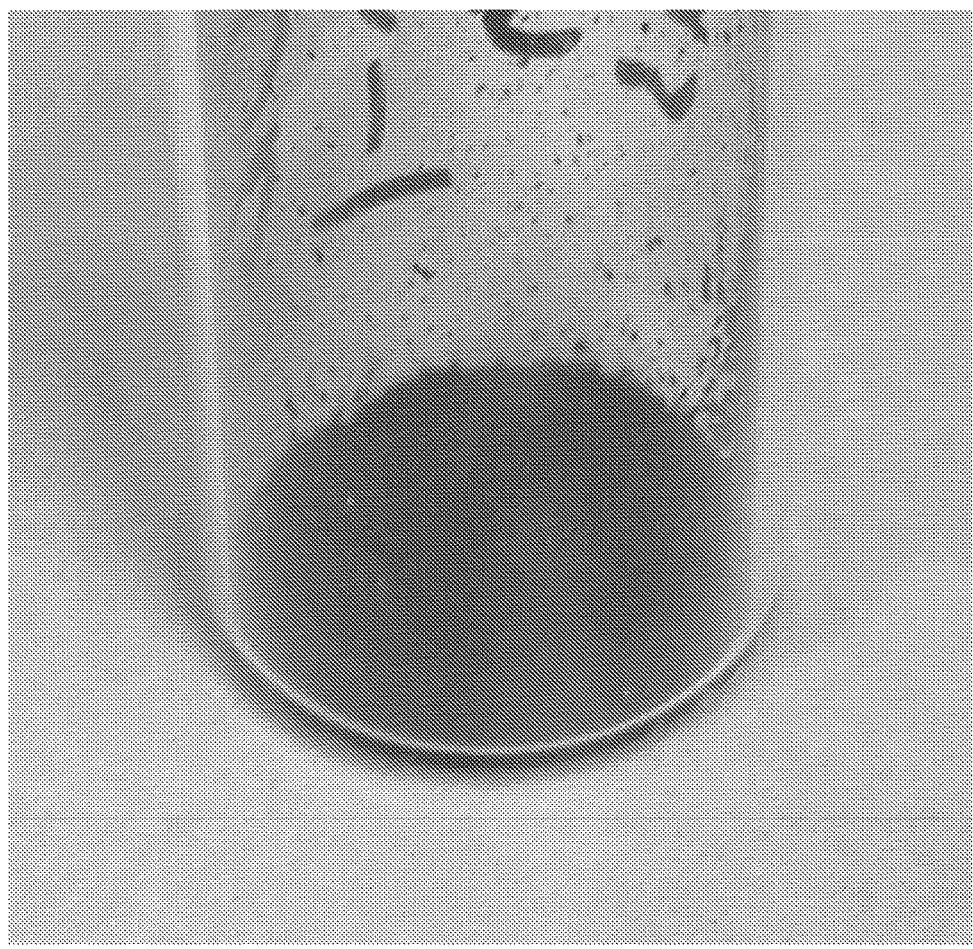
FIG. 25 shows a photograph of the product formed in Example 18.
Figure 26:
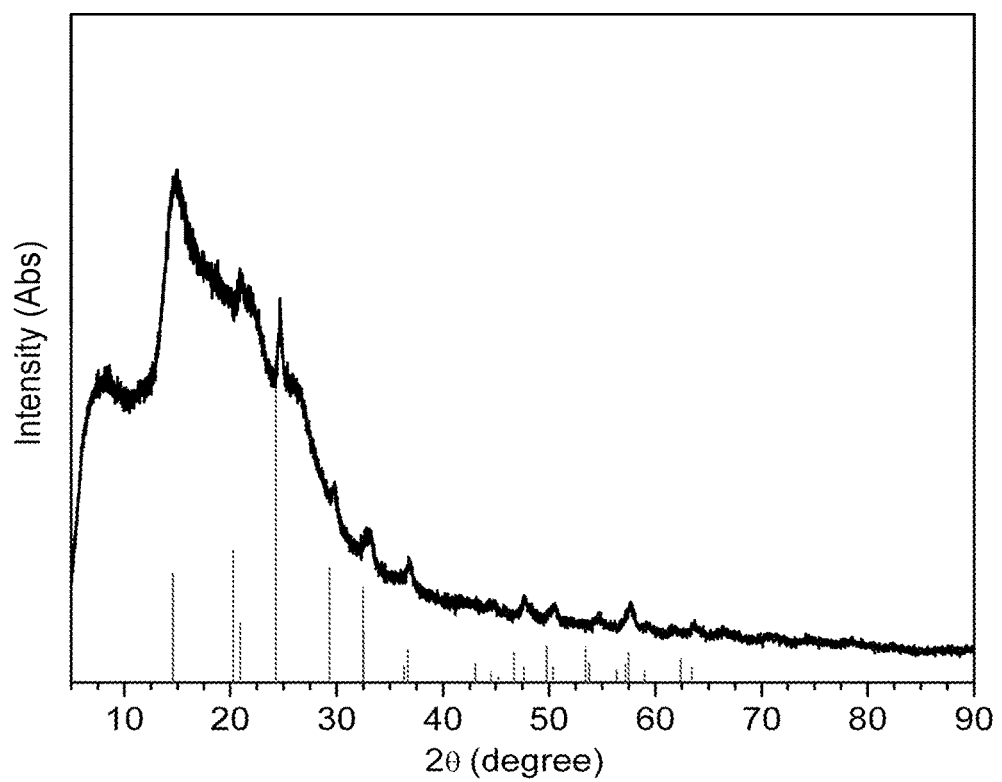
FIG. 26 shows a powder X-ray diffraction pattern of the product formed in Example 18, held in a capillary glass tube.

Example 18 illustrates another implementation of process 100, in which the product of Example 9 was heated at 500° C. in a $H_2/N_2$ gas mixture (6 at % $H_2$) to partially reduce the product, yielding a black product. A photograph of the product is shown in FIG. 25. The material maintains the original NaSICON-type structure, according to its powder XRD pattern shown in FIG. 26.

Example 19 is similar to Example 18, but the product of Example 9 was treated with a $H_2O_2$ solution at room temperature to achieve complexation of peroxide ions on the Ti ions on the surface of the product particles. The color change of the particles from white to orange indicates complexation.

Figure 27:
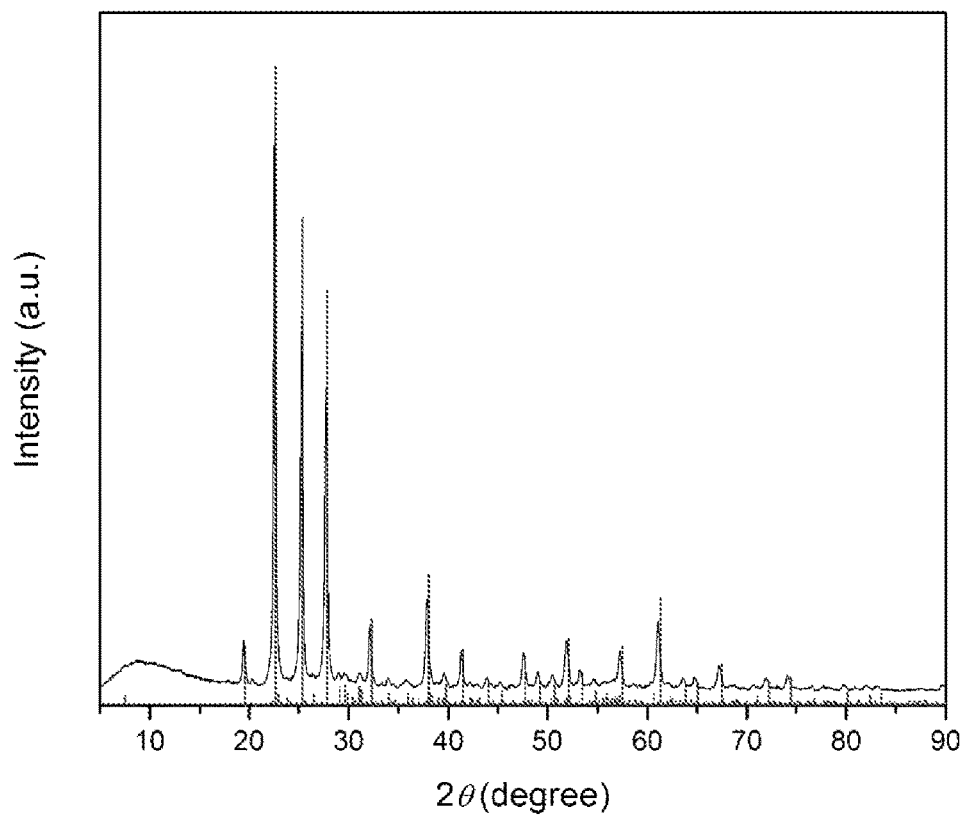
FIG. 27 shows a powder XRD pattern of the product formed in Example 20, with a reference XRD pattern of $TiP_2O_7$.

Example 20 illustrates another implementation of process 100, in which $TiP_2O_7$ was produced by controlling the nominal stoichiometric ratio of $H_3PO_4$ to $TiOSO_4$ in the acidic solution so that $PO_4^{3-}/Ti^{4+}=2$. FIG. 27 shows a powder XRD pattern of the product, calcined at 800° C. in air for 10 hrs, with a reference XRD pattern of $TiP_2O_7$ (Ref: McMurdie, H., Morris, M., Evans, E., Paretzkin, B., Wong-Ng, W., Zhang, Y. *Powder Diffr.*, 2 52 (1987)). The product was identified as $TiP_2O_7$ by its powder XRD pattern. The average particle size was calculated to be 24 nm based on the Scherrer equation.

Figure 28:
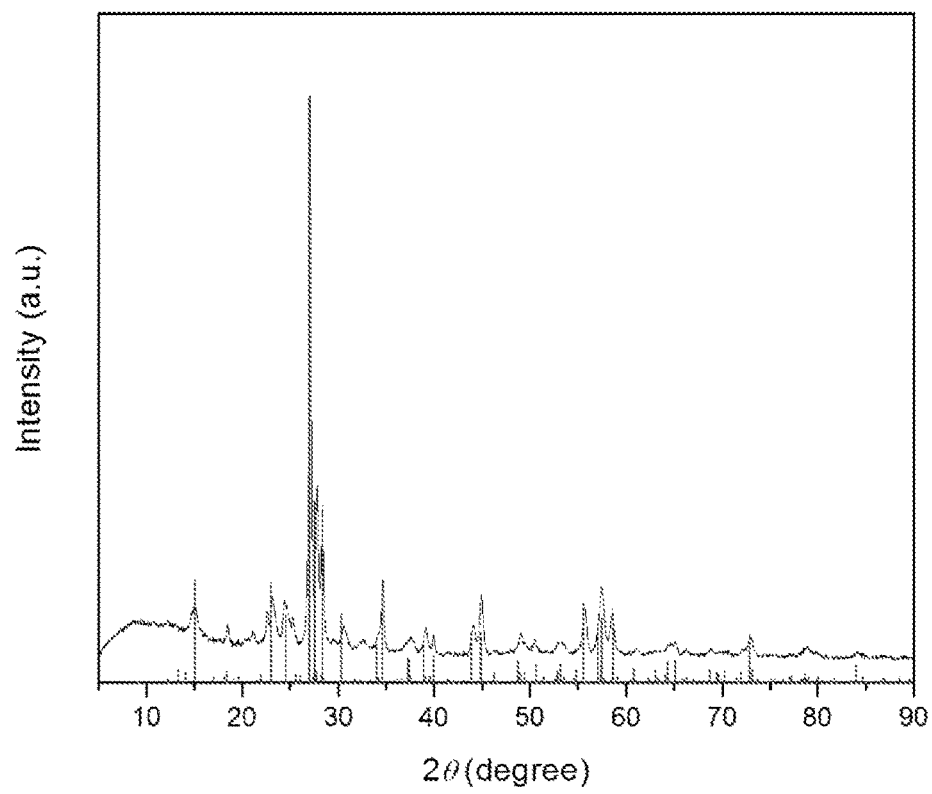
FIG. 28 shows a powder XRD pattern of the product formed in Example 21, with a reference XRD pattern of $Ti_5P_4O_{20}$.

Example 21 illustrates another implementation of process 100, in which $Ti_5P_4O_{20}$ was produced by controlling the nominal stoichiometric ratio of $H_3PO_4$ to $TiOSO_4$ in the acidic solution so that $PO_4^{3-}/Ti^{4+}=0.8$. FIG. 28 shows a powder XRD pattern of the product, with a reference XRD pattern of $Ti_5P_4O_{20}$ (Ref: Reinauer F., Glaum R., Gruehn R. *Eur. J. Solid State Inorg. Chem.*, 31 779-791 (1994)). The product was identified as $Ti_5P_4O_{20}$ by its powder XRD pattern.

Figure 29:
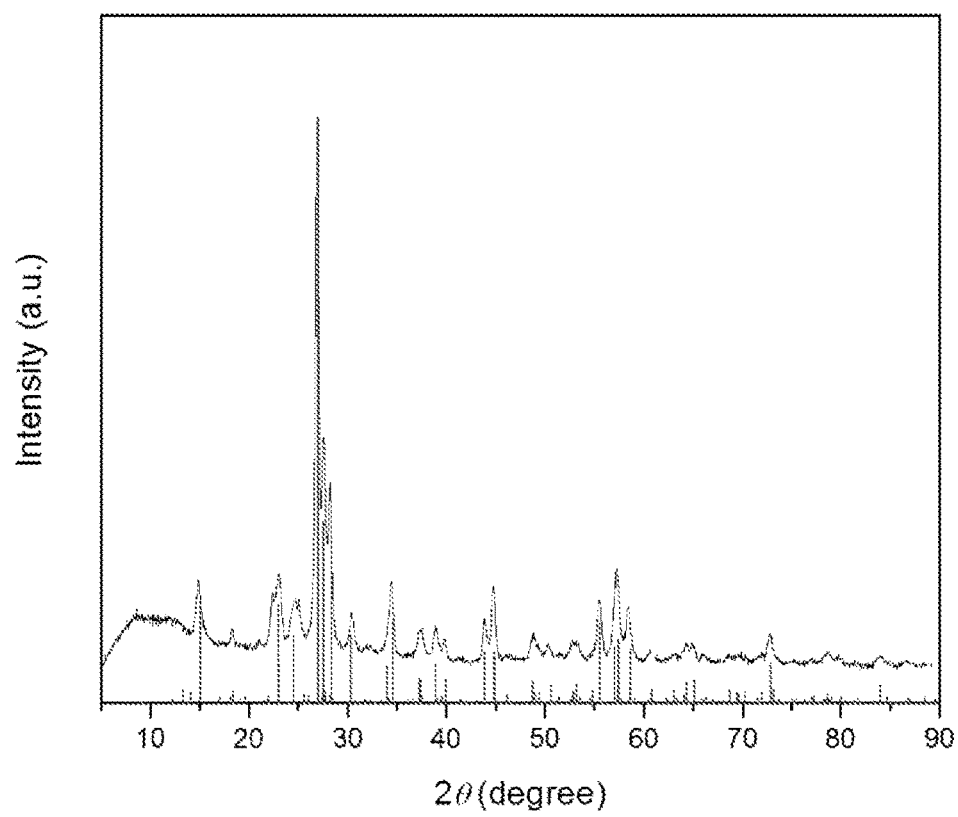
FIG. 29 shows a powder XRD pattern of the product formed in Example 22, with reference a XRD pattern of $Ti_5P_4O_{20}$ (Ref: Reinauer F., Glaum R., Gruehn R. *Eur. J. Solid State Inorg. Chem.*, 31 779-791 (1994)).

Example 22 is similar to Example 21, but nitric acid was used as the strong acid and titanium butoxide as the source of titanium. FIG. 29 shows a powder XRD pattern of the product, with reference a XRD pattern of $Ti_5P_4O_{20}$ (Ref: Reinauer F., Glaum R., Gruehn R. *Eur. J. Solid State Inorg. Chem.*, 31 779-791 (1994)).

Figure 30:
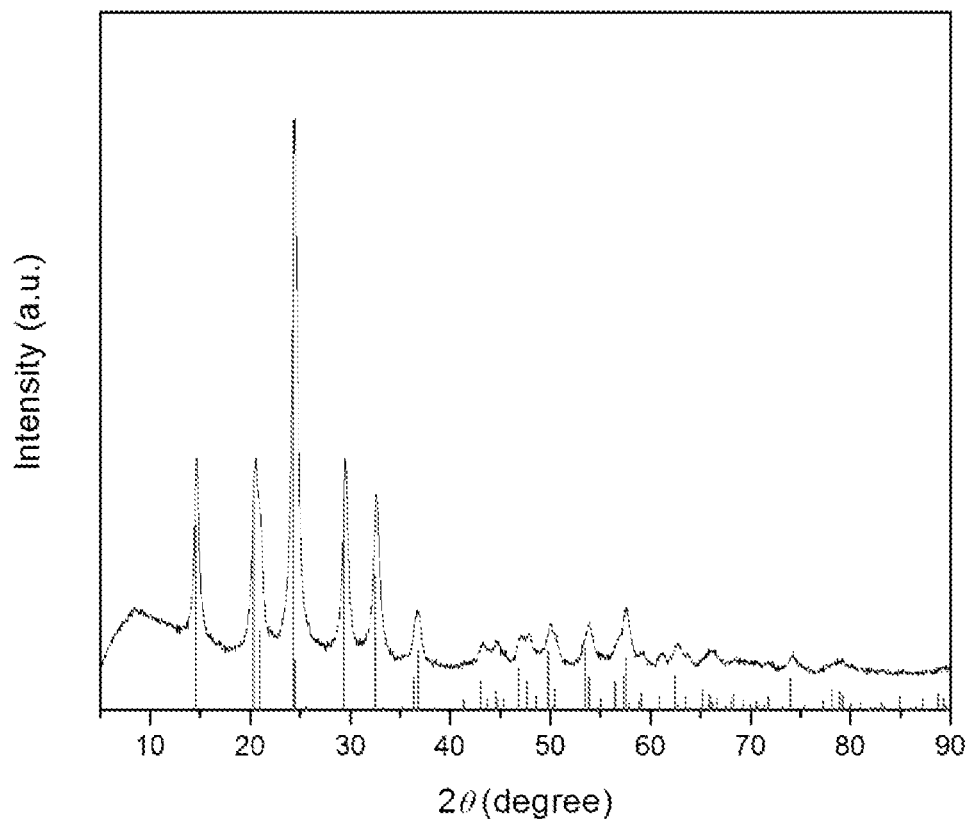
FIG. 30 shows a powder XRD pattern of the product formed in Example 23, with a simulated XRD pattern of $HTi_2(PO_4)_3$.

Example 23 is similar to Example 9, but the solution was covered and heated for a longer time, and was subsequently dried in a lab oven prior to calcination at 600° C. in air for 10 hrs. The calcination temperature was lower, which led to a final product that had a higher surface area (78 m²/g), a higher pore volume (0.22 cm³/g) and bigger pores (14 nm). FIG. 30 shows a powder XRD pattern of the product, with a simulated XRD pattern of $HTi_2(PO_4)_3$. The average particle size was calculated to be 13 nm, which is smaller than that of the product in Example 9, based on the Scherrer equation. ICP-AES and EDS indicate that the NaSICON-type compound contains some sulfate, in a ratio with phosphate of $SO_4^{2-}/PO_4^{3-}\sim0.30$.

Figure 31:
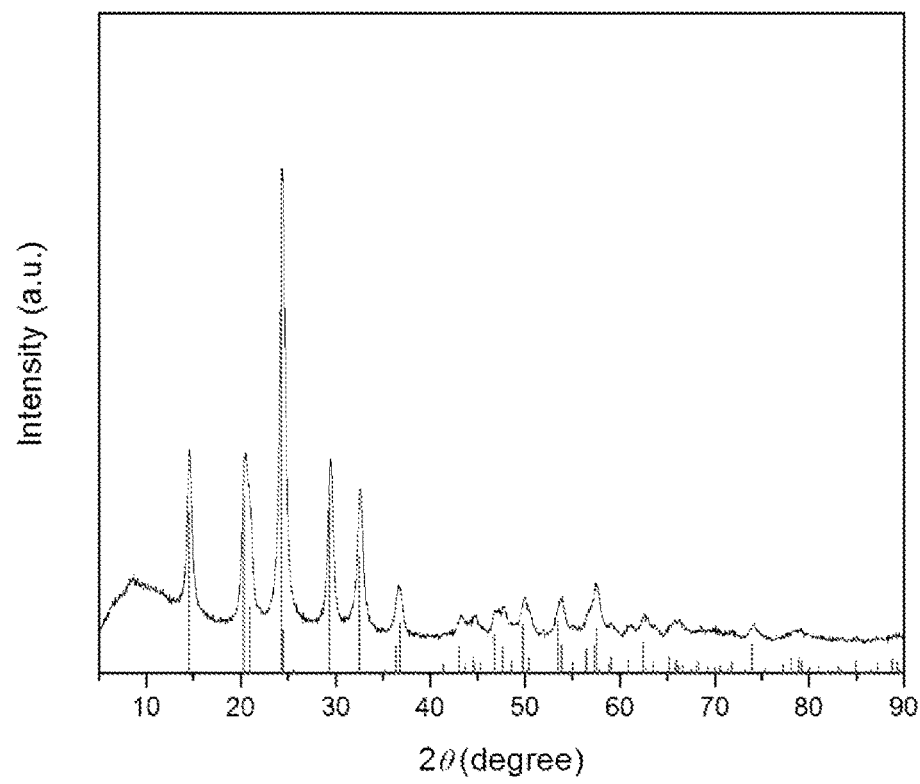
FIG. 31 shows a powder XRD pattern of the product formed in Example 24, with a simulated XRD pattern of $HTi_2(PO_4)_3$.

Example 24 is similar to Example 23 but the calcination temperature (650° C.) was higher, which led to a final product that had lower surface area (50 m²/g), a larger pore volume (0.38 cm³/g), bigger pores (31 nm on average) and a similar average particle size (13 nm). FIG. 31 shows a powder XRD pattern of the product, with a simulated XRD pattern of $HTi_2(PO_4)_3$. ICP-AES and EDS indicate that the NaSICON-type compound contains some sulfate, in a ratio with phosphate of $SO_4^{2-}/PO_4^{3-}\approx0.28$.

Figure 32:
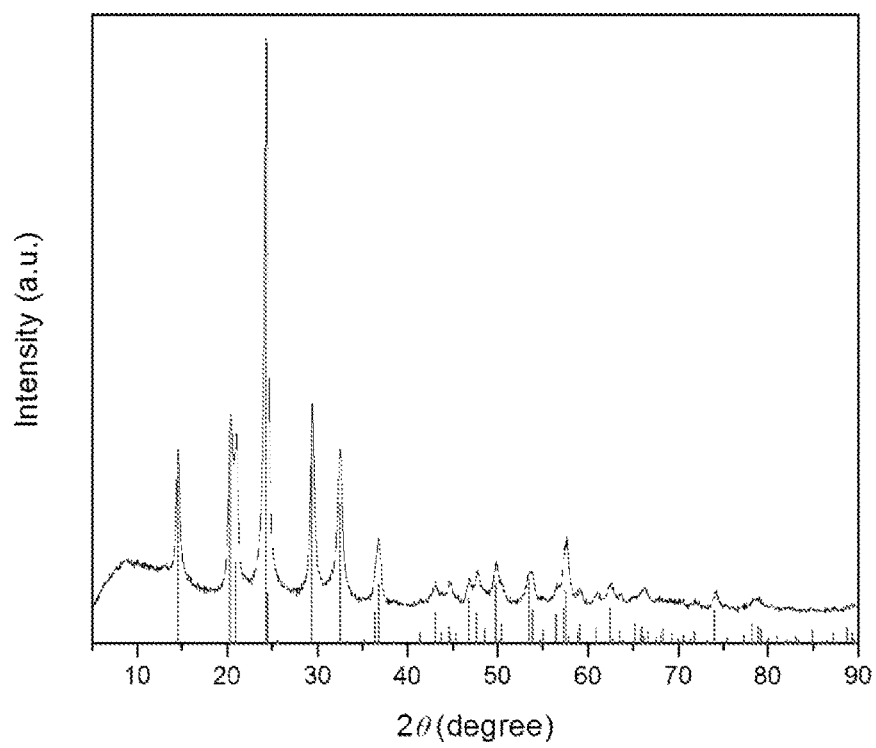
FIG. 32 shows a powder XRD pattern of the product in Example 25, with a simulated XRD pattern of $HTi_2(PO_4)_3$.

Example 25 is similar to Example 24 but the calcination temperature was higher (700° C.), which led to a final product that had a larger average particle size (18 nm), and contained less sulfate ($SO_4^{2-}/PO_4^{3-}\sim0.17$). FIG. 32 shows a powder XRD pattern of the product, with a simulated XRD pattern of $HTi_2(PO_4)_3$.

Figure 33:
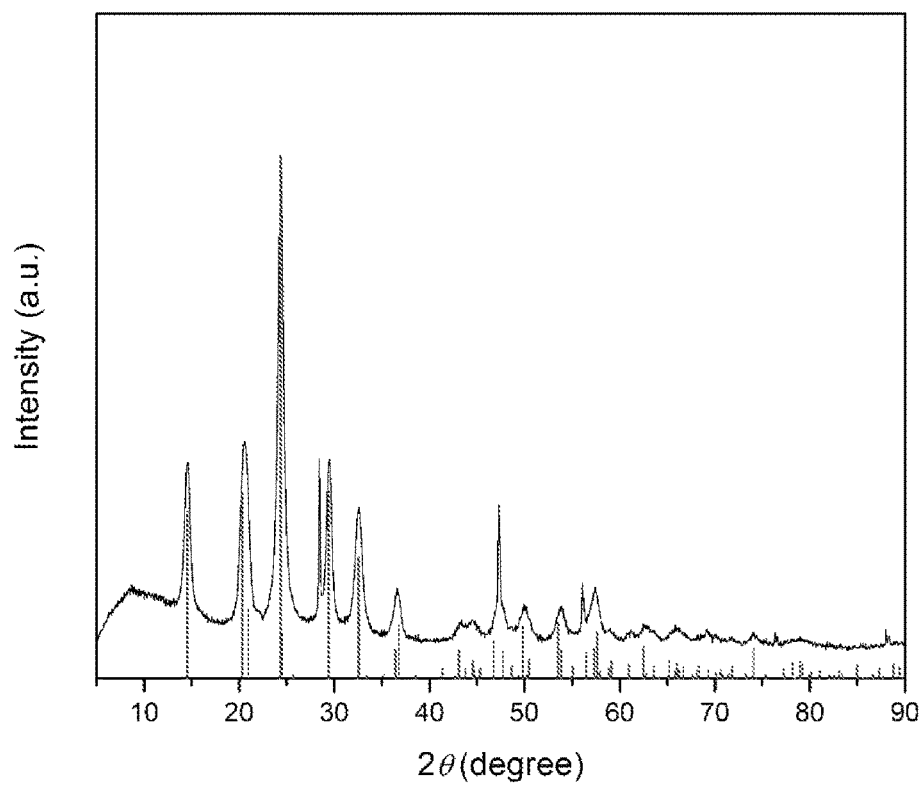
FIG. 33 shows a powder XRD pattern of the product in Example 26, with a simulated. XRD pattern of $HTi_2(PO_4)_3$. The peaks at $2\theta=28.45, 47.24$, and $56.06°$ are from the Si internal standard.

Example 26 is similar to Example 13 but the solution was covered and heated for a longer time and was subsequently dried in a lab oven prior to calcination. The calcination temperature was lower, which led to a final product that had a smaller average particle size (12 nm). FIG. 33 shows a powder XRD pattern of the product, with a simulated XRD pattern of $HTi_2(PO_4)_3$. The peaks at $2\theta=28.45, 47.24,$ and $56.06°$ are from the Si internal standard.

Figure 34:
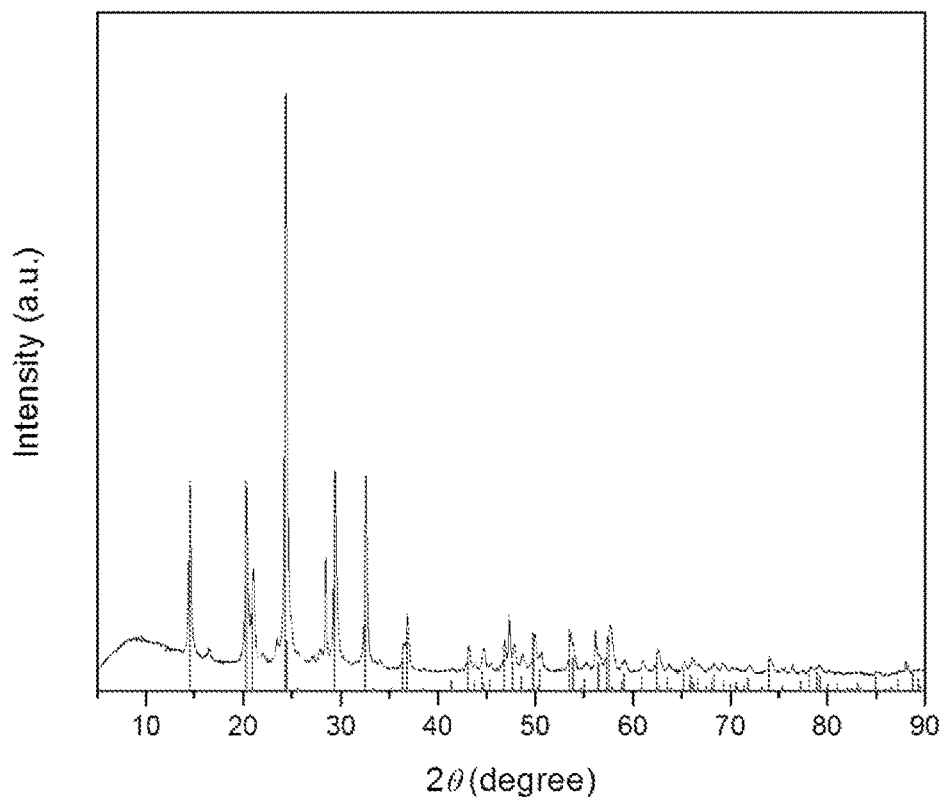
FIG. 34 shows a powder XRD pattern of the product formed in Example 27, with a simulated XRD pattern of $HTi_2(PO_4)_3$. The small peaks at $2\theta=28.45, 47.24$, and $56.06°$ are from the Si internal standard.

Example 27 is similar to Example 26 but the solution was covered and heated for a longer time and the calcination temperature was higher, which led to a final product with a larger average particle size (44 nm). FIG. 34 shows a powder XRD pattern of the product, with a simulated XRD pattern of $HTi_2(PO_4)_3$. The small peaks at $2\theta=28.45, 47.24,$ and $56.06°$ are from the Si internal standard.

Figure 35:
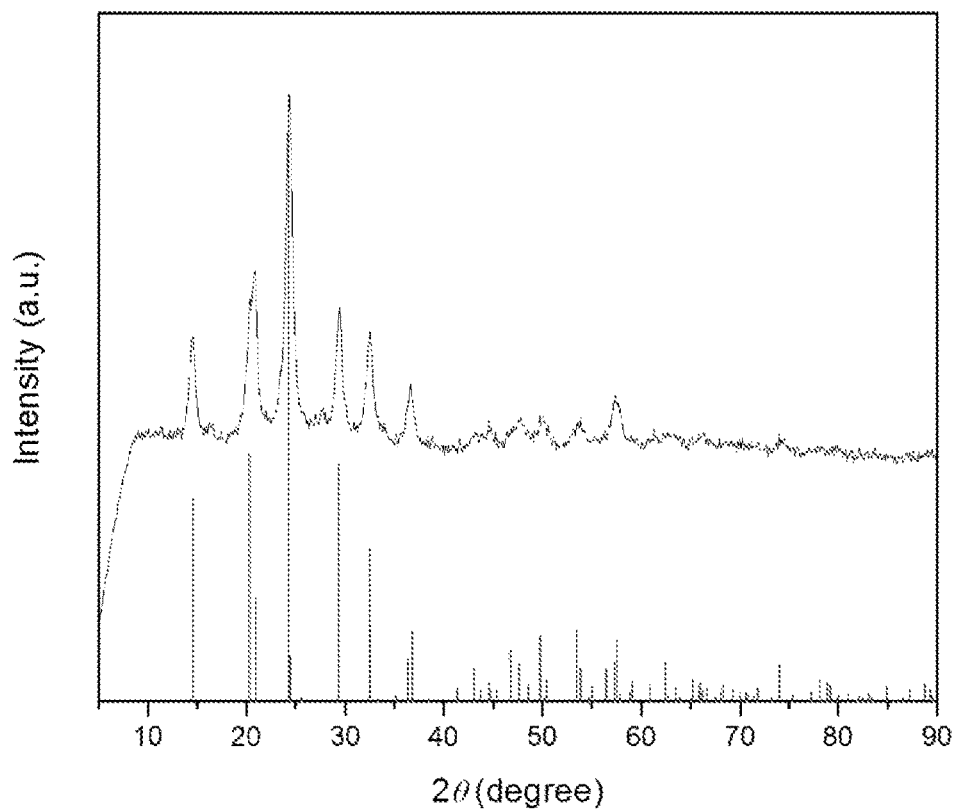
FIG. 35 shows a powder XRD pattern of the product formed in Example 28, with a simulated XRD pattern of $Ti_{1.5}Fe_{0.5}(PO_4)_3$.

Example 28 is similar to Example 14 but the solution was covered and heated for a shorter time and the calcination period was shorter, which led to a final product that had a smaller average particle size (14 nm). The off-white product was only washed twice after the calcination. FIG. 35 shows a powder XRD pattern of the product, with a simulated XRD pattern of $Ti_{1.5}Fe_{0.5}(PO_4)_3$. The product was identified as having a NaSICON-type structure.

Figure 36:
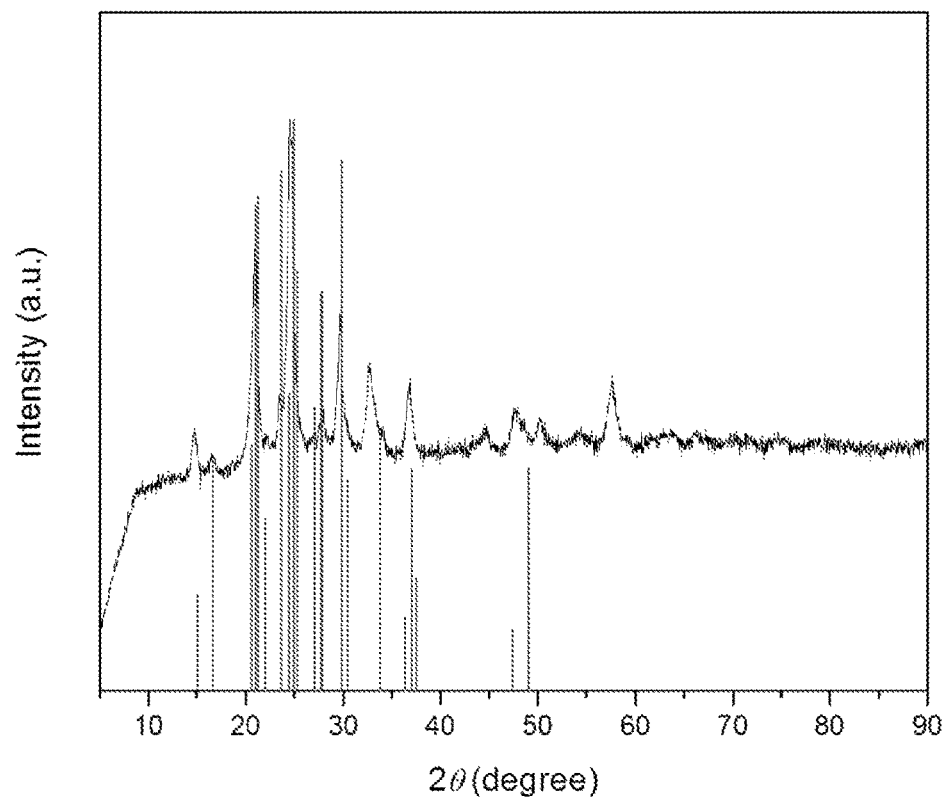
FIG. 36 shows a powder XRD pattern of the product formed in Example 29, with a reference XRD pattern of the monoclinic structure $Fe_3Ti(SO_4)_6$.

Example 29 is similar to Example 28 but the solution was left uncovered and heated for a longer time at a higher temperature, and calcination was done for a longer time, which led to a final product that was red and contained a substance with a crystal structure similar to that of $Fe_3Ti(SO_4)_6$. FIG. 36 shows a powder XRD pattern of the product, with a reference XRD pattern of the monoclinic structure $Fe_3Ti(SO_4)_6$ (Ref: Grey, I., Lanyon, M., Stranger, R. *Aust. J. Chem.*, 49 801-815 (1996)).

Figure 37:
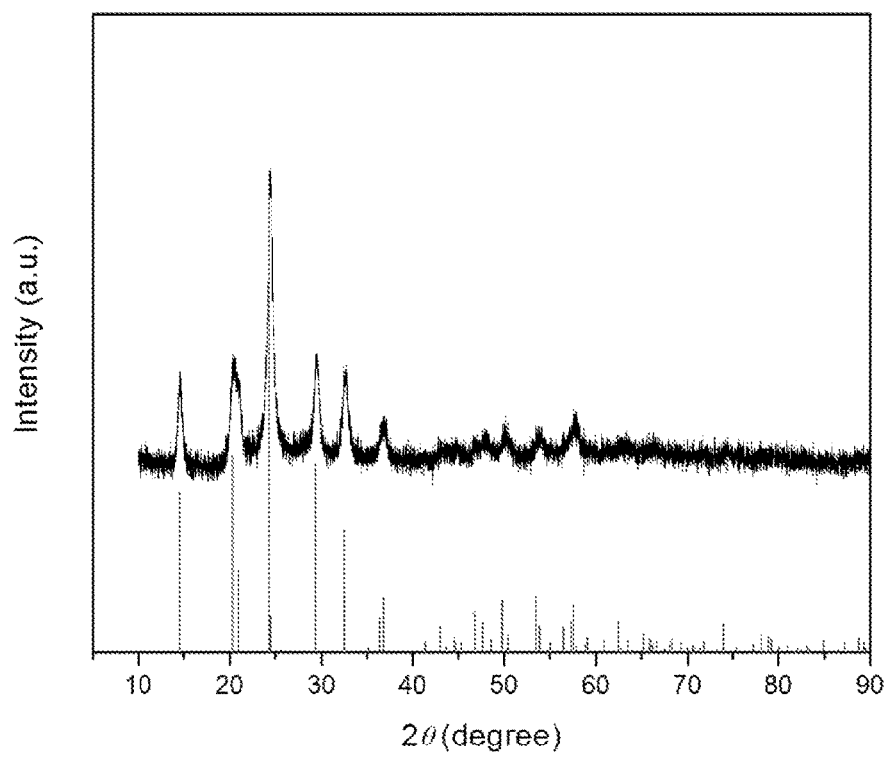
FIG. 37 shows a powder XRD pattern of the product formed in Example 30, with a simulated XRD pattern of $Ti_{1.5}Fe_{0.5}(PO_4)_3$.

Example 30 illustrates another implementation of process 100, in which grinding the semi-solid, obtained from heating $TiOSO_4$, $H_2O_2$, and $H_3PO_4$ with water, with $Fe(NO_3)_3$ and $H_3PO_4$ with water to form a paste, and subsequently drying the paste before calcination, led to a NaSICON-type compound that has both Ti and Fe in the structure. FIG. 37 shows a powder XRD pattern of the product, with a simulated XRD pattern of $Ti_{1.5}Fe_{0.5}(PO_4)_3$. The product was identified as having a NaSICON-type structure and the average particle size was calculated to be 14 nm based on the Scherrer equation.

Figure 38:
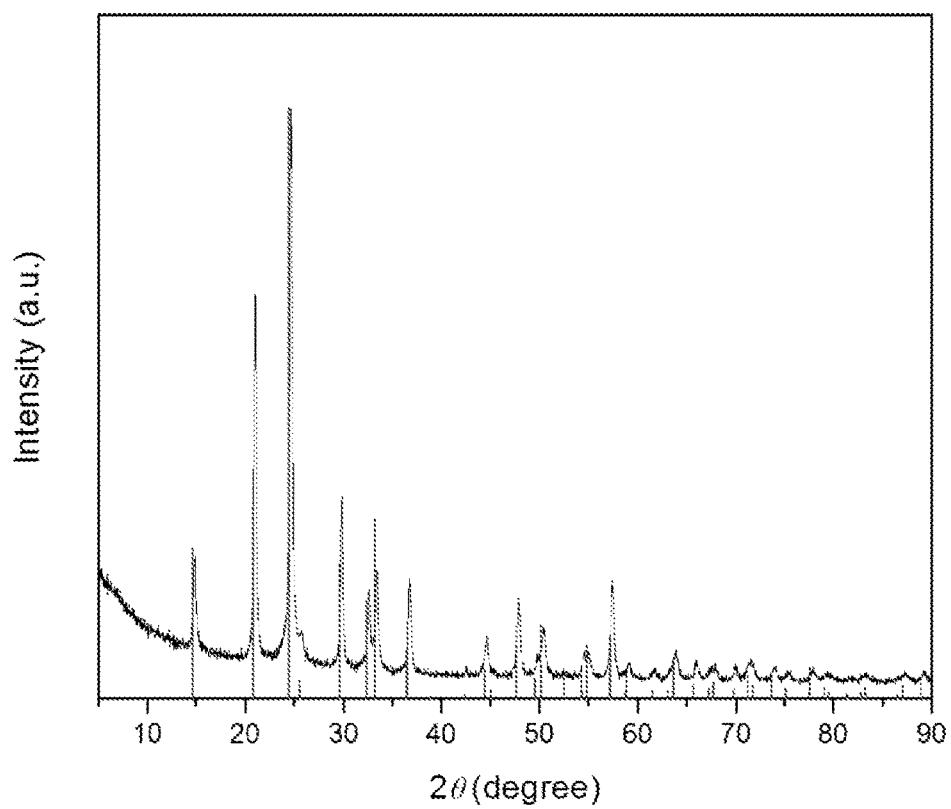
FIG. 38 shows a powder XRD pattern of the product formed in Example 31, with reference XRD pattern of $LiTi_2(PO_4)_3$.

Example 31 is similar to Example 16 but d-glucose was added as a carbon-forming agent and a lesser amount of $Li(NO_3)$ was used and the solution was dried before calcination, and calcination was carried out in an Ar flow instead of in air and at a higher temperature for a shorter time. The final product had a smaller average particle size (28 nm) and was black which indicated the presence of carbon in the product. It contained 7.5 wt % carbon as determined by thermogravimetric analysis (TGA). FIG. 38 shows a powder XRD pattern of the product, with reference XRD pattern of $LiTi_2(PO_4)_3$ (Ref: Natl. Bur. Stand. (U.S.) Monogr. 25, § 21, p 79 (1985)).

Figure 39:
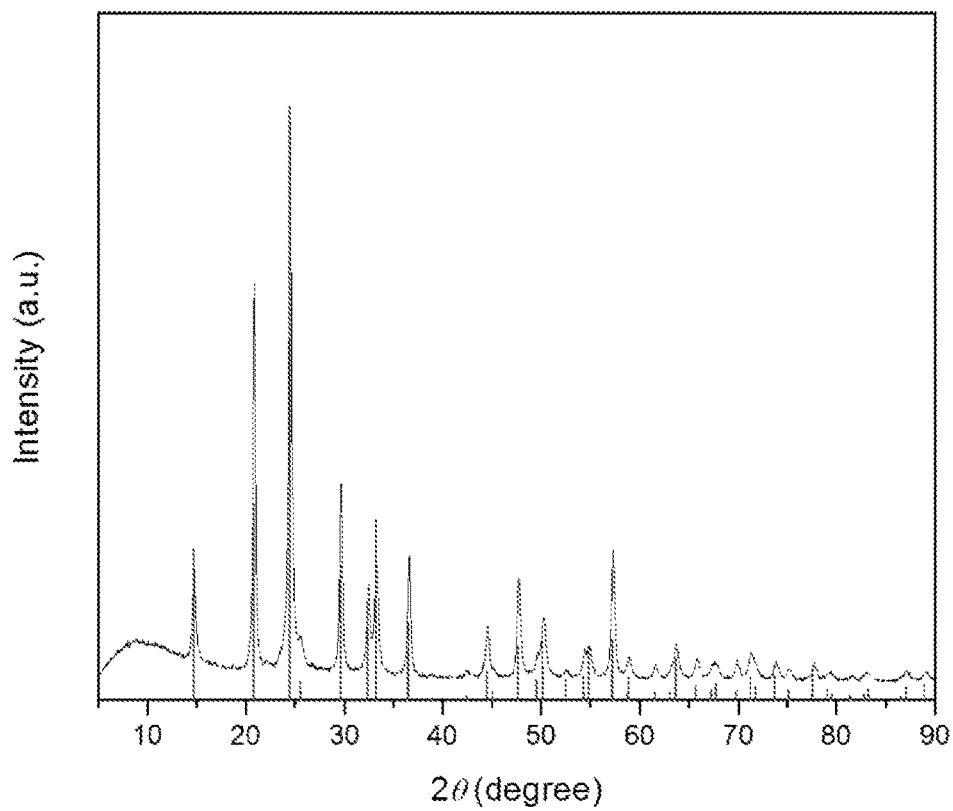
FIG. 39 shows a powder XRD pattern of the product formed in Example 32, with a reference XRD pattern of $LiTi_2(PO_4)_3$.

Example 32 is similar to Example 31 but the calcination temperature was lower. FIG. 39 shows a powder XRD pattern of the product, with a reference XRD pattern of $LiTi_2(PO_4)_3$ (Ref: Natl. Bur. Stand. (U.S.) Monogr. 25, § 21, p 79 (1985)). The average particle size was 22 nm and the product had a higher carbon content (9 wt %).

Figure 40:
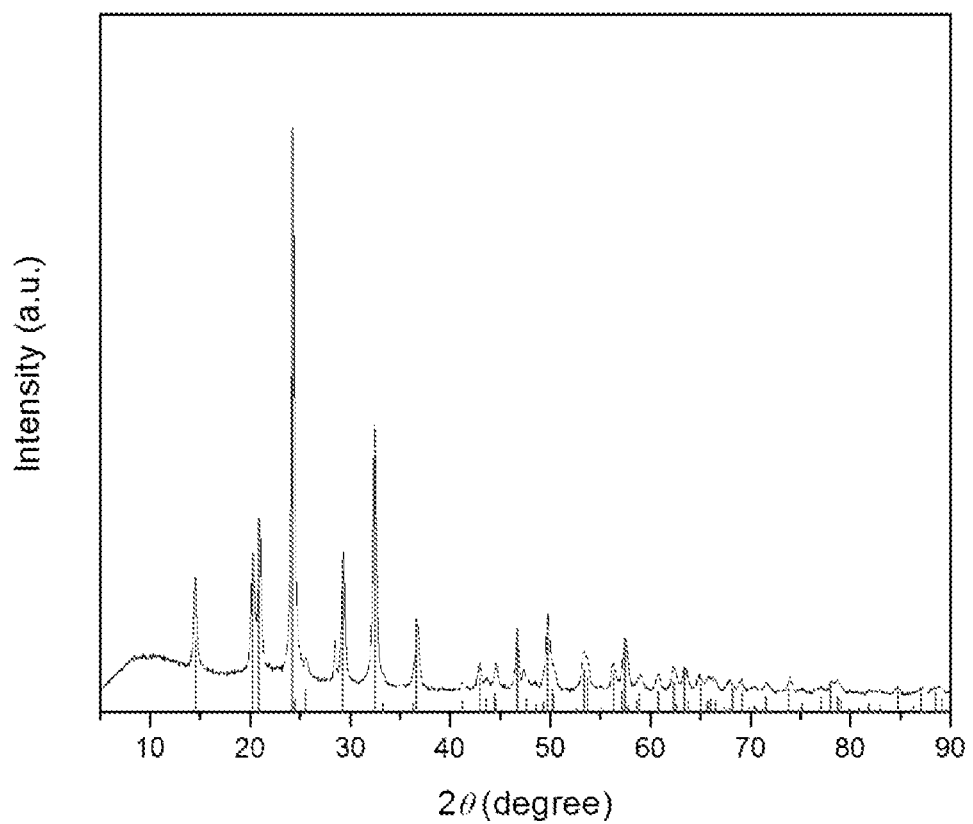
FIG. 40 shows a powder XRD pattern of the product formed in Example 33, with a reference XRD pattern of $NaTi_2(PO_4)_3$. The small peaks at $2\theta=28.45, 47.24$, and $56.06°$ are from the Si internal standard.

Example 33 is similar to Example 16 but $NaNO_3$ was added instead of $LiNO_3$, with a nominal Na:Ti ratio of 1:2. FIG. 40 shows a powder XRD pattern of the product, with a reference XRD pattern of $NaTi_2(PO_4)_3$ (Ref: Natl. Bur. Stand. (U.S.) Monogr. 25, § 19, p 79 (1982)). The small peaks at $2\theta=28.45, 47.24,$ and $56.06°$ are from the Si internal standard. The average particle size was 23 nm.

Figure 41:
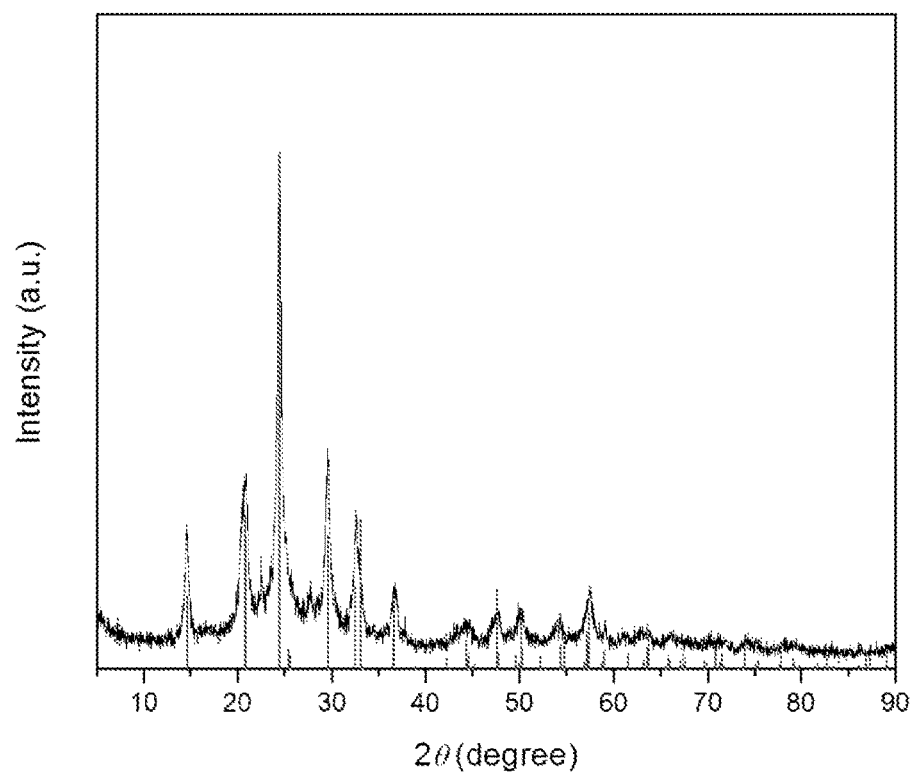
FIG. 41 shows a powder XRD pattern of the product formed in Example 34, with a reference XRD pattern of $Mg_{0.5}Ti_2(PO_4)_3$.

Example 34 is similar to Example 16 but $Mg(NO_3)_2$ was added instead of $LiNO_3$, with a nominal Mg:Ti ratio of 0.5:2. FIG. 41 shows a powder XRD pattern of the product, with a reference XRD pattern of $Mg_{0.5}Ti_2(PO_4)_3$ (Ref: Natl. Bur. Stand. (U.S.) Monogr. 25, § 18, p 41 (1981). The average particle size was 19 nm.

Figure 42:
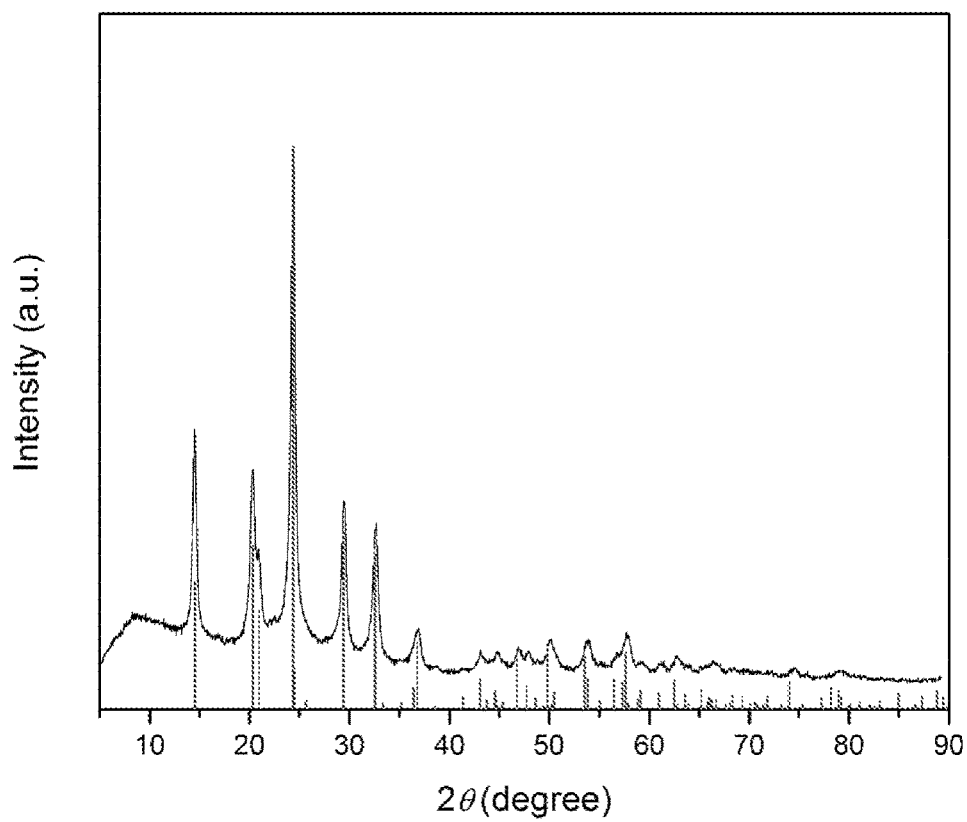
FIG. 42 shows a powder XRD pattern of the product formed in Example 35, with a simulated XRD pattern of $Al_{0.33}Ti_2(PO_4)_3$.

Example 35 is similar to Example 16 but $Al(NO_3)_3$ was added instead of $LiNO_3$, with a nominal Al:Ti ratio of 0.33:2, which led to a final product with a powder XRD pattern that matched a simulated XRD pattern of hypothetical $Al_{0.33}Ti_2(PO_4)_3$ with a NaSICON-type structure. FIG. 42 shows a powder XRD pattern of the product, with a simulated XRD pattern of $Al_{0.33}Ti_2(PO_4)_3$. The average particle size was 17 nm.

Figure 43:
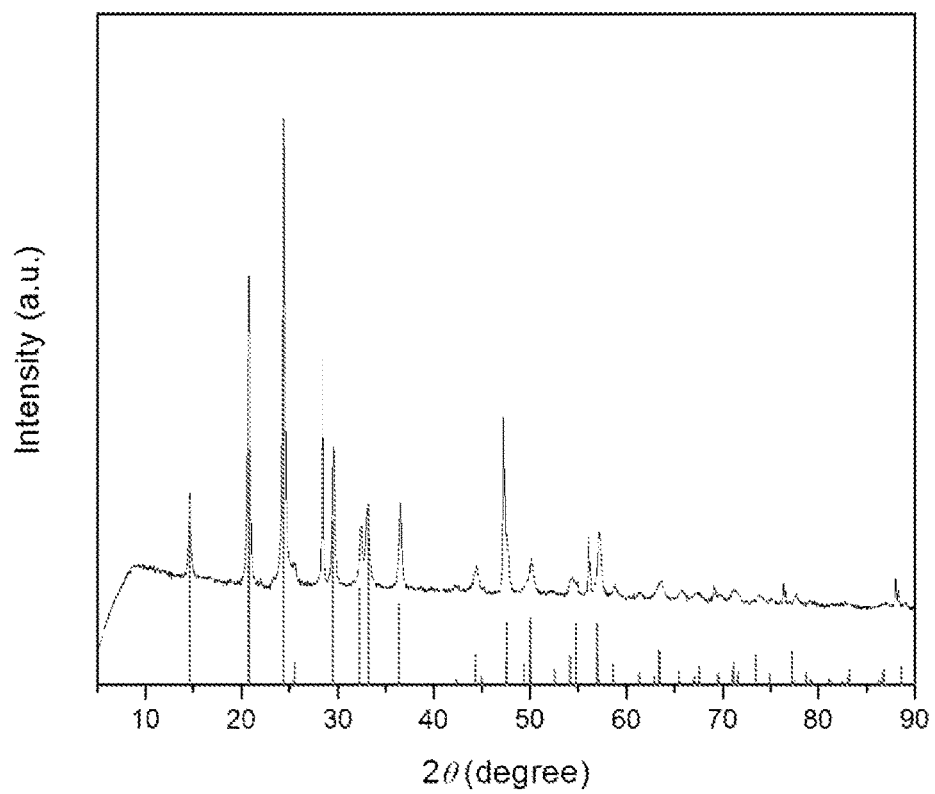
FIG. 43 shows a powder XRD pattern of the product formed in Example 36, with a reference XRD pattern of $Li_{1.5}Ti_{1.5}Fe_{0.5}(PO_4)_3$. The peaks at $2\theta=28.45, 47.24$, and $56.06°$ are from the Si internal standard.

Example 36 is similar to Example 16 but with nominal Li:Ti:Fe ratios of 1.5:1.5:0.5. FIG. 43 shows a powder XRD pattern of the product, with a reference XRD pattern of $Li_{1.5}Ti_{1.5}Fe_{0.5}(PO_4)_3$ (Ref: Catti M., Comotti A., DiBlas S., Ibberson R. M. *J. Mater. Chem.*, 14 835-839 (2004)). The peaks at 2θ=28.45, 47.24, and 56.06° are from the Si internal standard. The average particle size was 23 nm.

Figure 44:
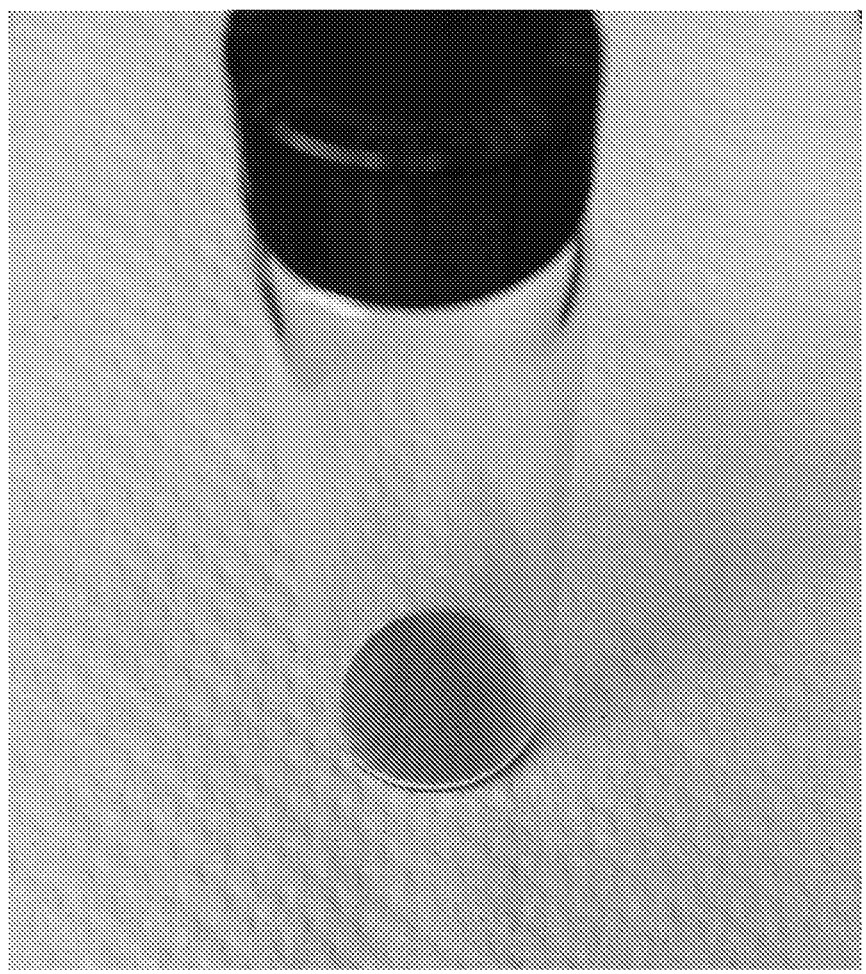
FIG. 44 shows a photograph of the product formed in Example 37.

Example 37 illustrates another implementation of process 100, in which the product of Example 24 was immersed in water with dissolved cationic blue dye molecules, and then washed with water. The persistent blue color did not wash away. A photograph of the product is shown in FIG. 44.

Example 38 illustrates another implementation of process 100, in which the product of Example 24 was immersed in water with dissolved anionic indicator dye molecules. The acidic nature of the mixture was indicated by a color change of methyl orange from orange to red upon immersion. The pH was about 3 as indicated by a pH meter.

Example 39 is similar to Example 38 but the product of Example 28 was immersed instead, which led to an acidic mixture with a slightly higher pH (~4).

Figure 45:
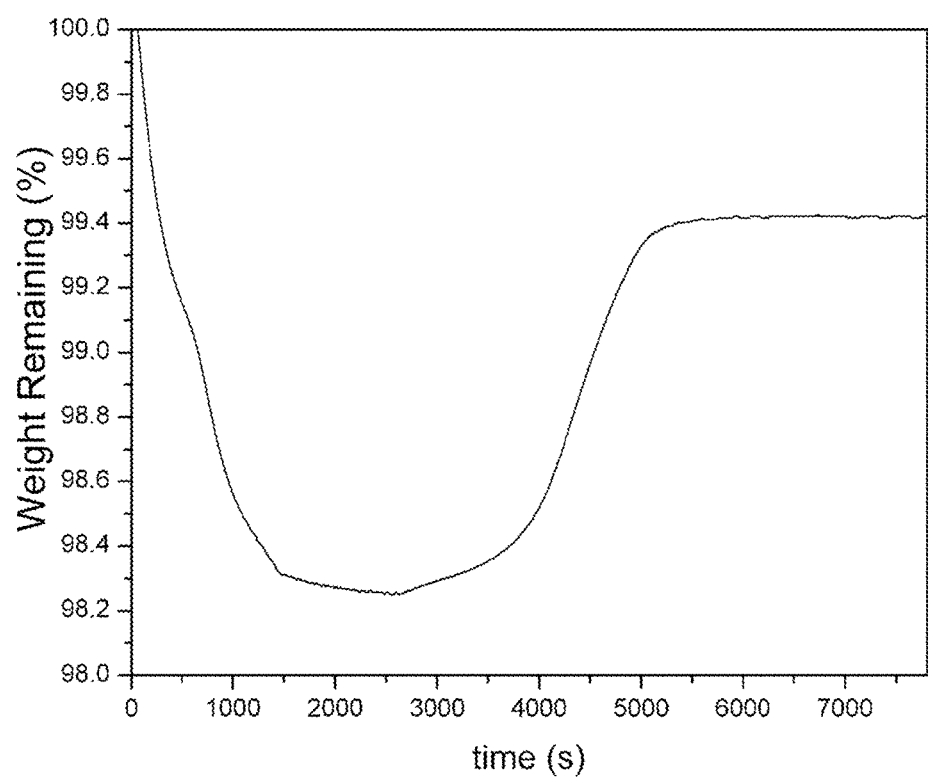
FIG. 45 shows a thermogravimetric curve of the product formed in Example 40.

In Example 40, the product was prepared in the same way as in Example 24, and TGA was performed on the product up to 500° C. in air. FIG. 45 shows a TGA curve of the product. The product lost weight during heating and regained weight when returned to room temperature, which may be attributable to water adsorbing in the vacant ion cages of the NaSICON-type structure.

Figure 46:
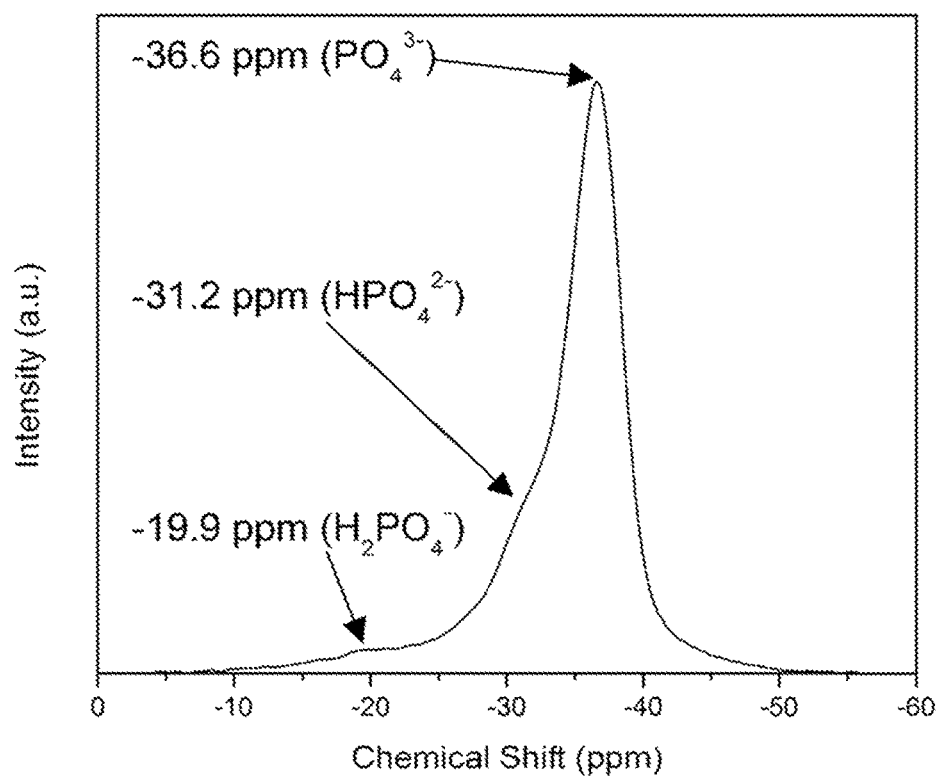
FIG. 46 shows the $^{31}P$ magic-angle spinning (MAS) nuclear magnetic resonance (NMR) spectrum of the product formed in Example 41.

In Example 41, the product was prepared in the same way as in Example 24, and $^{31}P$ magic-angle spinning, nuclear magnetic resonance (MAS NMR) spectroscopy was performed on the product. FIG. 46 shows the $^{31}P$ MAS NMR spectrum of the product where the peaks at −36.6, −31.2 and −19.9 ppm are attributed to phosphate, hydrogen phosphate and dihydrogen phosphate, respectively.

Figure 47:
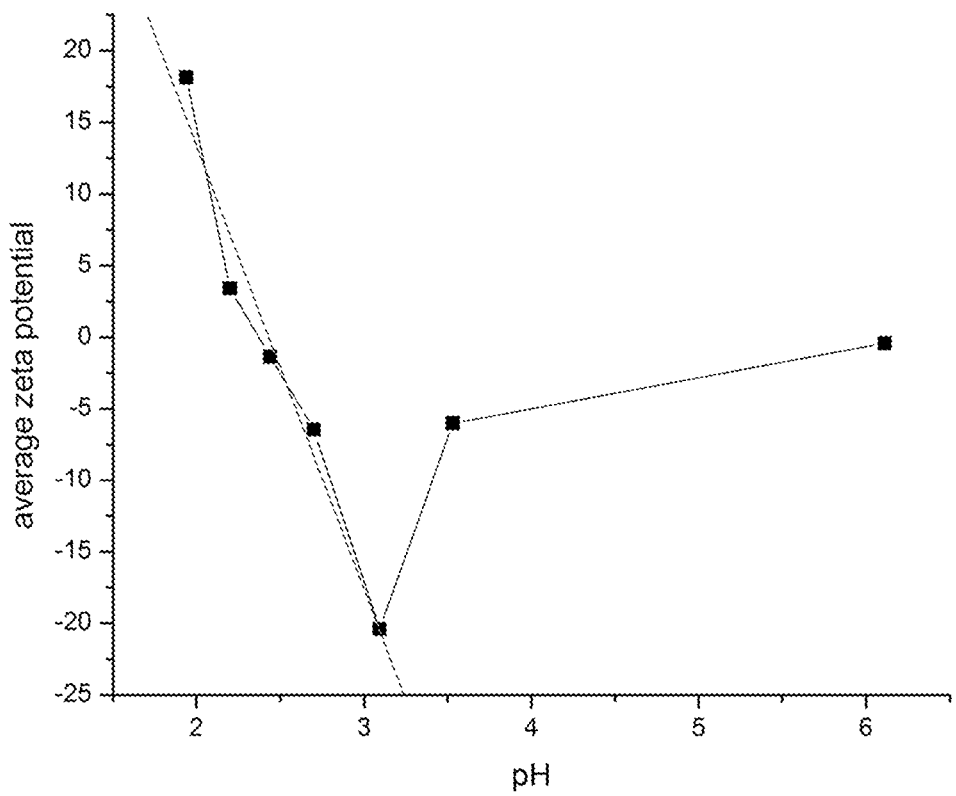
FIG. 47 shows a graph of zeta potential at different pH values, measured using the product formed in Example 42.

In Example 42, the product was prepared in the same way as in Example 24, and zeta potential analysis was performed on the product. FIG. 47 shows a graph of zeta potential at different pH values, measured using the product. The point of zero charge was 3.

Figure 48:
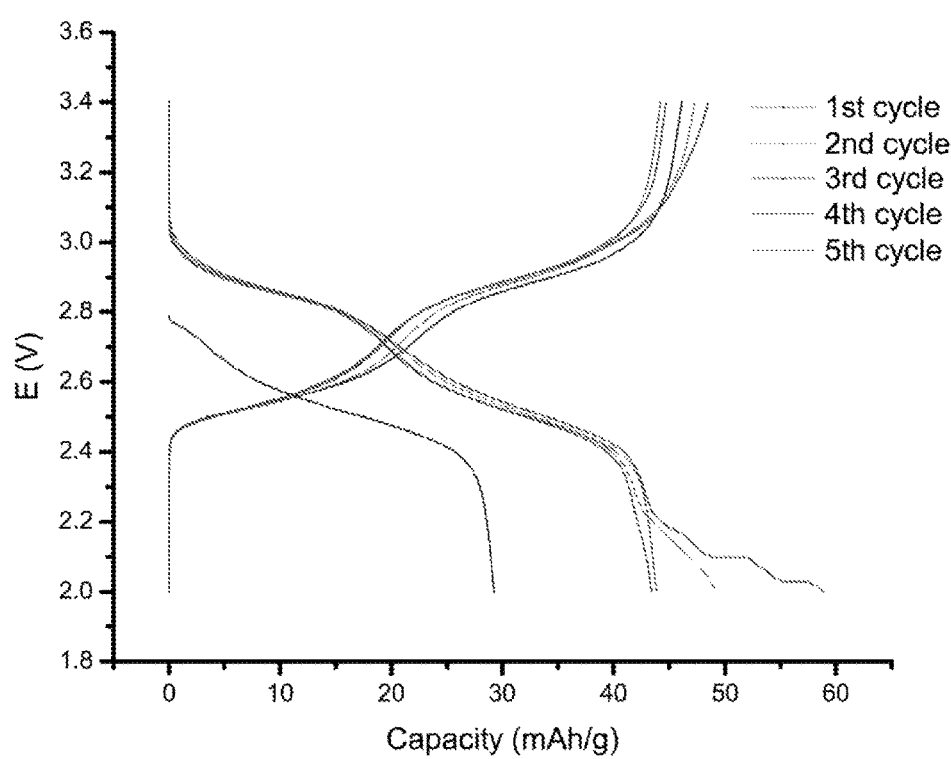
FIG. 48 is the charge/discharge graph of the washed product formed in Example 43, over the first 5 discharge/charge cycles, determined by galvanostatic measurement at 7 mA/g.

In Example 43, the product was prepared in the same way as in Example 9. The product was characterized vs. Li/Li+ by galvanostatic and potentiodynamic measurements. After washing, the product was mixed with polyvinylidene difluoride (PVDF) binder (Kynar) and SuperP Li carbon black (TimCal) with a ratio of 80:10:10 by weight. N-methyl-2-pyrrolidone was added dropwise and the slurry was then stirred overnight. This slurry was then coated onto a piece of aluminum foil with doctor-blading. This slurry-coated Al foil was dried in an oven at 120° C. for at least 5 hrs to remove any residual solvent. The coated foil was then punched into disks and weighed. Half cells were assembled in an argon-filed glove box using lithium metal foil as the anode, Celgard 2500 as separator, and 1 M $LiPF_6$ in ethylene carbonate/dimethyl carbonate (1:1 by vol., MTI) as electrolyte. Galvanostatic and potentiodynamic measurements were performed on a BioLogic VMP3 between 2-3.4 V vs. Li/Li−. For galvanostatic measurements, C-rates were determined using a theoretical capacity of 140 mAh/g, according to a 1:1 Li:Ti ratio. The current densities corresponding to the C-rates are as follows: C/20 (7 mA/g), C/10 (14 mA/g), C/5 (28 mA/g), C/2 (70 mA/g), C/1 (140 mA/g). For potentiodynamic measurements, a five mV voltage step was used with a current of 7 mA/mg of the washed product. FIG. 48 is the charge/discharge graph of the washed product formed in Example 43, over the first 5 discharge/charge cycles, determined by galvanostatic measurement at 7 mA/g.

Figure 49:
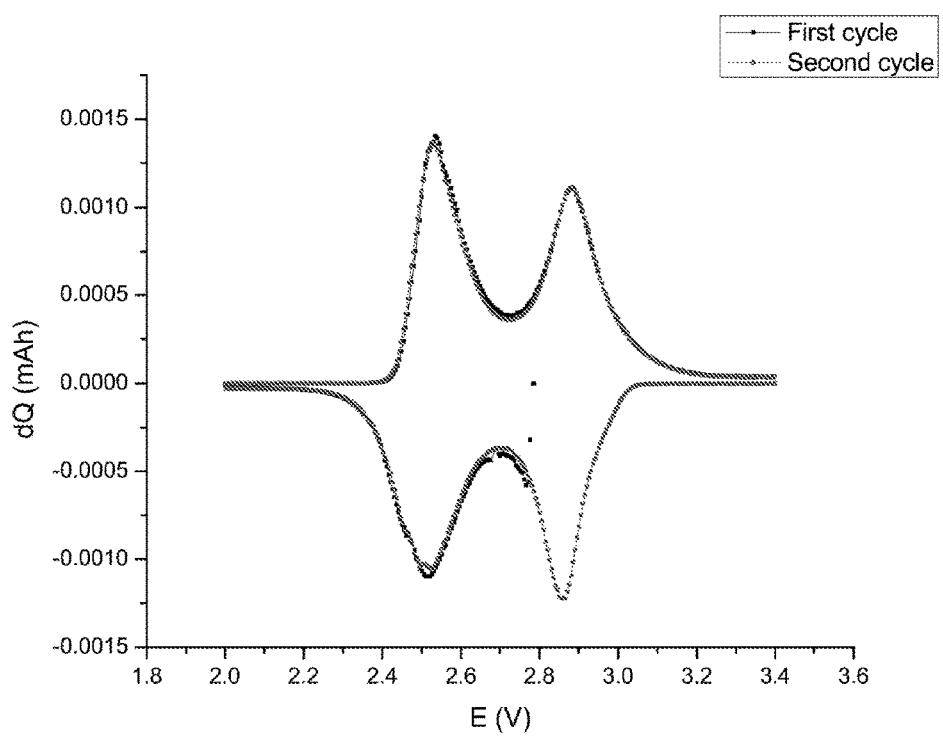
FIG. 49 shows a differential charge plot of the washed product formed in Example 43, showing the reversibility of lithium ion insertion and the potential of discharge and charge over the first two discharge/charge cycles.

FIG. 49 shows a differential charge plot of the washed product. These measurements show charging and discharging capacities of 28 mAh/g and 42 mAh/g at 7 mA/mg, and two charge/discharge potentials around 2.5 and 2.9 V in the differential charge plot.

Figure 50:
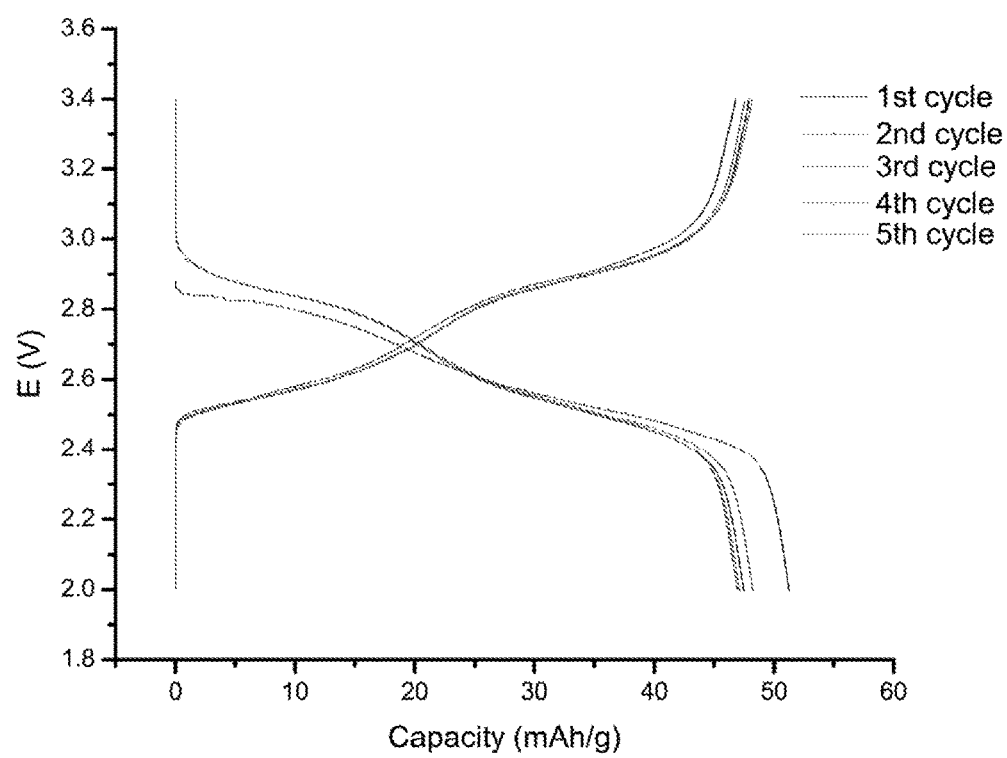
FIG. 50 shows a charge/discharge graph of the calcined product formed in Example 44, over the first 5 discharge/charge cycles, determined by galvanostatic measurement at 7 mA/g.
Figure 51:
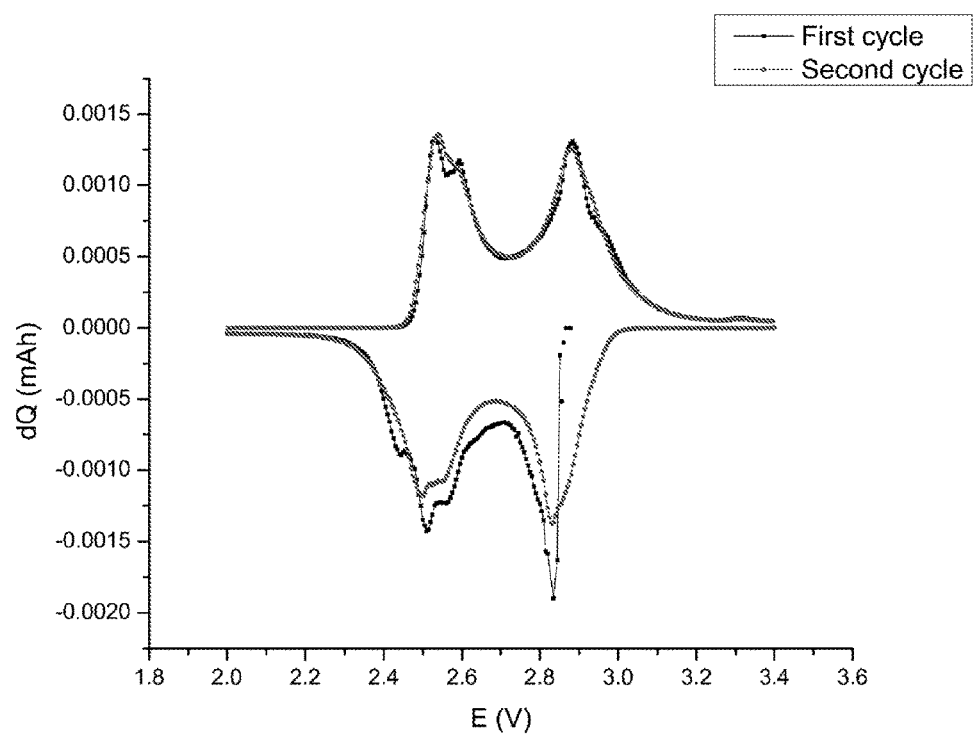
FIG. 51 shows a differential charge plot of the calcined product formed in Example 44, showing the reversibility of lithium ion insertion and the potential of discharge and charge over the first two discharge/charge cycles at various rates.

Example 44 is similar to Example 43 but the product of Example 9 was calcined at 500° C. prior to galvanostatic and potentiodynamic measurements. FIG. 50 shows a charge/discharge graph of the calcined product over the first 5 discharge/charge cycles, determined by galvanostatic measurement at 7 mA/g. The materials showed a higher capacity (47 and 51 mAh/g for charging and discharging). FIG. 51 shows a differential charge plot of the calcined product, showing the reversibility of lithium ion insertion and the potential of discharge and charge over the first two discharge/charge cycles.

Figure 52:
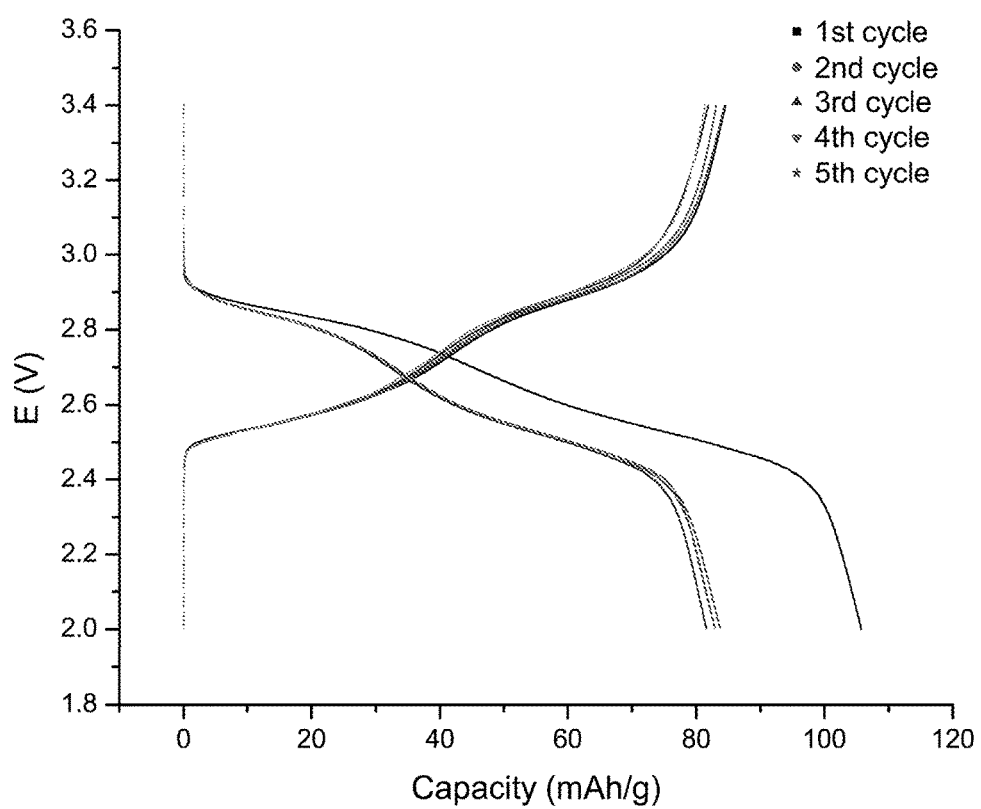
FIG. 52 shows a charge/discharge graph of the ball-milled product formed in Example 45, over the first 5 discharge/charge cycles, determined by galvanostatic measurement at 7 mA/g.
Figure 53:
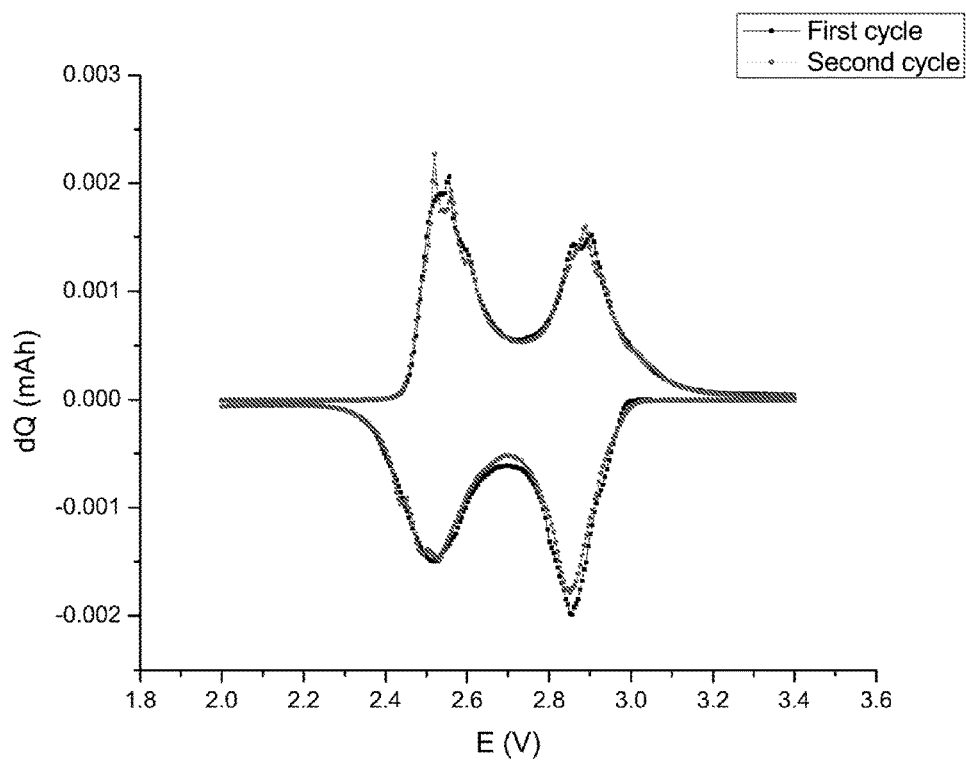
FIG. 53 shows a differential charge plot of ball-milled product formed in Example 45, showing the reversibility of lithium ion insertion and the potential of discharge and charge over the first two discharge/charge cycles.
Figure 54:
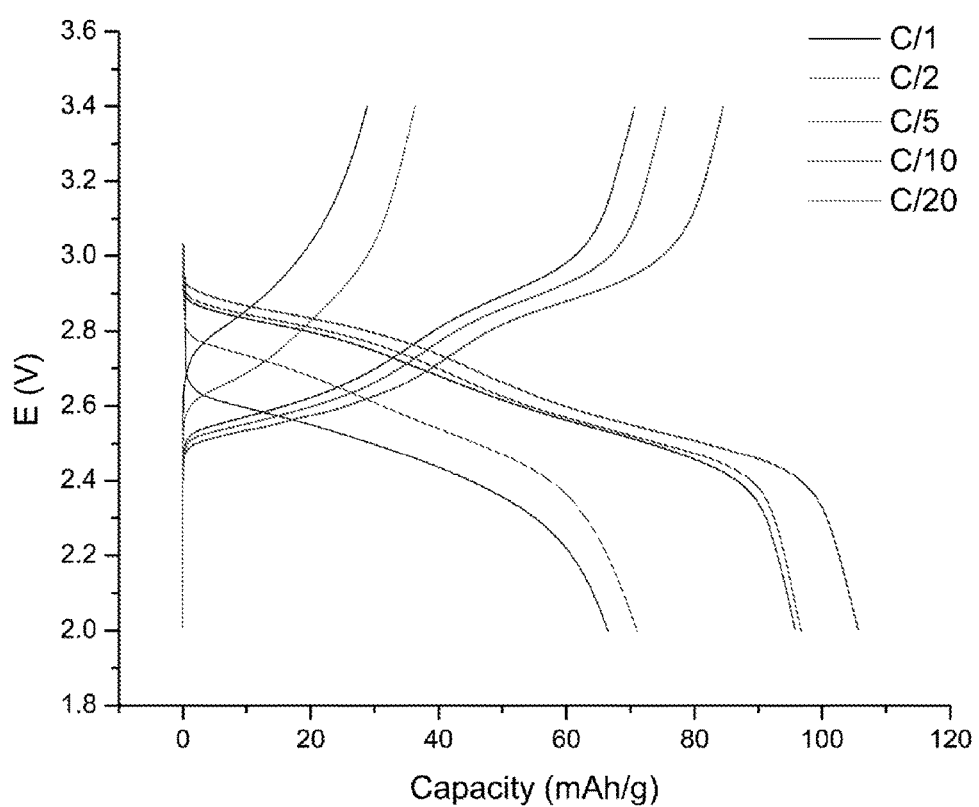
FIG. 54 shows discharge/charge profiles of the washed product formed in Example 45 at various rates.

Example 45 is similar to Example 43 but the product was ball-milled for 30 minutes prior to galvanostatic and potentiodynamic measurements. FIG. 52 shows a charge/discharge graph of the ball-milled product over the first 5 discharge/charge cycles, determined by galvanostatic measurement at 7 mA/g. FIG. 53 shows a differential charge plot of ball-milled product, showing the reversibility of lithium ion insertion and the potential of discharge and charge over the first two discharge/charge cycles. The material was tested at different charging/discharging rates from C/1 to C/20, where C/1 was the current needed to charge or discharge over the voltage range in 1 hour (140 mA/g) and C/20 in 20 hours. FIG. 54 shows discharge/charge profiles of the washed product at various rates. FIGS. 55A-55E show capacities vs. cycle number of the ball-milled product, cycled at various rates. A higher capacity of 85 and 106 mAh/g for charging and discharging was demonstrated, and around 95% of the initial capacity was retained after 100 cycles at 1 C.

Figure 56:
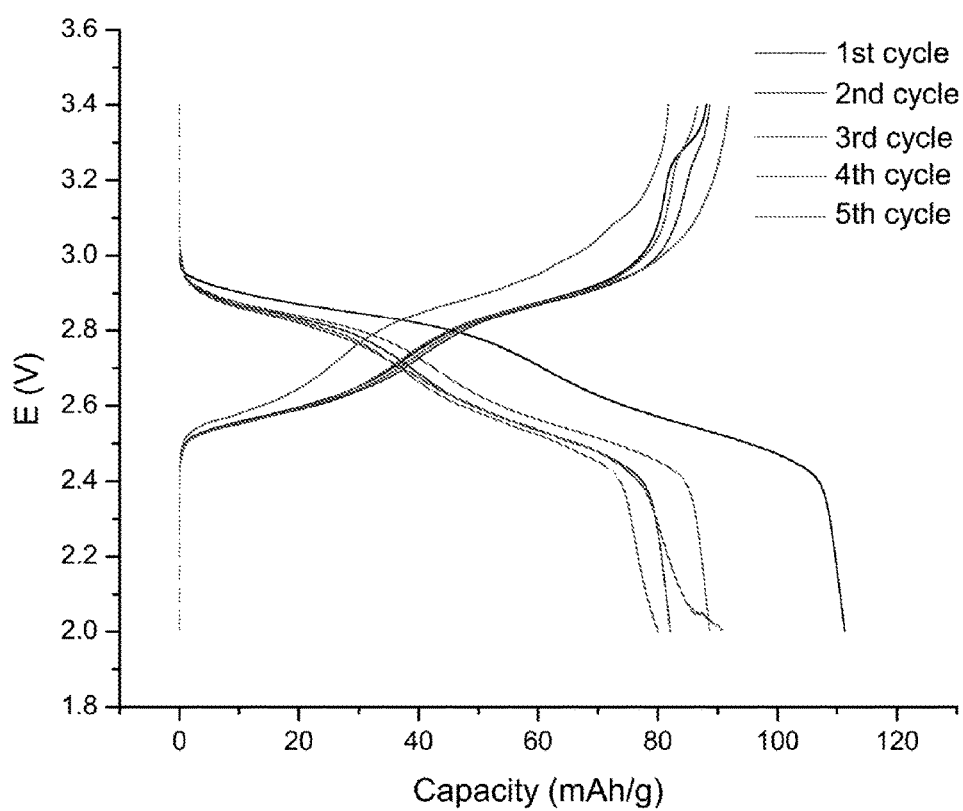
FIG. 56 shows a charge/discharge graph of the washed product formed in Example 46, over the first 5 discharge/charge cycles, determined by galvanostatic measurement at 7 mA/g.
Figure 57:
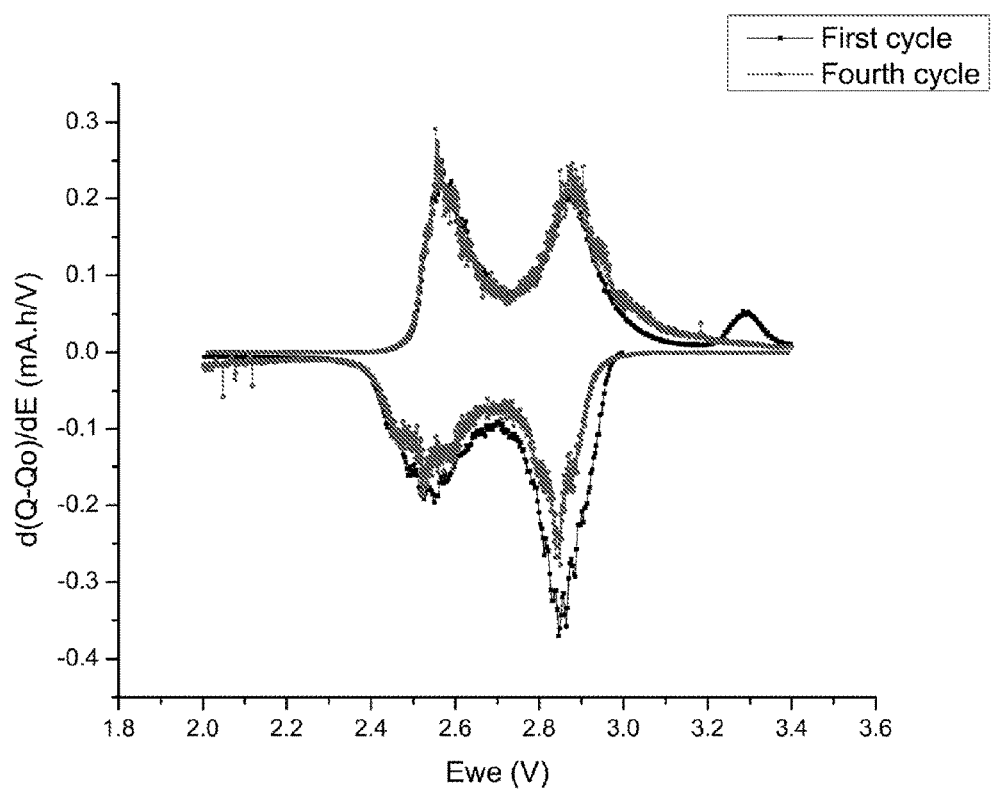
FIG. 57 shows a differential charge plot of the washed product formed in Example 46, showing both the voltage profile and the reversibility of lithium ion insertion for the first and fourth discharge/charge cycles.
Figure 58:
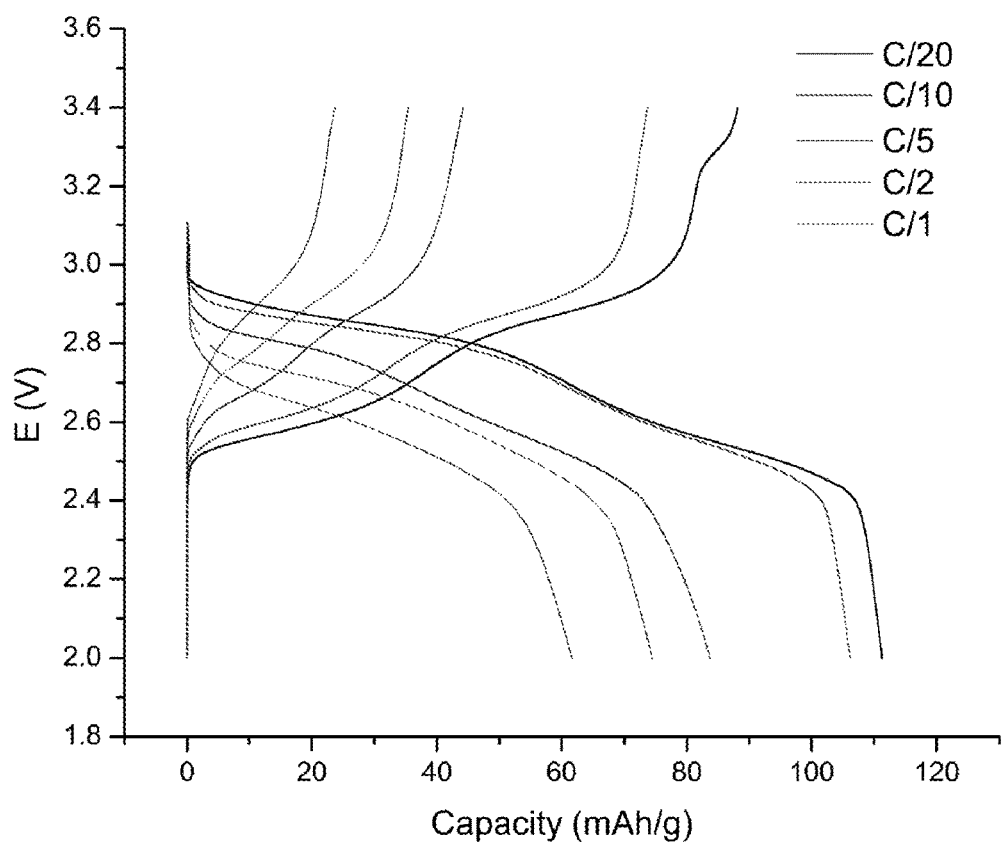
FIG. 58 shows charge/discharge curves of the washed product formed in Example 46 at various rates.
Figure 59:
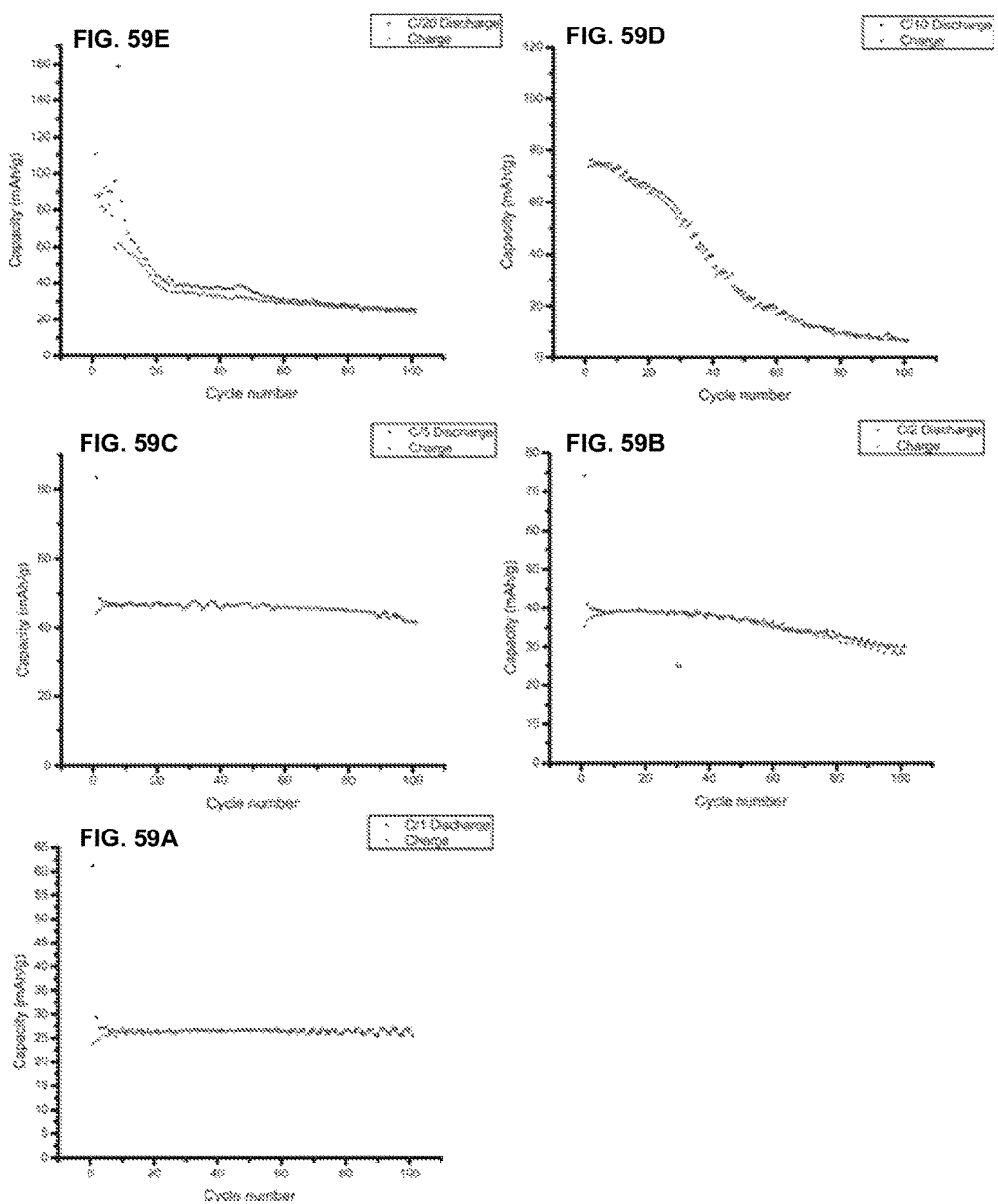
FIGS. 59A-59E show the capacities vs. cycle number of the washed product formed in Example 46, cycled at various rates.

Example 46 is similar to Example 43 but the product was prepared with a calcination temperature of 600° C. and showed a higher capacity (88 and 111 mAh/g for charging and discharging). FIG. 56 shows a charge/discharge graph of the washed product over the first 5 discharge/charge cycles, determined by galvanostatic measurement at 7 mA/g. FIG. 57 shows a differential charge plot of the washed product, showing both the voltage profile and the reversibility of lithium ion insertion for the first and fourth discharge/charge cycles. FIGS. 59A-59E show capacities vs. cycle number of the washed product, cycled at various rates.

Figure 60:
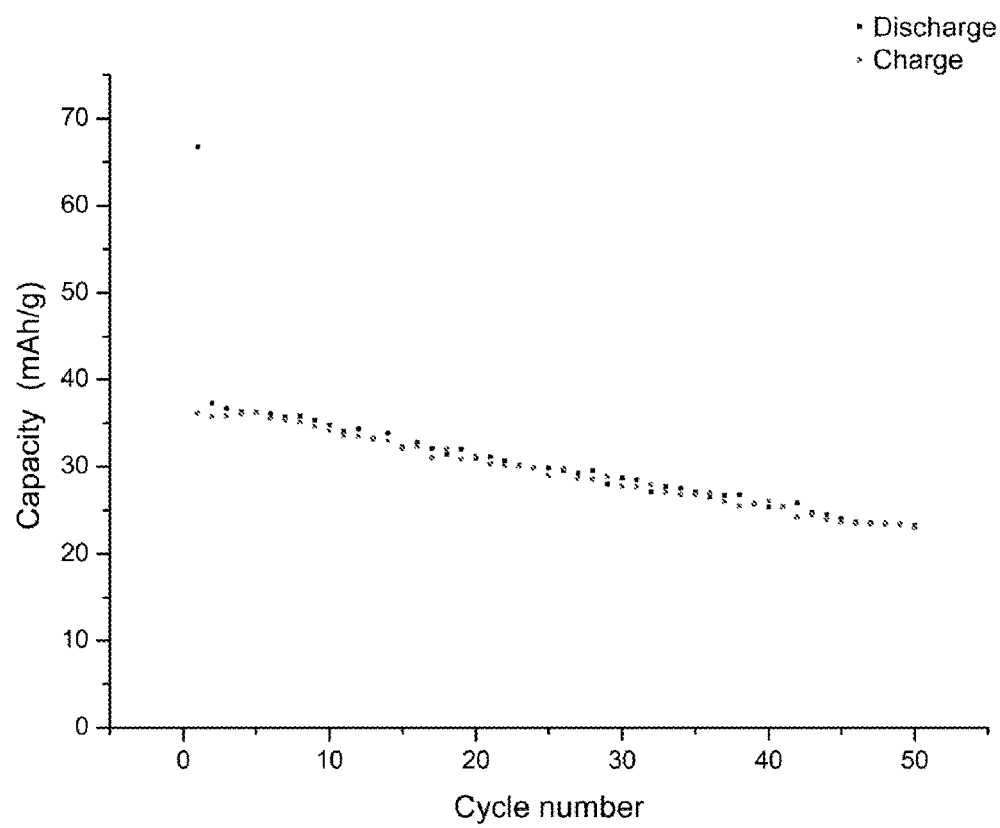
FIG. 60 shows the capacity vs. cycle number of the washed product formed in Example 47.
Figure 61:
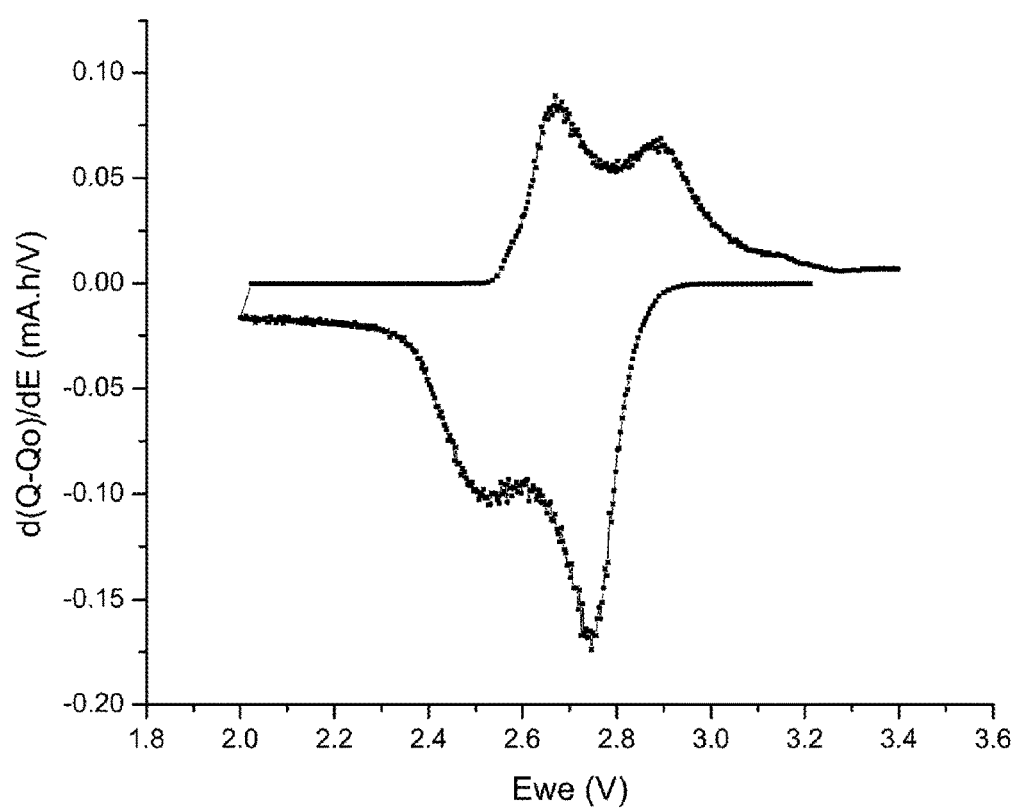
FIG. 61 shows a differential charge plot of the washed product formed in Example 47.

Example 47 is similar to Example 43 but the product was prepared with longer heating and subsequent drying steps before calcination. FIG. 60 shows the capacity vs. cycle number of the washed product. FIG. 61 shows a differential charge plot of the washed product. The product showed a higher capacity (36 and 67 mAh/g for charging and discharging).

Figure 62:
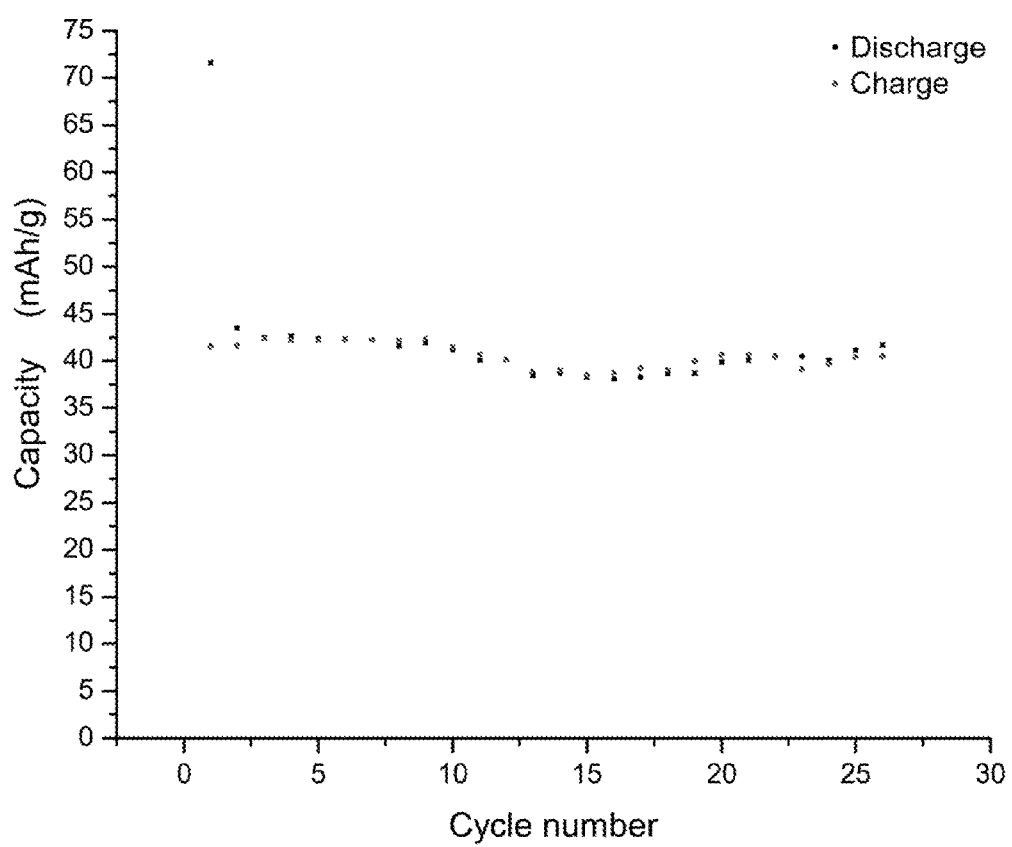
FIG. 62 shows the capacity vs. cycle number of the washed product formed in Example 48.
Figure 63:
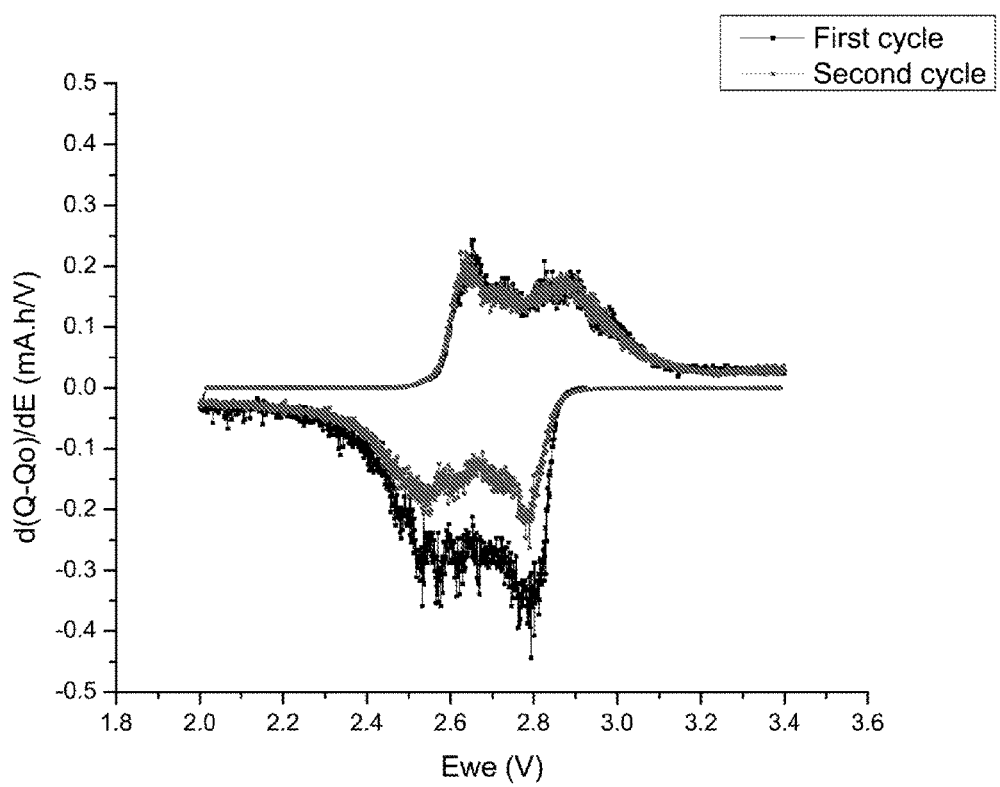
FIG. 63 shows a differential charge plot of the washed product formed in Example 48.

In Example 48, the product was synthesized in the same way as in Example 23 and characterized as in Example 43. FIG. 62 shows the capacity vs. cycle number of the washed product. FIG. 63 shows a differential charge plot of the washed product. The product showed ~100% of the initial capacity after 25 cycles and with a higher capacity (42 and 72 mAh/g for charging and discharging) and slightly offset charge/discharge voltages (2.6 and 2.9 V for charging, 2.5 and 2.8 V for discharging).

Figure 64:
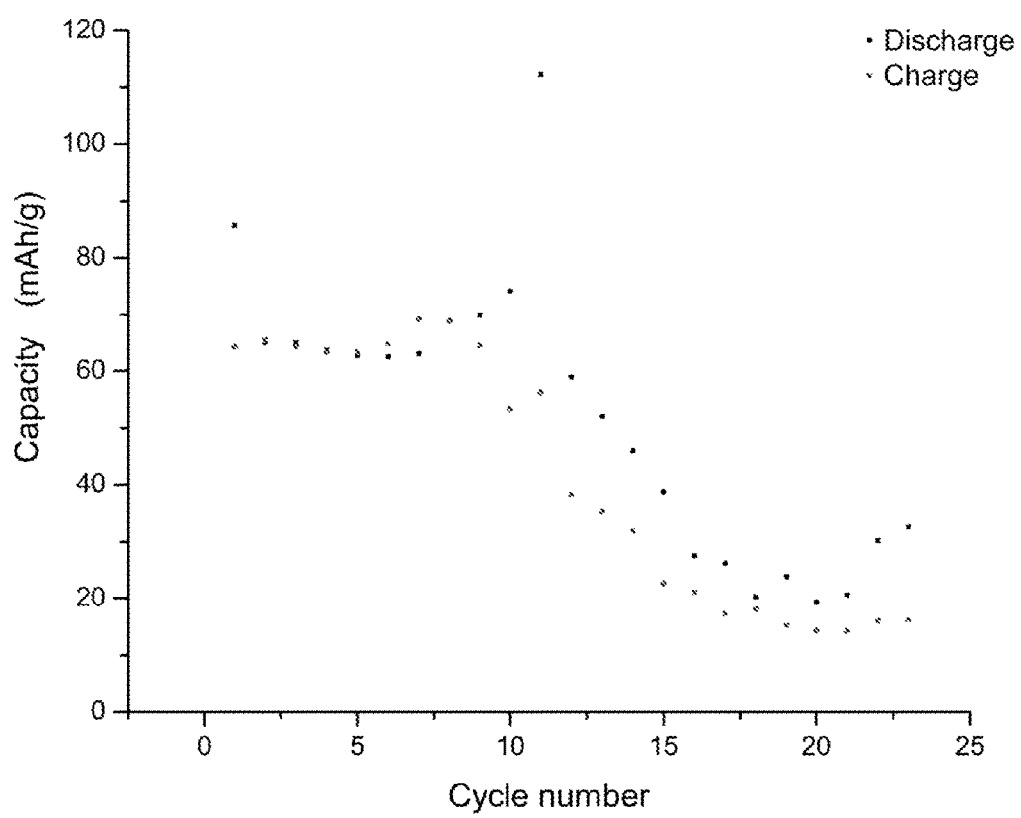
FIG. 64 shows the capacity vs. cycle number of the washed product formed in Example 49.
Figure 65:
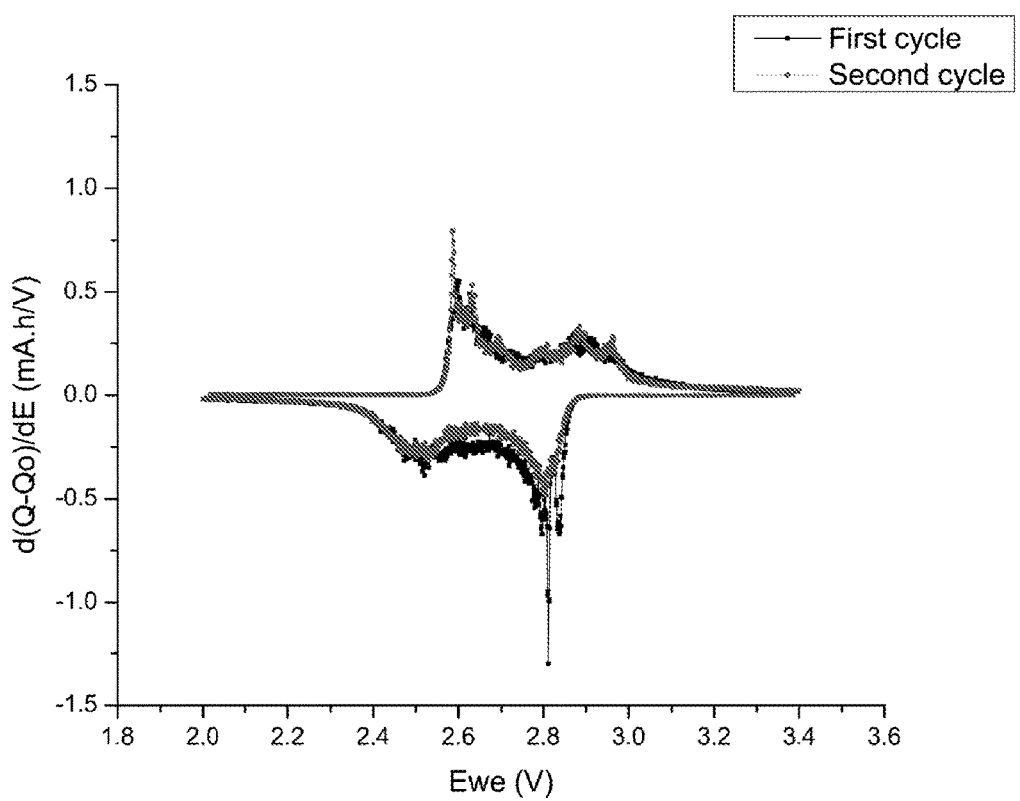
FIG. 65 shows a differential charge plot of the washed product formed in Example 49, showing both the voltage profile and the reversibility of lithium ion insertion for the first and second discharge/charge cycles.

In Example 49, the product was synthesized in the same way as in Example 24 and characterized as in Example 43. FIG. 64 shows the capacity vs. cycle number of the washed product. FIG. 65 shows a differential charge plot of the washed product, showing both the voltage profile and the reversibility of lithium ion insertion for the first and second discharge/charge cycles. The product showed a higher capacity (64 and 86 mAh/g for charging and discharging).

Figure 66:
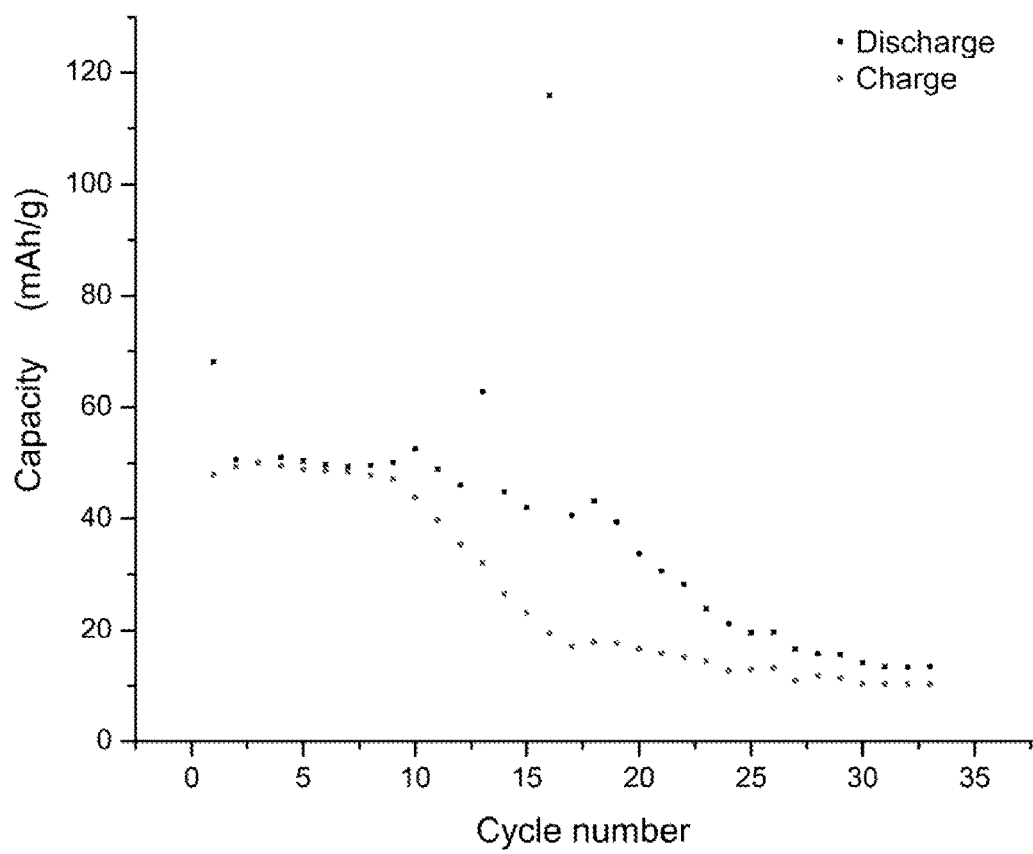
FIG. 66 shows the capacity vs. cycle number of the washed product formed in Example 50.
Figure 67:
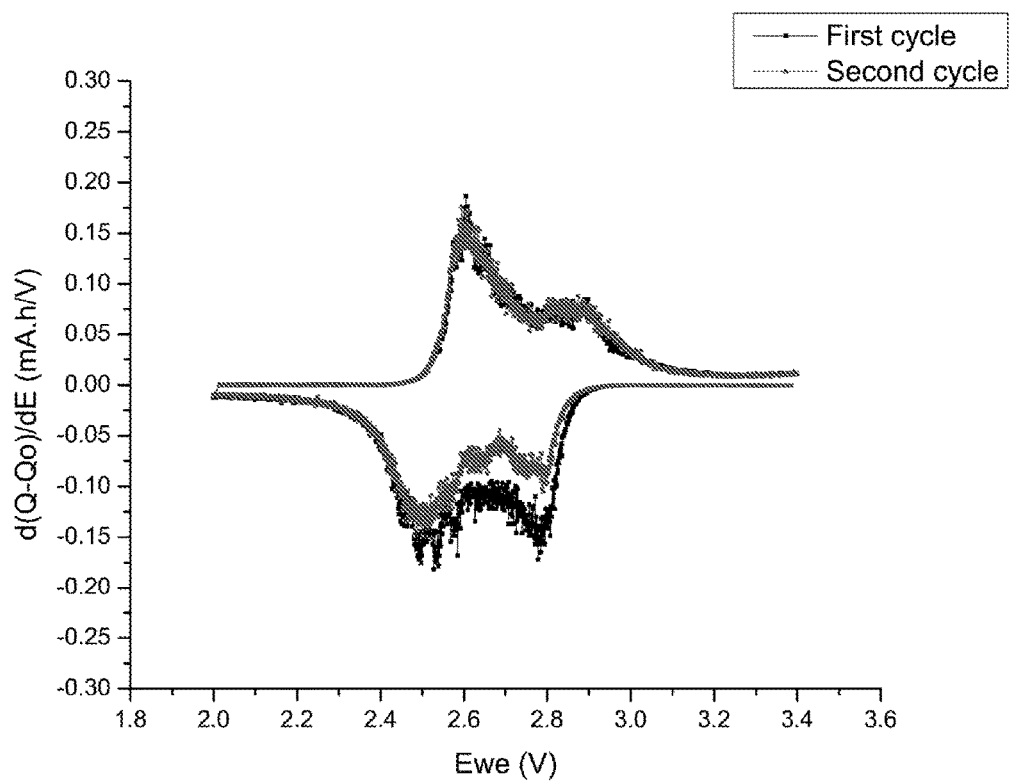
FIG. 67 shows a differential charge plot of the washed product formed in Example 50, showing both the voltage profile and the reversibility of lithium ion insertion for the first and second discharge/charge cycles.

In Example 50, the product was synthesized in the same way as in Example 25 and characterized as in Example 43. FIG. 66 shows the capacity vs. cycle number of the washed product. FIG. 67 shows a differential charge plot of the washed product, showing both the voltage profile and the reversibility of lithium ion insertion for the first and second discharge/charge cycles. The product lost 80% of its initial capacity after 25 cycles.

Figure 68:
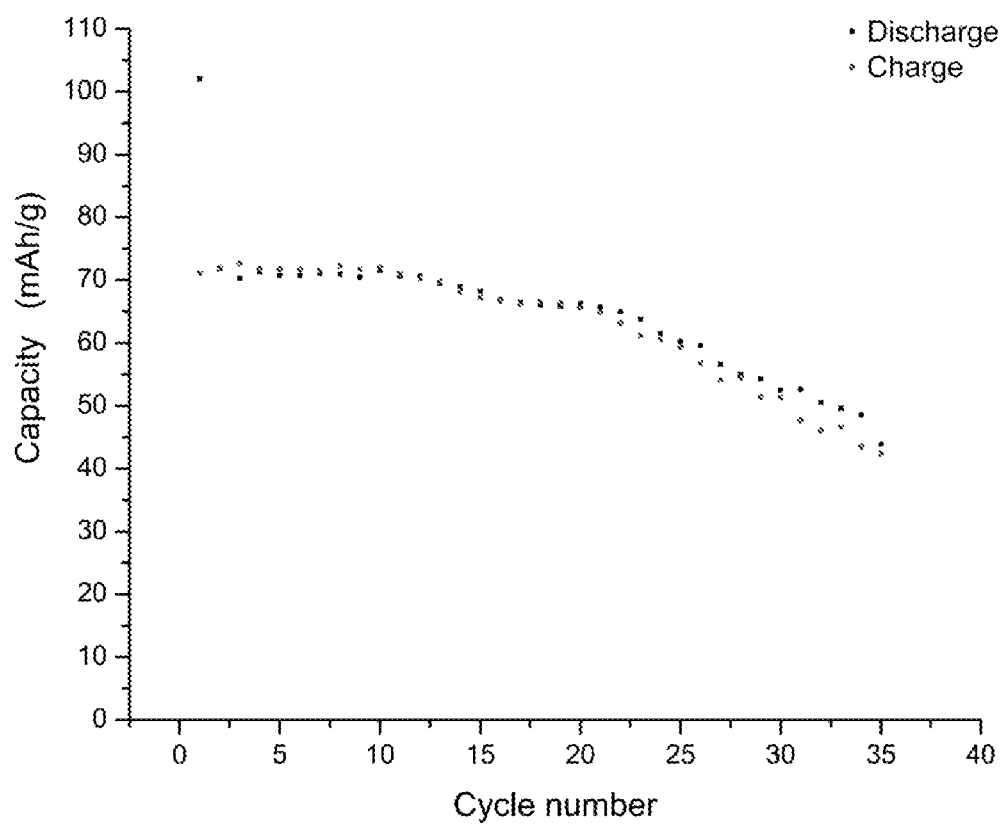
FIG. 68 shows capacity vs. cycle number of the washed product formed in Example 51.
Figure 69:
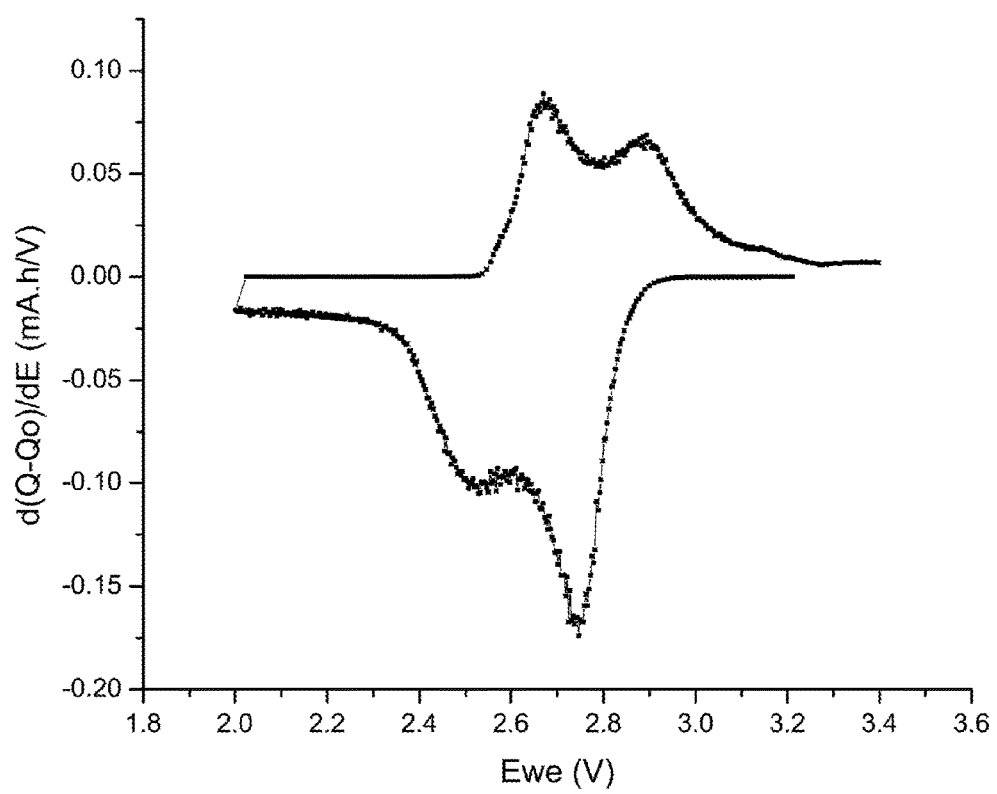
FIG. 69 shows a differential charge plot of the washed product formed in Example 51.

In Example 51, the product was synthesized in the same way as in Example 26 and characterized as in Example 43. FIG. 68 shows capacity vs. cycle number of the washed product. FIG. 69 shows a differential charge plot of the washed product. The product showed a higher capacity (71 and 102 mAh/g for charging and discharging) and ~60% of the initial capacity was retained after 35 cycles.

Figure 70:
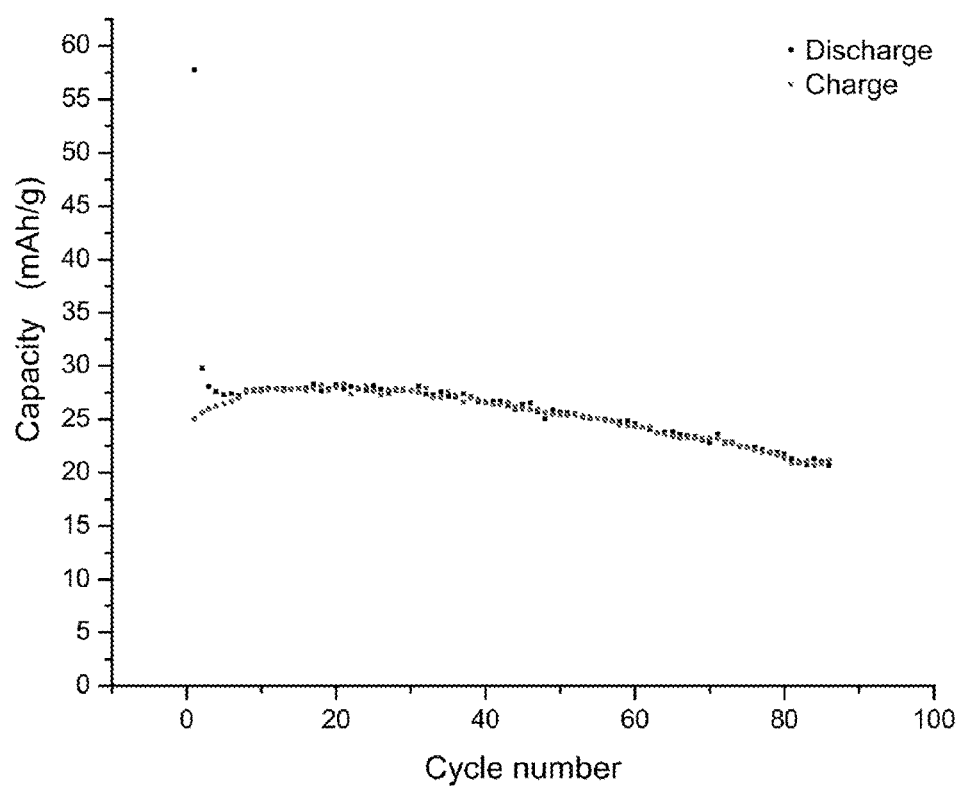
FIG. 70 shows the capacity vs. cycle number of the washed product formed in Example 52.
Figure 71:
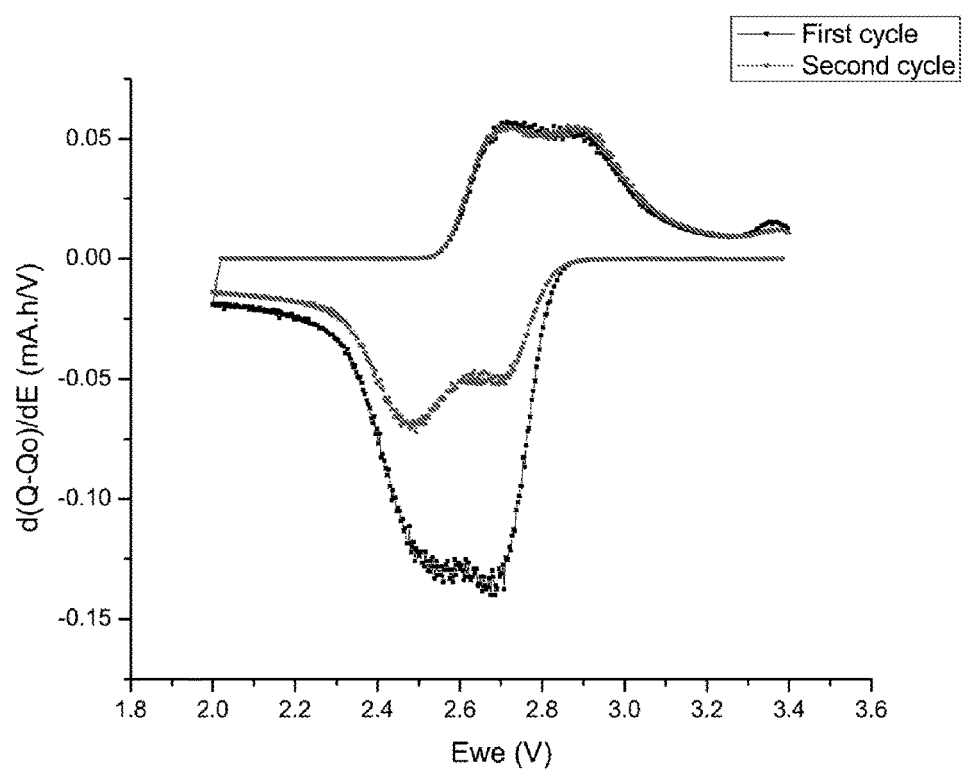
FIG. 71 shows a differential charge plot of the washed product formed in Example 52, showing both the voltage profile and the reversibility of lithium ion insertion for the first and second discharge/charge cycles.

In Example 52, the product was synthesized in the same way as in Example 13 and characterized as in Example 43. FIG. 70 shows the capacity vs. cycle number of the washed product. FIG. 71 shows a differential charge plot of the washed product, showing both the voltage profile and the reversibility of lithium ion insertion for the first and second discharge/charge cycles. The product retained about 50% of the initial capacity after 30 cycles. The charge potentials were about 2.7 and 2.9 V, and discharge potentials were about 2.5 and 2.7 V.

Figure 72:
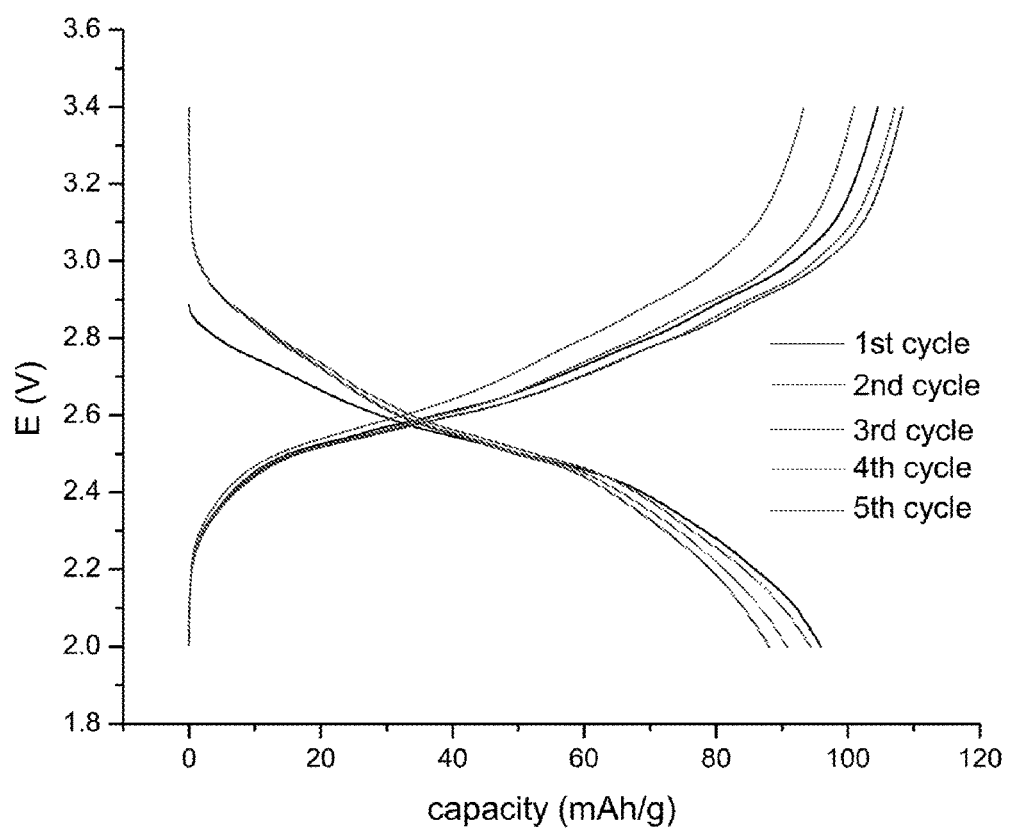
FIG. 72 shows a charge/discharge graph of the black product formed in Example 53, over the first 5 discharge/charge cycles, determined by galvanostatic measurement at 7 mA/g.
Figure 73:
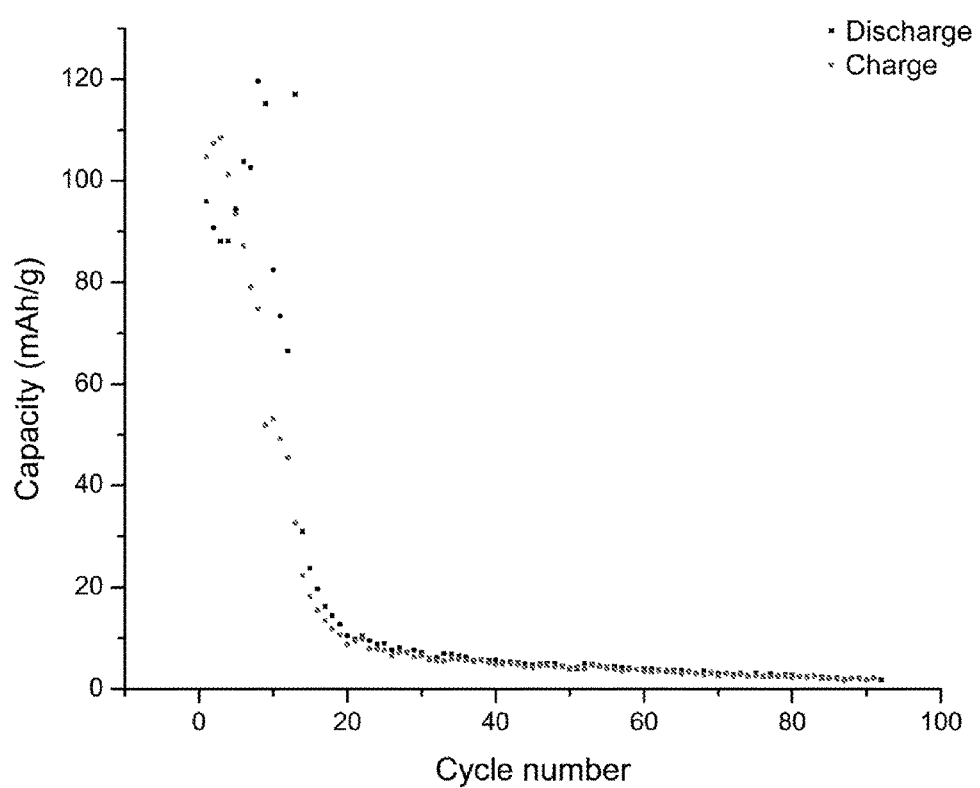
FIG. 73 shows the capacity vs. cycle number of the black product formed in Example 53.
Figure 74:
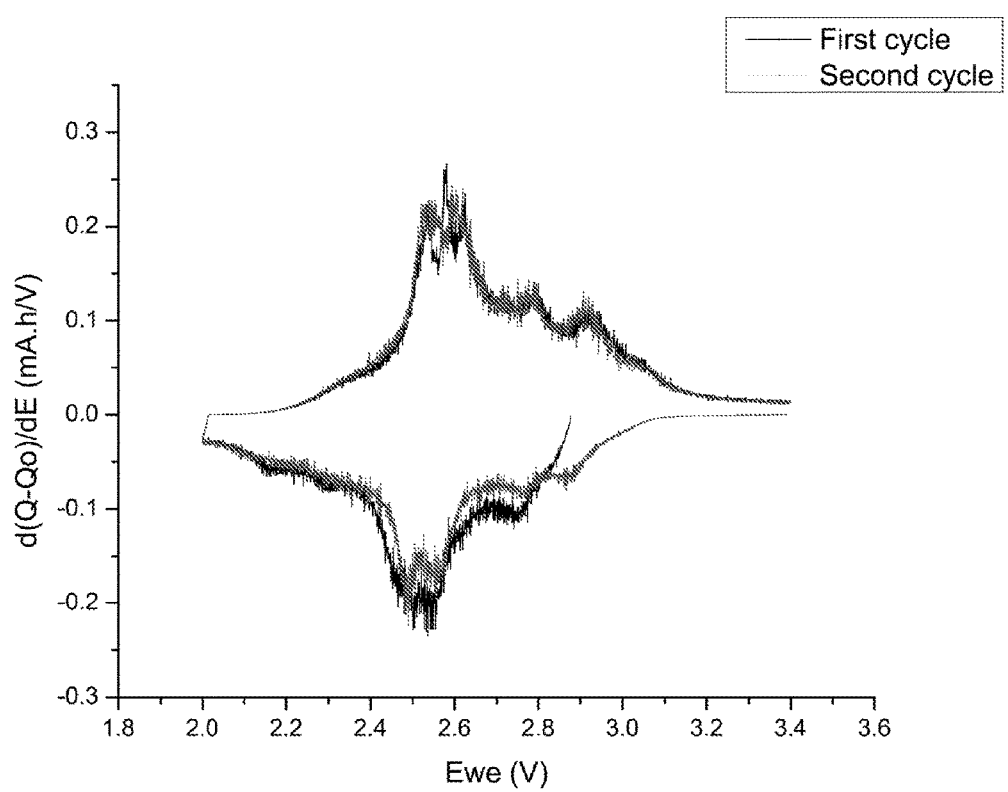
FIG. 74 shows a differential charge plot of the black product formed in Example 53, showing the reversibility of lithium ion insertion and the potential of discharge and charge over the first two discharge/charge cycles.

In Example 53, the product was synthesized in the same way as in Example 12 and characterized as in Example 43. FIG. 72 shows a charge/discharge graph of the black product over the first 5 discharge/charge cycles, determined by galvanostatic measurement at 7 mA/g. FIG. 74 shows a differential charge plot of the product, showing the reversibility of lithium ion insertion and the potential of discharge and charge over the first two discharge/charge cycles. The product retained about 6% of the initial capacity after 30 cycles, with a higher capacity (105 and 96 mAh/g for charging and discharging) and with more charge/discharge potentials between 2.5-3 V.

Figure 75:
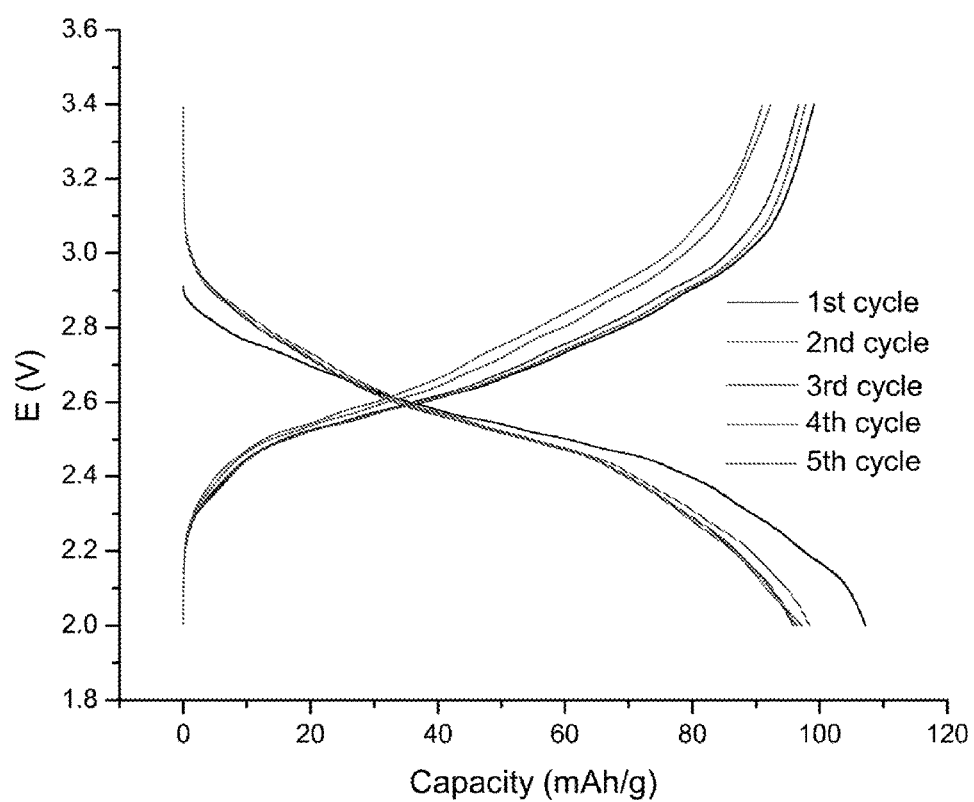
FIG. 75 shows a charge/discharge graph of the black, ball-milled product formed in Example 54, over the first 5 discharge/charge cycles, determined by galvanostatic measurement at 7 mA/g.
Figure 76:
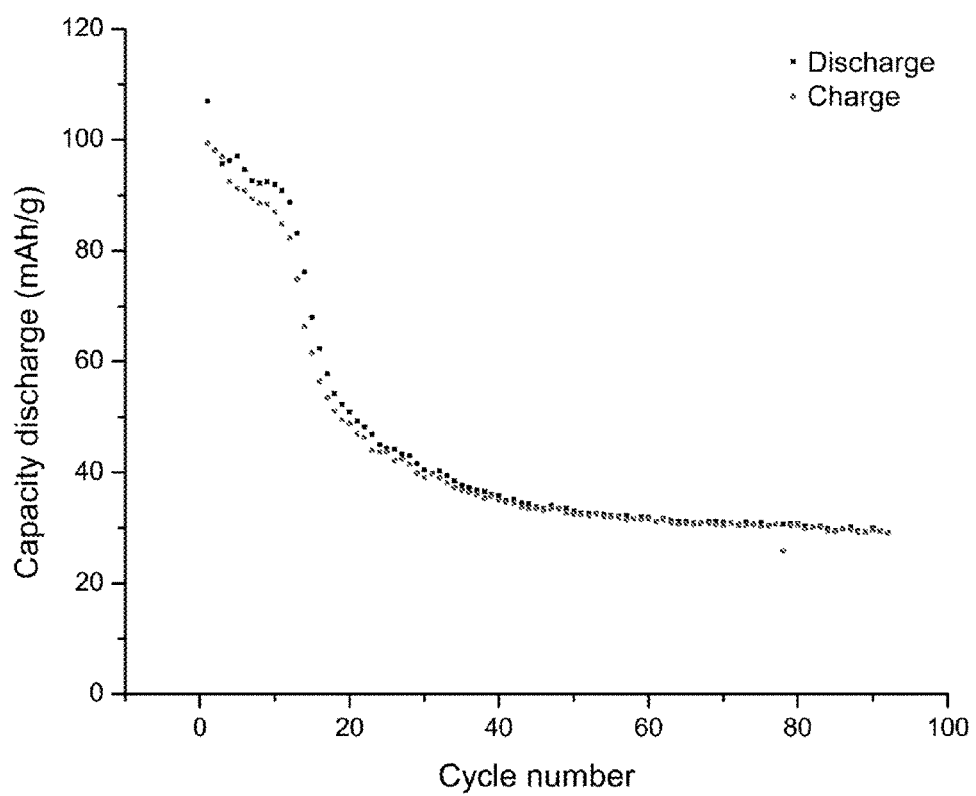
FIG. 76 shows the capacity vs. cycle number of the black, ball-milled product formed in Example 54.
Figure 77:
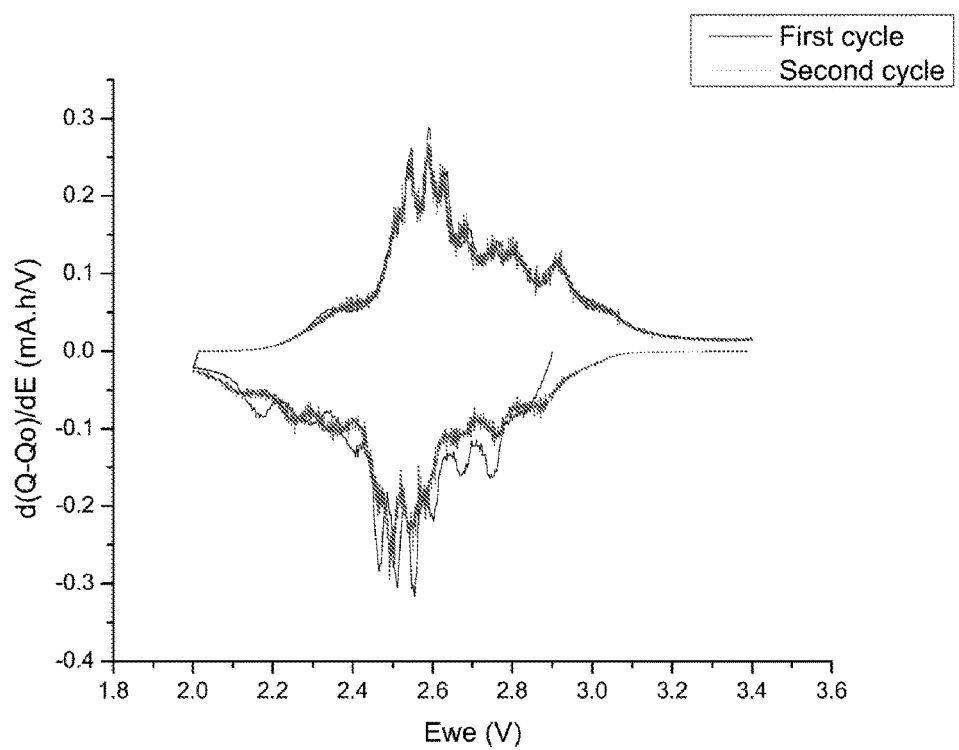
FIG. 77 shows a differential charge plot of the black, ball-milled product formed in Example 54, showing the reversibility of lithium ion insertion and the potential of discharge and charge over the first two discharge/charge cycles.

Example 54 is similar to Example 53, but the product was ball-milled for 30 minutes instead. FIG. 75 shows a charge/discharge graph of the black, ball-milled product over the first 5 discharge/charge cycles, determined by galvanostatic measurement at 7 mA/g. FIG. 76 shows the capacity vs. cycle number of the black, ball-milled product. FIG. 77 shows a differential charge plot of the black, ball-milled product, showing the reversibility of lithium ion insertion and the potential of discharge and charge over the first two discharge/charge cycles. The material retained about 40% of the initial capacity after 30 cycles, with overall higher capacity (99 and 107 mAh/g for charging and discharging).

Figure 78:
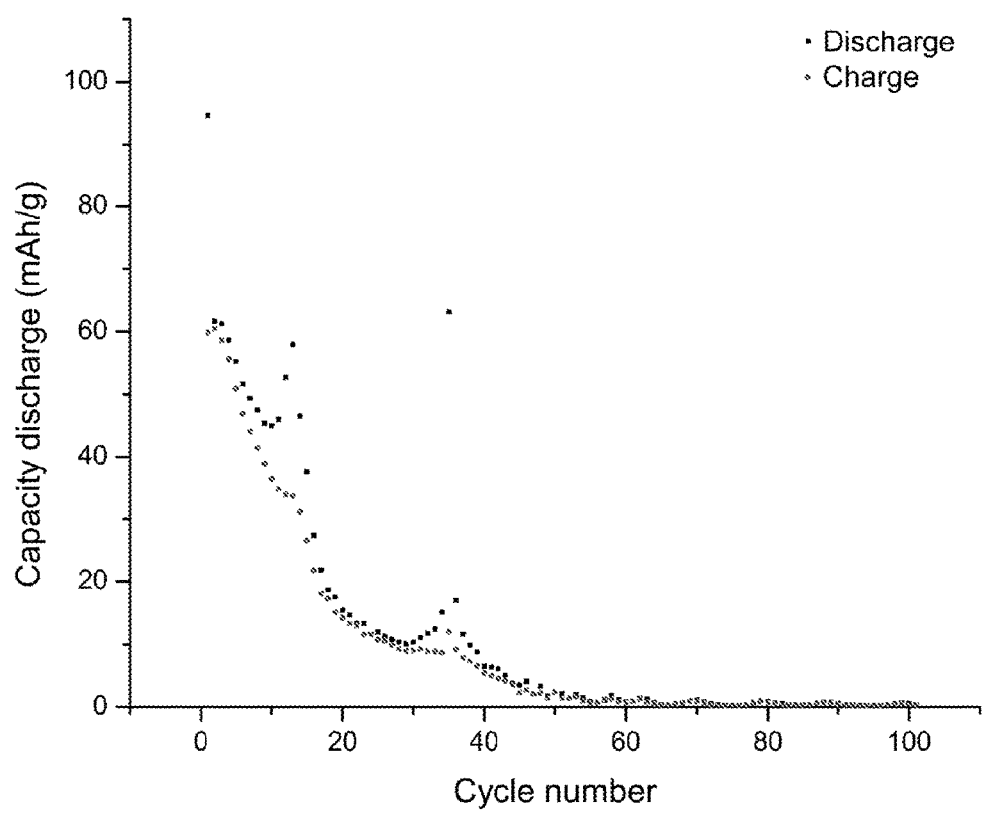
FIG. 78 shows the capacity vs. cycle number of the black product formed in Example 55.
Figure 79:
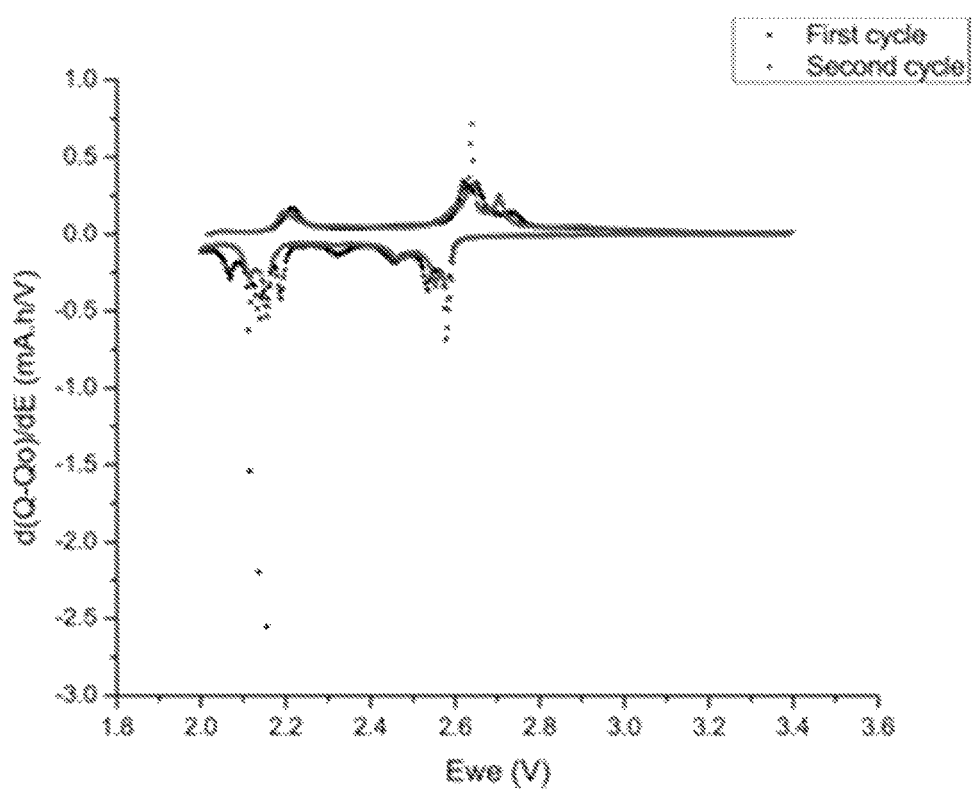
FIG. 79 shows a differential charge plot of the black product formed in Example 55, showing the reversibility of lithium ion insertion and the potential of discharge and charge over the first two discharge/charge cycles.

Example 55 is similar to Example 49 but the product was treated to provide carbon coating on the material surfaces, yielding a black product. FIG. 78 shows the capacity vs. cycle number of the black product. FIG. 79 shows a differential charge plot of the black product, showing the reversibility of lithium ion insertion and the potential of discharge and charge over the first two discharge/charge cycles. The product retained about 20% of the initial capacity after 30 cycles, with higher capacity (60 and 95 mAh/g for charging and discharging) and discharge potentials around 2.2 V and 2.6 V.

Figure 80:
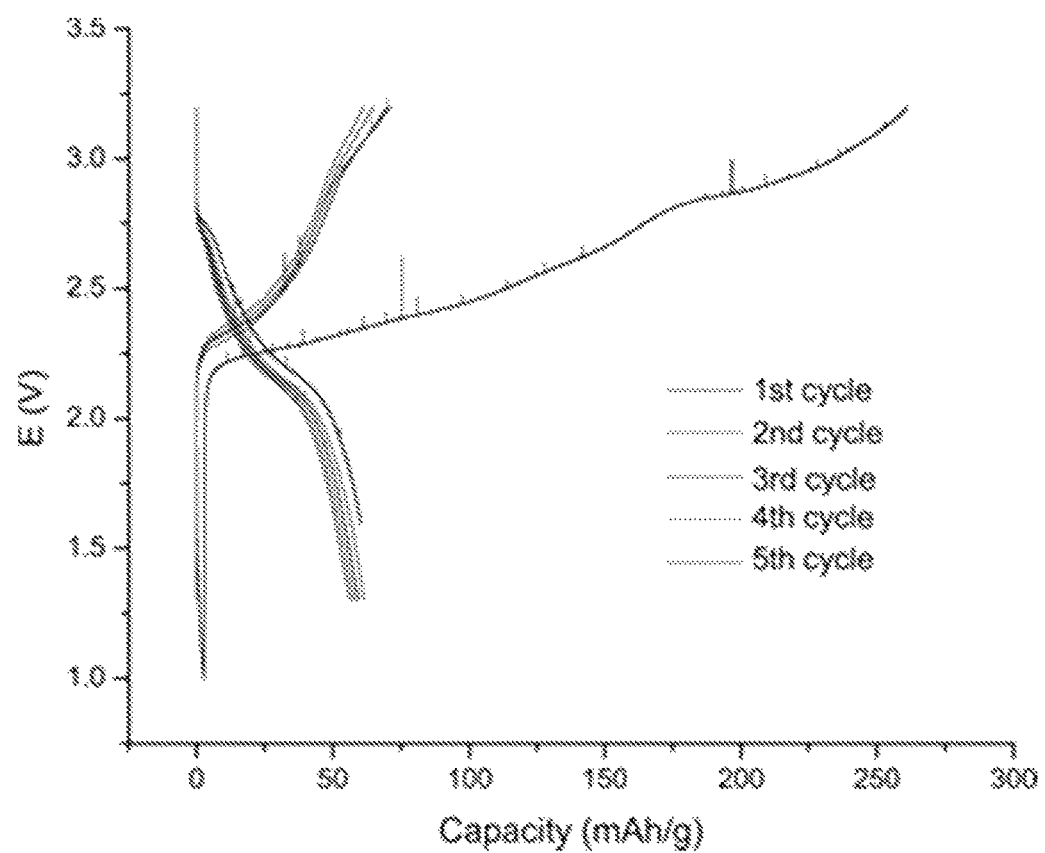
FIG. 80 shows a charge/discharge graph of the washed product formed in Example 56, over the first 5 discharge/charge cycles, determined by galvanostatic measurement at 7 mA/g.
Figure 81:
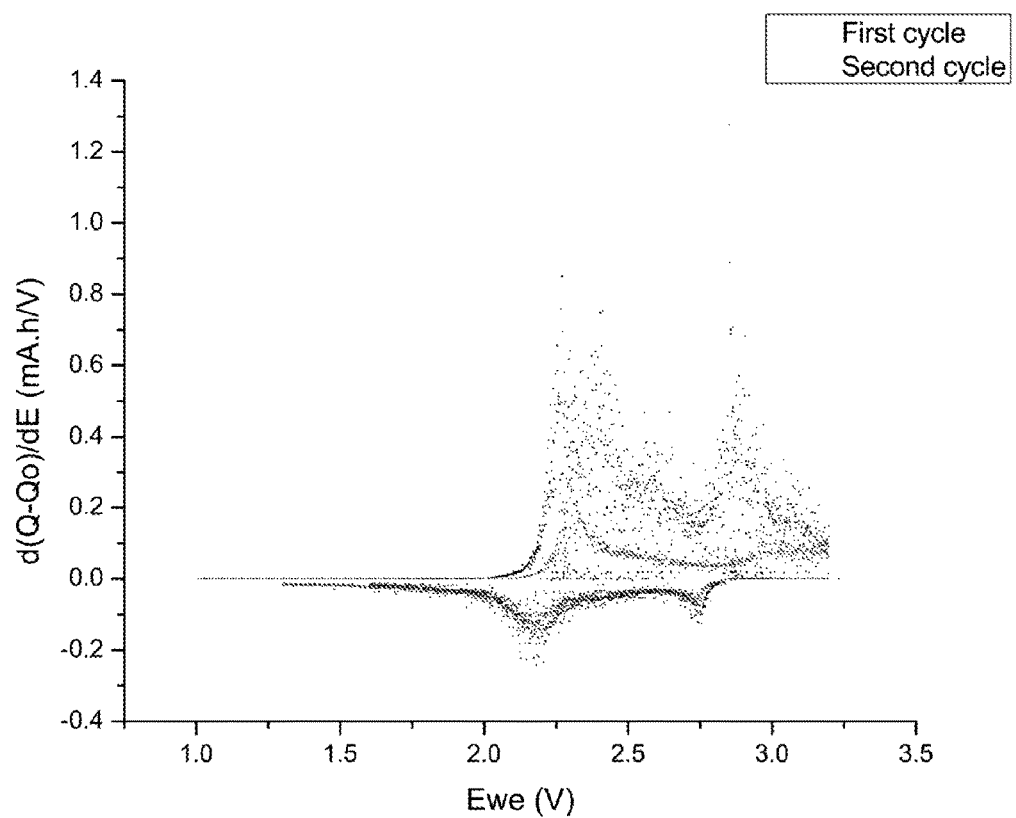
FIG. 81 shows a differential charge plot of the washed product formed in Example 56, showing both the voltage profile and the reversibility of sodium ion insertion over the first two discharge/charge cycles.

In Example 56, the product was prepared in the same way as in Example 24. The product was characterized vs. Na/Na by galvanostatic and potentiodynamic measurements. FIG. 80 shows a charge/discharge graph of the washed product over the first 5 discharge/charge cycles, determined by galvanostatic measurement at 7 mA/g. FIG. 81 shows a differential charge plot of the washed product, showing both the voltage profile and the reversibility of sodium ion insertion over the first two discharge/charge cycles. A capacity of 70 mAh/g was observed for cycles 2-5 (FIG. 80), and with two charge/discharge potentials (FIG. 81).

Figure 82:
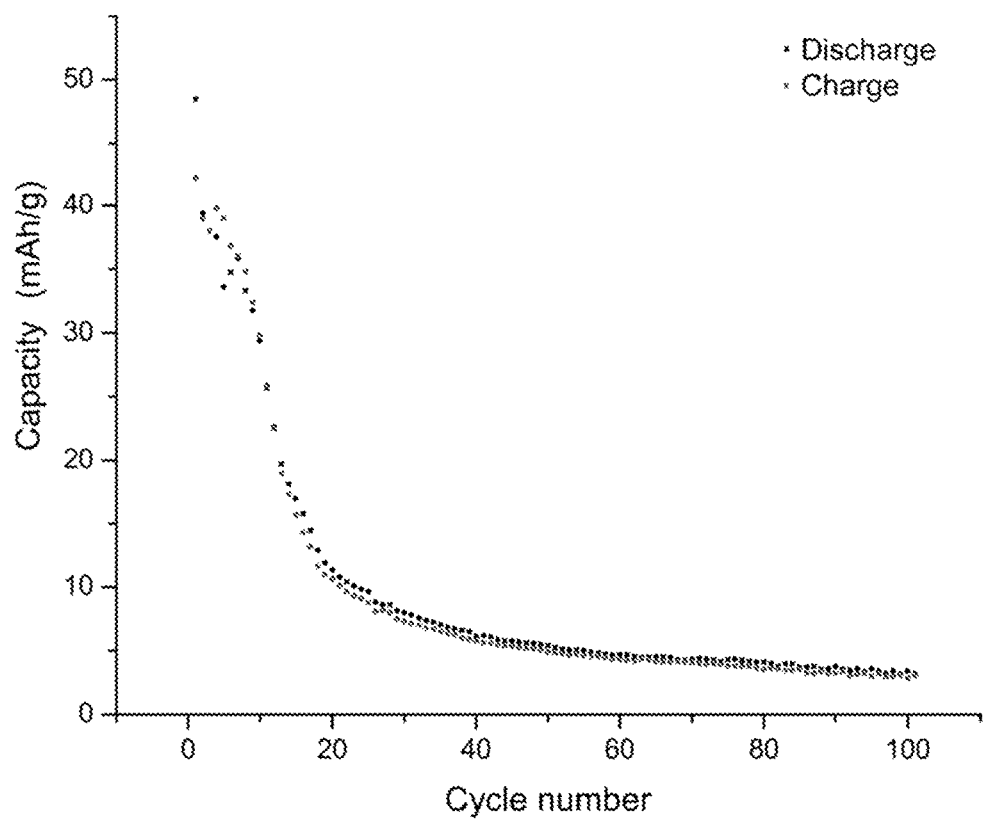
FIG. 82 shows the capacity vs. cycle number of the black product formed in Example 57.
Figure 83:
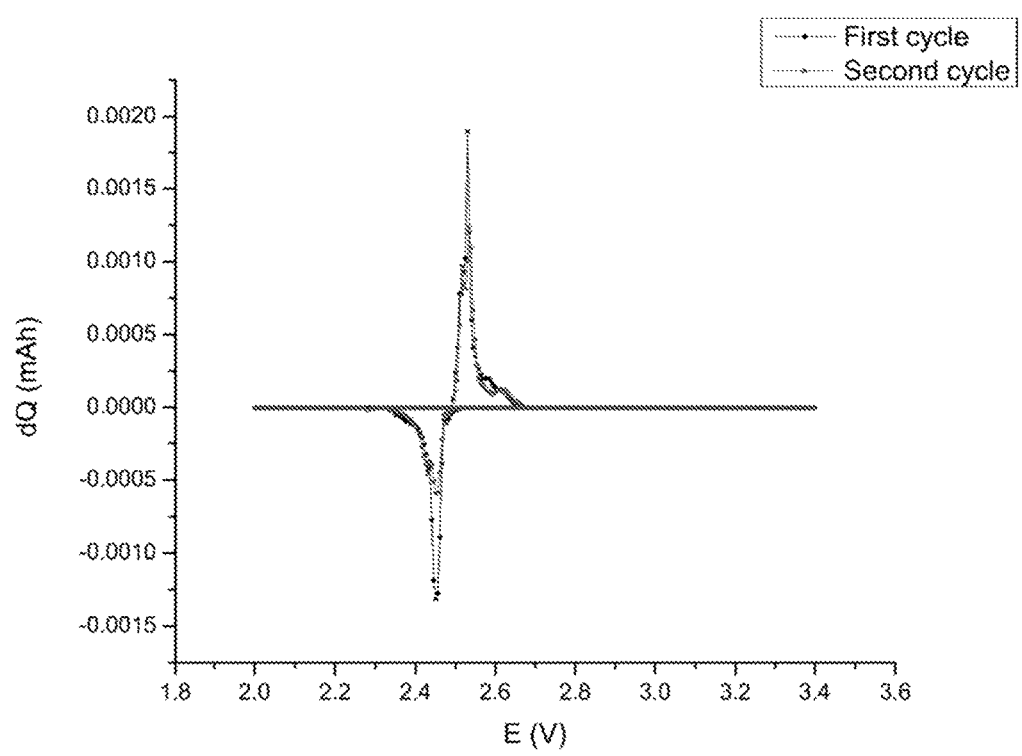
FIG. 83 shows a differential charge plot of the washed product formed in Example 57, showing both the voltage profile and the reversibility of lithium ion insertion over the first two discharge/charge cycles.

In Example 57, the product was synthesized in the same way as in Example 16 and characterized as in Example 43. FIG. 82 shows the capacity vs. cycle number of the black product. FIG. 83 shows a differential charge plot of the washed product, showing both the voltage profile and the reversibility of lithium ion insertion over the first two discharge/charge cycles. The product retained about 10% of the initial capacity after 40 cycles, with a voltage profile that displays only one charge/discharge potential at 2.5 V.

Figure 84:
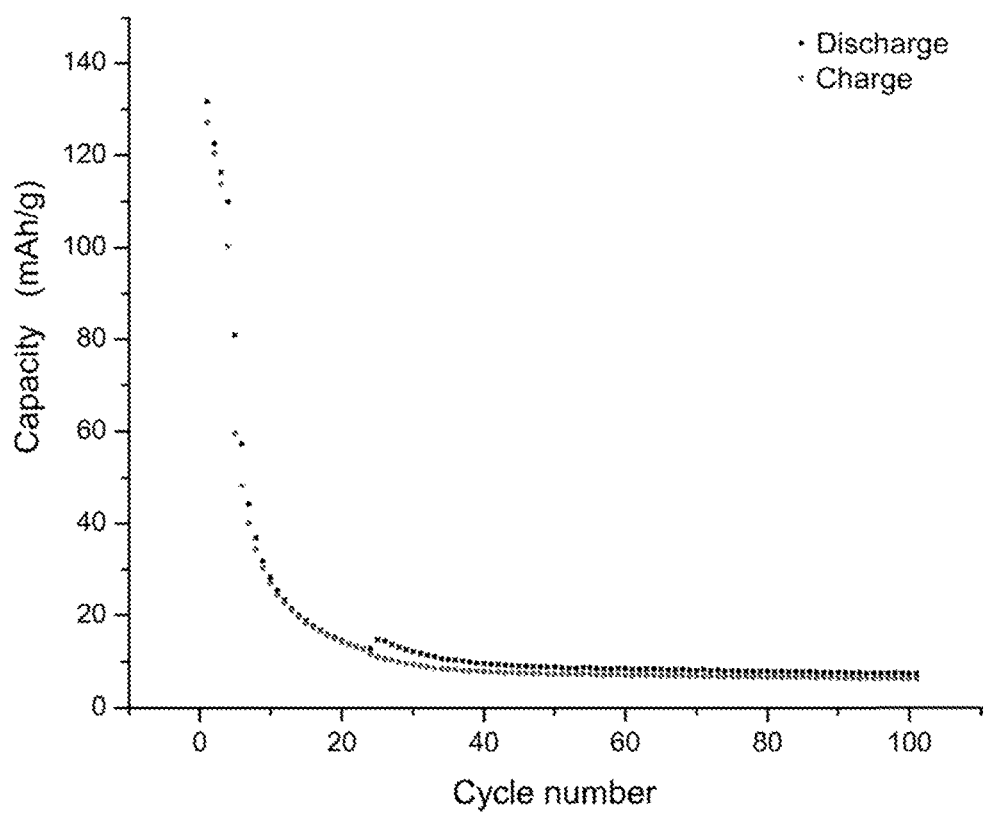
FIG. 84 shows the capacity vs. cycle number of the black product formed in Example 58.
Figure 85:
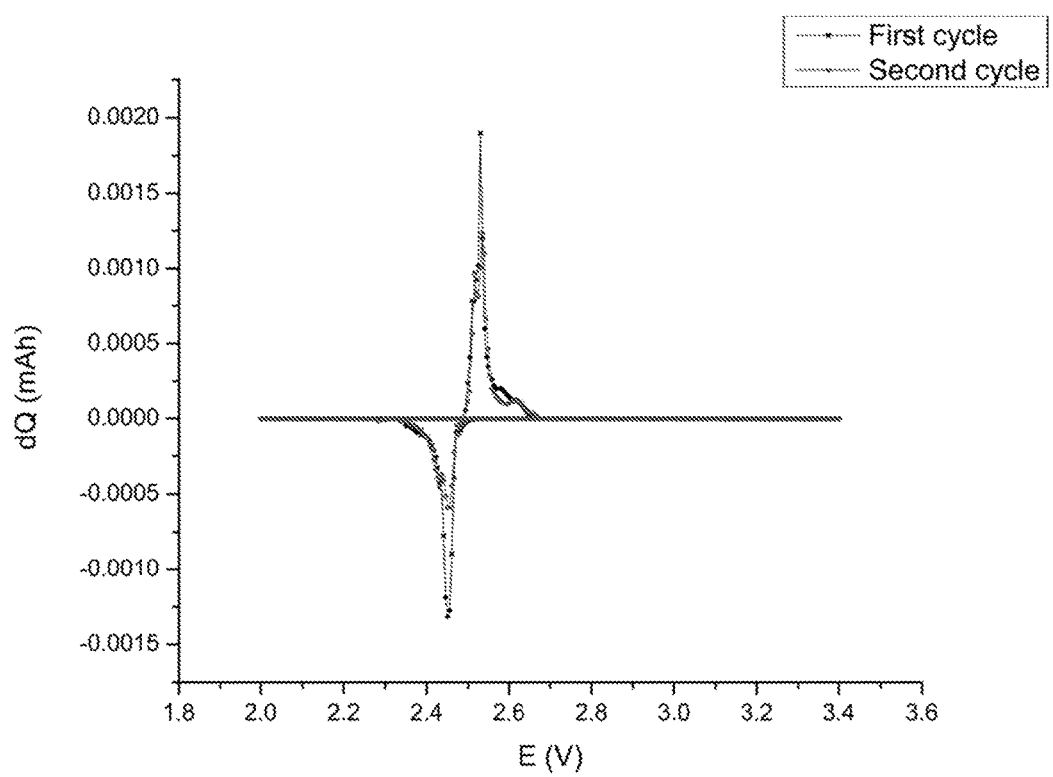
FIG. 85 shows a differential charge plot of the washed product formed in Example 58, showing both the voltage profile and the reversibility of lithium ion insertion over the first two discharge/charge cycles.

Example 58 is similar to Example 57 but the product showed a higher capacity (127 and 132 mAh/g for charging and discharging). FIG. 84 shows the capacity vs. cycle number of the black product. FIG. 85 shows a differential charge plot of the washed product formed, showing both the voltage profile and the reversibility of lithium ion insertion over the first two discharge/charge cycles.

Figure 86:
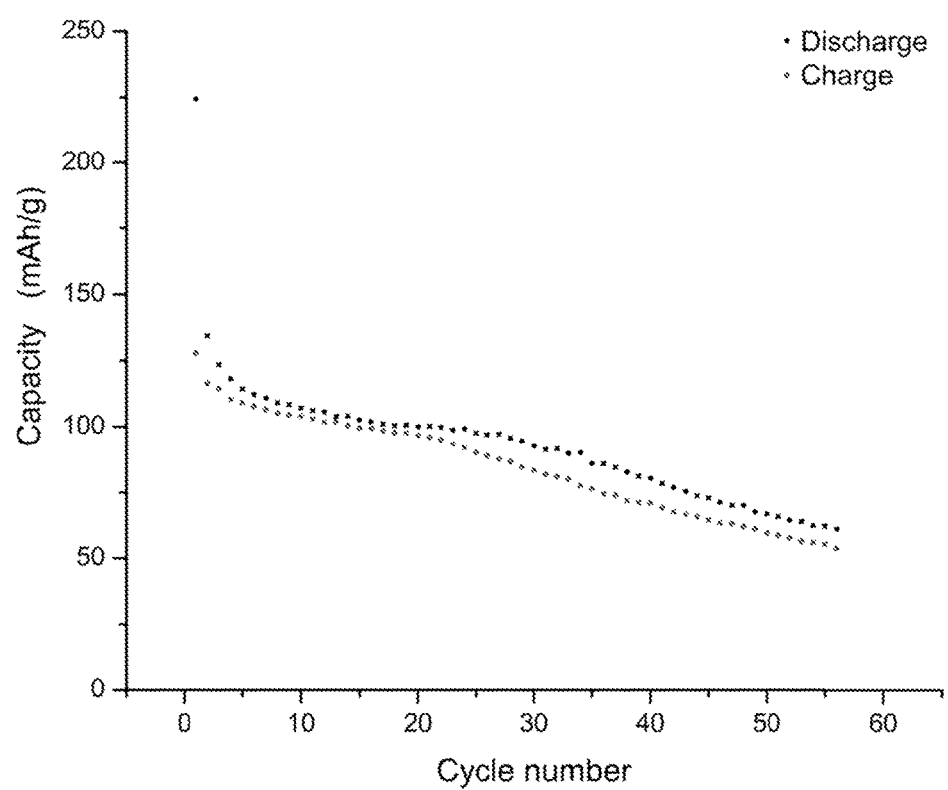
FIG. 86 shows the capacity vs. cycle number of the black product formed in Example 59.
Figure 87:
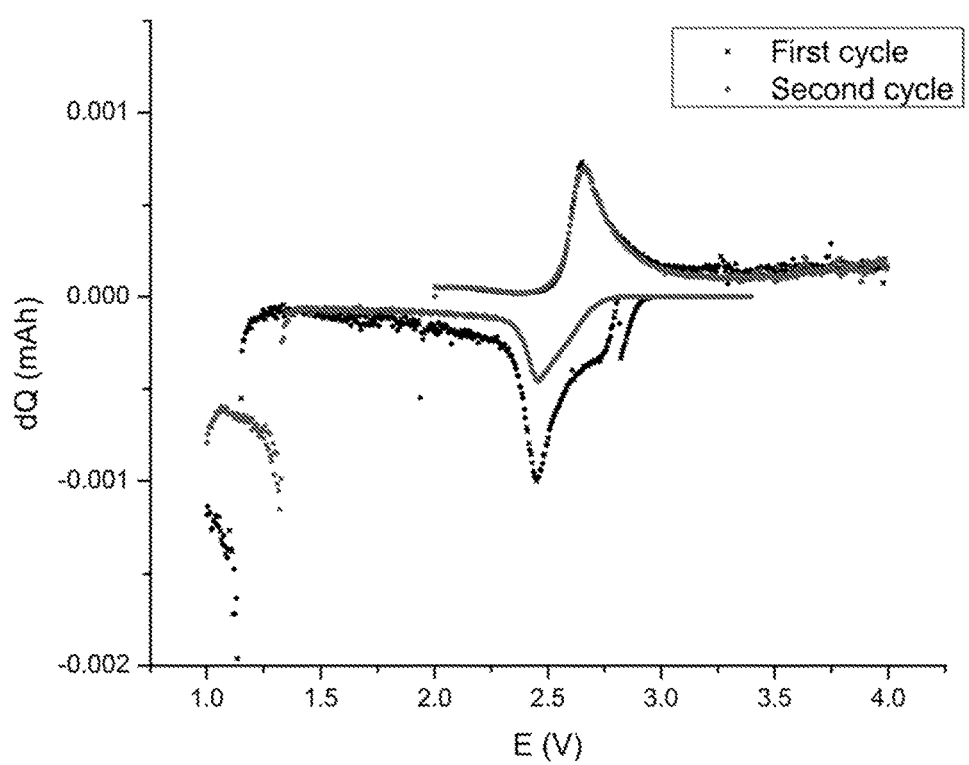
FIG. 87 shows a differential charge plot of the washed product formed in Example 59, showing both the voltage profile and the reversibility of lithium ion insertion over the first two discharge/charge cycles.

In Example 59, the product was synthesized in the same way as in Example 36 and characterized as in Example 43. FIG. 86 shows the capacity vs. cycle number of the black product. FIG. 87 shows a differential charge plot of the washed product, showing both the voltage profile and the reversibility of lithium ion insertion over the first two discharge/charge cycles. The product showed a higher capacity (128 and 224 mAh/g for discharging and charging) at the charging/discharging rate of 12.5 mA/g and with discharge/charge potentials around 2.5 and 2.6 V.

Figure 88:
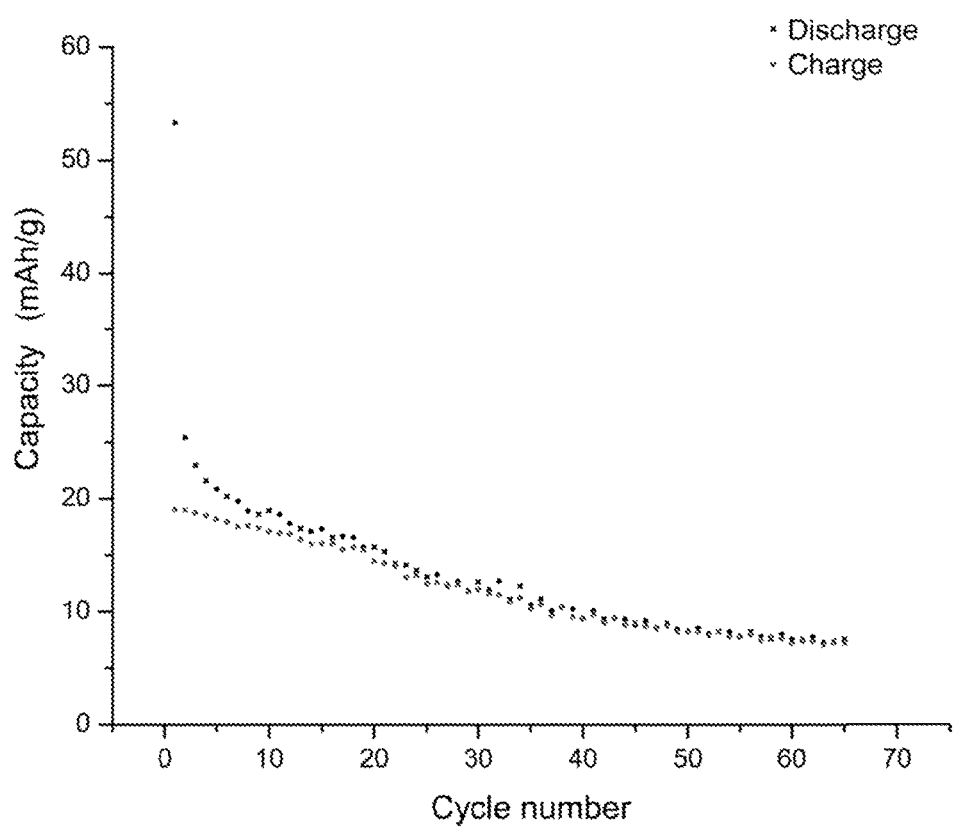
FIG. 88 shows the capacity vs. cycle number of the black product formed in Example 60.
Figure 89:
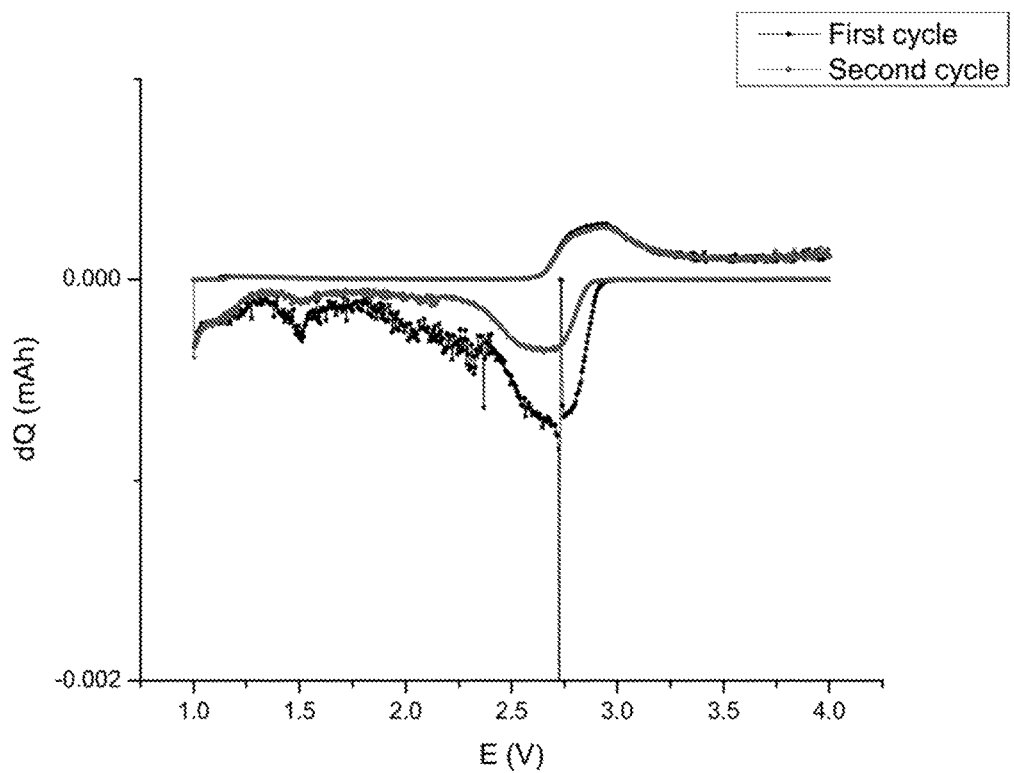
FIG. 89 shows a differential charge plot of the washed product formed in Example 60, showing both the voltage profile and the reversibility of lithium ion insertion over the first two discharge/charge cycles.

In Example 60, the product was synthesized in the same way as in Example 28 and characterized as in Example 43. FIG. 88 shows the capacity vs. cycle number of the black product. FIG. 89 shows a differential charge plot of the washed product, showing both the voltage profile and the reversibility of lithium ion insertion over the first two discharge/charge cycles. The product showed a capacity of 19 mAh/g for charging and 52 mAh/g for discharging with a charge/discharge potential at 2.9/2.7 V.

In Example 61, the product was synthesized in the same way as in Example 9 and characterized as in Example 43 but with an aqueous electrolyte of 1 M $LiNO_3$ (pH=2) and a Ni counter-electrode. The product showed a capacity of 86 mAh/g for charging and 32 mAh/g for discharging with a charge/discharge potential around −0.4 V.

Figure 90:
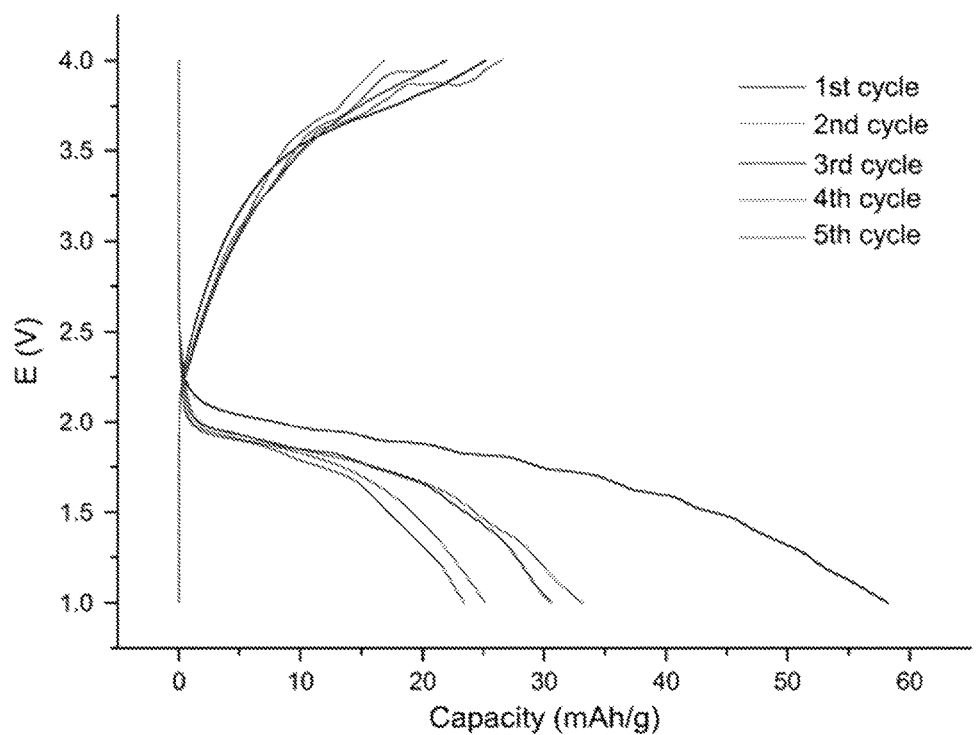
FIG. 90 shows a charge/discharge graph of the product/carbon black mixture in Example 21, over the first 5 discharge/charge cycles, determined by galvanostatic measurement at 7 mA/g.
Figure 91:
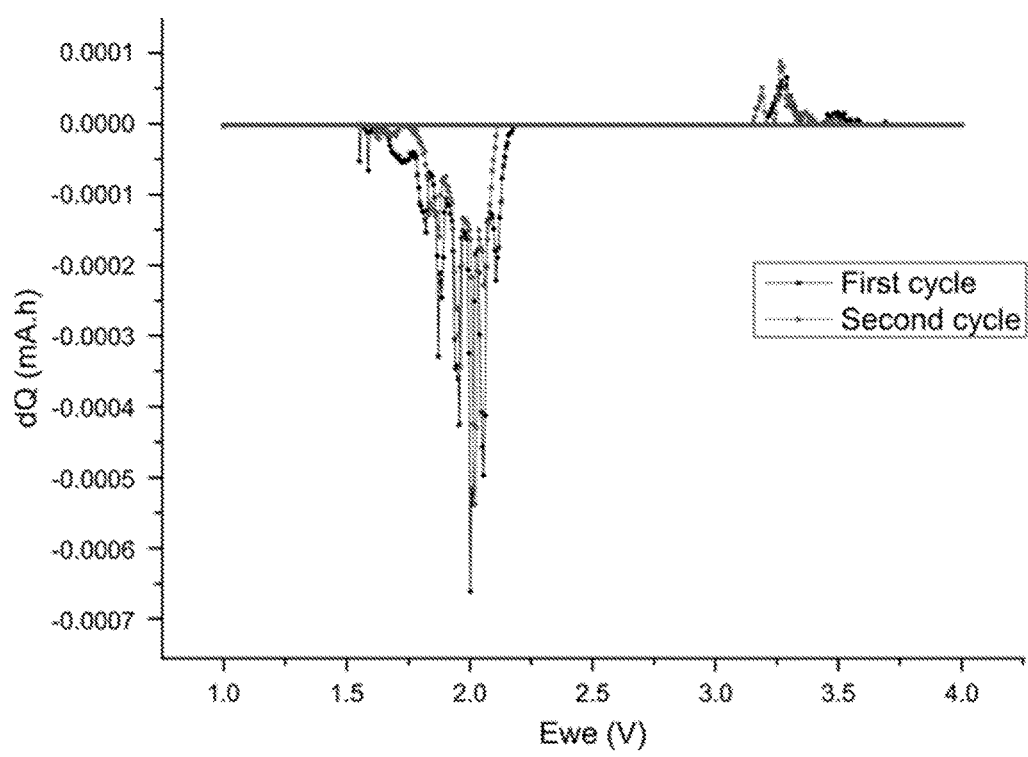
FIG. 91 shows a differential charge plot of the product/carbon black mixture in Example 21, showing both the voltage profile and the reversibility of lithium ion insertion over the first two discharge/charge cycles.

In Example 62, the product was synthesized in the same way as in Example 21 but the product was ball-milled with carbon black for one hour prior to galvanostatic and potentiodynamic measurements. FIG. 90 shows a charge/discharge graph of the product/carbon black mixture over the first 5 discharge/charge cycles, determined by galvanostatic measurement at 7 mA/g. FIG. 91 shows a differential charge plot of the mixture, showing both the voltage profile and the reversibility of lithium ion insertion over the first two discharge/charge cycles. These measurements show charging and discharging capacities of 27 and 58 mAh/g at 5 mA/mg (FIG. 90), and charge/discharge potentials around 2.0 and 3.2 V in the differential charge plot (FIG. 91).

Only a few implementations are described and illustrated. Variations, enhancements and improvements of the described implementations and other implementations can be made based on what is described and illustrated in this document.

What is claimed is:

1. A method comprising:
heating an acidic solution comprising a metal to yield a precursor in the form of a semi-liquid, semi-solid or solid; and
calcining the precursor to yield a product comprising an oxide of the metal,
wherein the acidic solution has a pH of 2 or less, and heating the acidic solution to yield the precursor results in a pH change of 2 or less.

2. The method of claim 1, wherein the acidic solution comprises a metal-stabilizing agent that stabilizes the metal in the acidic solution.

3. The method of claim 2, wherein the metal-stabilizing agent decomposes at a temperature less than 100° C.

4. The method of claim 1, further comprising combining an additive with the acidic solution to modify the acidic solution before heating the acidic solution to yield the precursor, wherein the additive is an organic compound or an inorganic compound, and modifying the acidic solution results in a pH change of 2 or less.

5. The method of claim 4, wherein the additive comprises an inorganic compound, a carbon-forming agent, or a combination of thereof.

6. The method of claim 1, wherein calcining the precursor comprises calcining the precursor in air or in a controlled gas environment.

7. The method of claim 1, wherein the acidic solution comprises at least one oxyanion.

8. The method of claim 7, wherein the acidic solution comprises two or more compositionally different oxyanions.

9. The method of claim 1, wherein the product comprises, in its chemical structure, at least two different ligands selected from the group consisting of oxyanions, polyoxoanions, and polyoxyanions.

10. The method of claim 1, wherein the product comprises, in its chemical structure, protons or structural hydroxyl ions.

11. The method of claim 1, wherein the metal is a transition metal in Groups 3-12.

12. The method of claim 1, wherein the acidic solution comprises two or more different metals.

13. The method of claim 1, wherein the metal is in the form of or derived from a metal salt or complex.

14. The method of claim 1, further comprising combining an organic or inorganic component with the precursor to yield a second semi-liquid, semi-solid or solid.

15. The method of claim 1, further comprising treating the product to yield a new material.

16. The method of claim 1, wherein the metal oxide is a crystalline solid having proton or hydronium ions as charge-balancing cations in the structure.

17. The method of claim 1, wherein the metal oxide is a proton conductor, an acid catalyst, or a battery material.

* * * * *

UNITED STATES PATENT AND TRADEMARK OFFICE
CERTIFICATE OF CORRECTION

| | |
|---|---|
| PATENT NO. | : 10,170,759 B2 |
| APPLICATION NO. | : 14/899953 |
| DATED | : January 1, 2019 |
| INVENTOR(S) | : Dong-Kyun Seo et al. |

Page 1 of 1

It is certified that error appears in the above-identified patent and that said Letters Patent is hereby corrected as shown below:

On the Title Page

Item (57), Line 8, Delete "$H_xM_2A^1{}_y\text{-}A^2{}_z$," and insert -- $H_xM_2A^1{}_yA^2{}_z$, --.

In the Claims

Column 25, Line 25, Claim 5, delete "of thereof." and insert -- thereof. --.

Signed and Sealed this
Sixteenth Day of April, 2019

Andrei Iancu
*Director of the United States Patent and Trademark Office*